United States Patent
Roh et al.

(10) Patent No.: US 8,861,628 B2
(45) Date of Patent: Oct. 14, 2014

(54) LAYER MAPPING METHOD AND DATA TRANSMISSION METHOD FOR MIMO SYSTEM

(75) Inventors: Dong Wook Roh, Anyang-si (KR); Bong Hoe Kim, Anyang-si (KR); Young Woo Yun, Anyang-si (KR); Dong Youn Seo, Anyang-si (KR); Joon Kui Ahn, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 315 days.

(21) Appl. No.: 12/585,702

(22) Filed: Sep. 22, 2009

(65) Prior Publication Data

US 2011/0033001 A1 Feb. 10, 2011

Related U.S. Application Data

(63) Continuation of application No. 12/448,735, filed as application No. PCT/KR2008/000074 on Jan. 7, 2008.

(30) Foreign Application Priority Data

| Jan. 5, 2007 | (KR) | 10-2007-0001353 |
| Jan. 9, 2007 | (KR) | 10-2007-0002673 |
| Jun. 19, 2007 | (KR) | 10-2007-0060166 |
| Jul. 19, 2007 | (KR) | 10-2007-0072260 |
| Aug. 10, 2007 | (KR) | 10-2007-0080823 |

(51) Int. Cl.
*H04B 7/02* (2006.01)
*H04L 1/02* (2006.01)
(Continued)

(52) U.S. Cl.
CPC .............. *H04L 1/007* (2013.01); *H04L 1/0656* (2013.01); *H04L 2025/03426* (2013.01);
(Continued)

(58) Field of Classification Search
None
See application file for complete search history.

(56) References Cited

U.S. PATENT DOCUMENTS

| 2004/0013102 A1 | 1/2004 | Fong et al. |
| 2004/0121730 A1 | 6/2004 | Kadous et al. |

(Continued)

FOREIGN PATENT DOCUMENTS

| KR | 10-2005-0031841 | 4/2005 |
| KR | 10-2005-0034476 | 4/2005 |

(Continued)

OTHER PUBLICATIONS

Mirkovic et al., "MIMO Link Modeling for System Level Simulations", IEEE 17th International Symposium on Personal Indoor and Radio Communications, Sep. 2006, pp. 1-6.

(Continued)

*Primary Examiner* — Shuwang Liu
*Assistant Examiner* — Gina McKie
(74) *Attorney, Agent, or Firm* — Mckenna Long & Aldridge LLP

(57) ABSTRACT

A method for indicating a combination between a codeword and a layer in a MIMO communication system, a layer mapping method, and a data transmission method using the same are disclosed. A minimum number of codeword-layer mapping combinations from among all available combinations based on the numbers of all codewords and all layers are pre-defined in consideration of a ratio of a codeword to a layer, a reception performance of a receiver, and reduction of combinations, so that a data transmission method using the predefined combinations is implemented. If a specific one codeword is mapped to at least two layers, a diversity gain can be acquired.

13 Claims, 38 Drawing Sheets

(51) Int. Cl.
  *H04L 1/06* (2006.01)
  *H04L 5/00* (2006.01)
  *H04L 25/02* (2006.01)
  *H04L 25/03* (2006.01)
  *H04L 1/00* (2006.01)
  *H04L 1/18* (2006.01)

(52) U.S. Cl.
  CPC ............ *H04L 1/0068* (2013.01); *H04L 5/0023*
    (2013.01); *H04L 1/0041* (2013.01); *H04L*
    *1/0071* (2013.01); *H04L 25/0204* (2013.01);
    *H04L 1/0003* (2013.01); *H04L 1/0066*
    (2013.01); *H04L 5/0039* (2013.01); *H04L*
    *2025/03414* (2013.01); *H04L 1/1812* (2013.01);
    *H04L 25/0248* (2013.01)
  USPC .......................................... 375/267; 375/260

(56) References Cited

U.S. PATENT DOCUMENTS

| | | | |
|---|---|---|---|
| 2005/0105629 A1 | 5/2005 | Hottinen et al. | |
| 2005/0105631 A1* | 5/2005 | Giannakis et al. | 375/267 |
| 2005/0113121 A1* | 5/2005 | Terry et al. | 455/501 |
| 2005/0204273 A1 | 9/2005 | Jeong et al. | |
| 2006/0018397 A1 | 1/2006 | Sampath et al. | |
| 2006/0183287 A1* | 8/2006 | Collins et al. | 438/278 |
| 2007/0153672 A1* | 7/2007 | Terry et al. | 370/206 |
| 2007/0280386 A1 | 12/2007 | Waes et al. | |
| 2008/0013610 A1 | 1/2008 | Varadarajan et al. | |
| 2008/0037675 A1* | 2/2008 | Lin et al. | 375/262 |
| 2008/0080641 A1* | 4/2008 | Kim | 375/299 |
| 2008/0192718 A1 | 8/2008 | Jongren et al. | |
| 2009/0282310 A1 | 11/2009 | Seok et al. | |
| 2009/0304109 A1* | 12/2009 | Kotecha | 375/299 |
| 2010/0027697 A1* | 2/2010 | Malladi et al. | 375/260 |
| 2010/0041350 A1* | 2/2010 | Zhang et al. | 455/101 |
| 2010/0296603 A1 | 11/2010 | Lee et al. | |

FOREIGN PATENT DOCUMENTS

| | | |
|---|---|---|
| KR | 10-2005-0066633 | 6/2005 |
| KR | 10-2006-0048829 | 5/2006 |
| KR | 10-2007-0046680 A | 5/2007 |
| RU | 2328074 | 6/2008 |
| WO | WO 2006/069397 | 6/2006 |
| WO | WO 2006/130541 | 12/2006 |

OTHER PUBLICATIONS

Texas Instruments, "Multi-codeword principles for E-UTRA MIMO", 3GPP TSG-RAN WG1 47bis, Sorrento, Italy, Jan. 15-19, 2007, R1-070269.

Samsung, "UE Feedback and scheduling considerations for 4-Tx antenna MIMO", 3GPP TSG TAN WG1 Meeting #47, Riga, Latvia, Nov. 6-10, 2006, R1-063566.

Philips, "MIMO resources definition for E-UTRA", 3GPP TSG RAN WG1 meeting #44bis, Athens, Greece, Mar. 27-31, 2006, R1-060844.

Nokia, "Layer to codeword mapping for DL SU-MIMO", 3GPP TSG RAN WG1 Meeting #47bis, Sorrento, Italy, Jan. 15-19, 2007, R1-070385.

3GPP TSG RAN WG1 48, R1-070727, Codeword-to-Layer Mapping for E-UTRA MIMO, Texas Instruments, Feb. 12-16, 2007.

\* cited by examiner

LAYER MAPPING METHOD AND DATA TRANSMISSION METHOD FOR MIMO SYSTEM

This application is a Continuation Application of U.S. patent application Ser. No. 12/448,735, filed Jul. 2, 2009, which claims priority to Korean Application numbers 10-2007-0001353, 10-2007-0002673, 10-2007-0060166, 10-2007-0072260, 10-2007-0080823, filed Jan. 5, 2007; Jan. 9, 2007; Jun. 19, 2007; Jul. 19, 2007; Aug. 10, 2007, respectively, and to International Application No. PCT/KR2008/000074, filed Jan. 7, 2008, all of which are herein incorporated by reference in their entirety.

TECHNICAL FIELD

The present invention relates to a Multi-Input Multi-Output (MIMO) communication system, and more particularly to a method for displaying a combination between a codeword and a layer in a MIMO communication system, a layer mapping method and a data transmission method using the same.

BACKGROUND ART

A conventional MIMO technology will hereinafter be described in detail.

In brief, the MIMO technology is an abbreviation of the Multi-Input Multi-Output technology. The MIMO technology uses multiple transmission (Tx) antennas and multiple reception (Rx) antennas to improve the efficiency of Tx/Rx data, whereas a conventional art has generally used a single transmission (Tx) antenna and a single reception (Rx) antenna. In other words, the MIMO technology allows a transmitter or receiver of a wireless communication system to use multiple antennas (hereinafter referred to as a multi-antenna), so that the capacity or performance can be improved. For the convenience of description, the term "MIMO" can also be considered to be a multi-antenna technology.

In more detail, the MIMO technology is not dependent on a single antenna path to receive a single total message, collects a plurality of data pieces received via several antennas, and completes total data. As a result, the MIMO technology can increase a data transmission rate at a give channel condition, or can increase a system performance at a specific data transmission rate.

The next-generation mobile communication technology requires a data transmission rate higher than that of a conventional mobile communication technology, so that it is expected that the effective MIMO technology is requisite for the next-generation mobile communication technology. Under this situation, the MIMO communication technology is the next-generation mobile communication technology capable of being applied to mobile communication terminals or base stations, and can extend the range of a data communication range, so that it can overcome the limited amount of transfer data of other mobile communication systems due to a variety of limited situations.

Among a variety of technologies capable of improving the transmission efficiency of data, the MIMO technology can greatly increase an amount of communication capacity and Tx/Rx performances without allocating additional frequencies or increasing an additional power. Due to these technical advantages, most companies or developers have intensively paid attention to this MIMO technology.

FIG. 1 is a block diagram illustrating a conventional MIMO communication system.

Referring to FIG. 1, if the number of transmission (Tx) antennas increases to $N_T$, and at the same time the number of reception (Rx) antennas increases to $N_R$, a theoretical channel capacity of the MIMO communication system increases in proportion to the number of antennas, so that a transmission rate and a frequency efficiency can greatly increase.

In this case, the transmission rate acquired by the increasing channel capacity is equal to the multiplication of a maximum transmission rate (Ro) acquired when a single antenna is used and a rate increment (Ri), and can theoretically increase. The rate increment (Ri) can be represented by the following equation 1:

$$R_i = \min(N_T, N_R) \quad \text{[Equation 1]}$$

For example, provided that the MIMO system uses four Tx antenna and four Rx antennas, this MIMO system can theoretically acquire a high transmission rate which is four times higher than that of a single antenna system.

After the above-mentioned theoretical capacity increase of the MIMO system has been demonstrated in the mid-1990s, many developers are conducting intensive research into a variety of technologies which can substantially increase a data transmission rate using the theoretical capacity increase. Some of them have been reflected in a variety of wireless communication standards, for example, a third-generation mobile communication or a next-generation wireless LAN, etc.

A variety of MIMO-associated technologies have been intensively researched by many companies or developers, for example, research into an information theory associated with a MIMO communication capacity calculation under various channel environments or multiple access environments, research into a wireless channel measurement and modeling of the MIMO system, and research into a space-time signal processing technology.

The above-mentioned MIMO technology can be classified into two types: a spatial diversity scheme and a spatial multiplexing scheme. The spatial diversity scheme increases transmission reliability using symbols passing various channel paths. The spatial multiplexing scheme simultaneously transmits a plurality of data symbols via a plurality of Tx antennas, so that it increases a transmission rate of data. In addition, the combination of the spatial diversity scheme and the spatial multiplexing scheme has also been recently developed to properly acquire unique advantages of the two schemes.

Details of the spatial diversity scheme, the spatial multiplexing scheme, and the combination thereof will hereinafter be described.

Firstly, the spatial diversity scheme will hereinafter be described. By and large, the spatial diversity scheme is divided into two types: a space-time block code scheme and a space-time Trellis code scheme which can simultaneously uses a diversity gain and a coding gain. Generally, a bit error ratio (BER) improvement performance and a code-generation degree of freedom of the space-time Trellis code scheme are superior to those of the space-time block code scheme, whereas the calculation complexity of the space-time block code scheme is higher than that of the space-time Trellis code scheme.

The above-mentioned spatial diversity gain corresponds to the product or multiplication of the number ($N_T$) of Tx antennas and the number ($N_R$) of Rx antennas, as denoted by $N_T \times N_R$.

Secondly, the spatial multiplexing scheme will hereinafter be described. The spatial multiplexing scheme is adapted to transmit different data streams via individual Tx antennas. In this case, a receiver may unavoidably generate mutual interference between data pieces simultaneously transmitted from a transmitter. The receiver removes this mutual interference from the received data using a proper signal processing technique, so that it can receive the desired data having no interference. In order to remove noise or interference from the received data, a maximum likelihood receiver, a ZF (Zero Forcing) receiver, a MMSE (Minimum Mean Square Error) receiver, a D-BLAST, or a V-BLAST may be used. Specifically, if a transmitter can recognize channel information, a Singular Value Decomposition (SVD) scheme may be used to remove the interference perfectly.

Thirdly, the combination of the spatial diversity scheme and the spatial multiplexing scheme will hereinafter be described. Provided that only a spatial diversity gain is acquired, the performance-improvement gain is gradually saturated in proportion to an increasing diversity order. As a result, a variety of schemes capable of acquiring all the above-mentioned two gains simultaneously while solving the above-mentioned problems have been intensively researched by many companies or developers, for example, a double-STTD scheme and a space-time BICM (STBICM) scheme.

A mathematical modeling of a communication method for use in the above-mentioned MIMO system will hereinafter be described in detail.

Firstly, as can be seen from FIG. 1, it is assumed that $N_T$ Tx antennas and $N_R$ Rx antennas exist.

In the case of a transmission (Tx) signal, a maximum number of transmission information pieces is $N_T$ under the condition that $N_T$ Tx antennas are used, so that the Tx signal can be represented by a specific vector shown in the following equation 2:

$$s = [s_1, s_2, \ldots, s_{N_T}]^T \quad \text{[Equation 2]}$$

The individual transmission information pieces $(s_1, s_2, s_{N_T})$ may have different transmission powers. In this case, if the individual transmission powers are denoted by $(P_1, P_2, \ldots, P_{N_T})$, transmission information having an adjusted transmission power can be represented by a specific vector shown in the following equation 3:

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In Equation 3, using a diagonal matrix of a transmission power P, $\hat{s}$ can be represented by the following equation 4:

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

The information vector $\hat{s}$ having an adjusted transmission power is multiplied by a weight matrix (W), so that $N_T$ transmission (Tx) signals $(x_1, x_2, \ldots, x_{N_T})$ to be actually transmitted are configured. In this case, the weight matrix is adapted to properly distribute Tx information to individual antennas according to Tx-channel situations. The above-mentioned Tx signals $(x_1, x_2, \ldots, x_{N_T})$ can be represented by the following equation 5 using the vector (x):

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} \quad \text{[Equation 5]}$$

$$= W\hat{s} = WPs$$

In Equation 5, $w_{ij}$ is a weight between the i-th Tx antenna and the j-th Tx information, and W is a matrix indicating the weight $w_{ij}$. The matrix W is called a weight matrix or a precoding matrix.

The above-mentioned Tx signal (x) can be considered in different ways according to two cases, i.e., a first case in which the spatial diversity is used and a second case in which the spatial multiplexing is used.

In the case of using the spatial multiplexing, different signals are multiplexed and the multiplexed signals are transmitted to a destination, so that elements of the information vector (s) have different values. Otherwise, in the case of using the spatial diversity, the same signal is repeatedly transmitted via several channel paths, so that elements of the information vector (s) have the same value.

Needless to say, the combination of the spatial multiplexing scheme and the spatial diversity scheme may also be considered. In other words, the same signal is transmitted via three Tx antennas according to the spatial diversity scheme, and the remaining signals are spatially multiplexed and then transmitted to a destination.

Next, if $N_R$ Rx antennas are used, Rx signals $(y_1, y_2, \ldots, y_{N_R})$ of individual antennas can be represented by a specific vector (y) shown in the following equation 6:

$$y = [y_1, y_2, \ldots, y_{N_R}]^T \quad \text{[Equation 6]}$$

If a channel modeling is set up in the MIMO communication system, individual channels can be distinguished from each other according to Tx/Rx antenna indexes. A specific channel from a Tx antenna (j) to an Rx antenna (i) is denoted by $h_{ij}$. In this case, it should be noted that the first index of the channel $h_{ij}$ indicates an Rx-antenna index and the second means a Tx-antenna index.

Several channels are tied up, so that they are displayed in the form of a vector or matrix. An exemplary vector is as follows.

FIG. 2 shows channels from $N_T$ Tx antennas to an Rx antenna (i).

Referring to FIG. 2, the channels from the $N_T$ Tx antennas to the Rx antenna (i) can be represented by the following equation 7:

$$h_i^T = [h_{i1}, h_{i2}, \ldots, h_{iN_T}] \quad \text{[Equation 7]}$$

If all channels from the $N_T$ Tx antennas to $N_R$ Rx antennas are denoted by the matrix composed of Equation 7, the following equation 8 is acquired:

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \quad \text{[Equation 8]}$$

An Additive White Gaussian Noise (AWGN) is added to an actual channel which has passed the channel matrix H shown in Equation 8. The AWGN ($n_1, n_2, \ldots, n_{N_R}$) added to each of $N_R$ Rx antennas can be represented by a specific vector shown in the following equation 9:

$$n = [n_1, n_2, \ldots, n_{N_R}]^T \quad \text{[Equation 9]}$$

By the above-mentioned modeling method of the Tx signal, Rx signal, and channels including AWGN, each MIMO communication system can be represented by the following equation 10:

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} \quad \text{[Equation 10]}$$

$$= Hx + n$$

The above-mentioned description has disclosed that the MIMO communication system is applied to a single user. However, the MIMO communication system may also be applied to several users, so that it can acquire a multi-user diversity. A detailed description of the multi-user diversity will hereinafter be described.

The fading channel is a major cause of deterioration of a performance of a wireless communication system. A channel gain value is changed according to time, frequency, and space. The lower the channel gain value, the lower the performance. A representative method for solving the above-mentioned fading problem is a diversity. This diversity uses the fact that there is a low probability that all independent channels have low gain values. A variety of diversity methods can be applied to the present invention, and the above-mentioned multi-user diversity is considered to be one of them.

If several users are present in a cell, channel gain values of individual users are stochastically independent of each other, so that the probability that all the users have low gain values is very low. If a Node-B has sufficient transmission (Tx) power and several users are present in a cell, it is preferable that all channels be allocated to a specific user having the highest channel gain value to maximize a total channel capacity according to the information theory. The multi-user diversity can be classified into three kinds of diversities, i.e., a temporal multi-user diversity, a frequency multi-user diversity, and a spatial multi-user diversity.

The temporal multi-user diversity is adapted to allocate a channel to a specific user having the highest gain value when a channel situation changes with time.

The frequency multi-user diversity is adapted to allocate a sub-carrier(s) to a specific user having the highest gain value in each frequency band in a frequency multi-carrier system such as an Orthogonal Frequency Division Multiplexing (OFDM) system.

If a channel situation slowly changes with time in another system which does not use the multi-carrier, the user having the highest channel gain value will monopolize the channel for a long period of time, other users are unable to communicate with each other. In this case, in order to use the multi-user diversity, there is a need to induce the channel to change.

Next, the spatial multi-user diversity uses different channel gain values of users according to space types. An implementation example of the spatial multi-user diversity is a Random BeamForming (RBF) method. This RBF method performs beamforming with a predetermined weight using multiple antennas (i.e., multi-antenna) to induce the change of channel, and uses the above-mentioned spatial multi-user diversity.

The multi-user MIMO scheme which uses the multi-user diversity as the multi-antenna scheme will hereinafter be described in detail.

According to the multi-user multi-antenna scheme, the number of users and the number of antennas of each user can be combined with each other in various ways at transmission/receivers.

The multi-user MIMO scheme is classified into a downlink method (i.e., a forward-link method) and an uplink method (i.e., a reverse-link method), and detailed descriptions of the downlink and uplink methods will hereinafter be described. In this case, the downlink indicates that a signal is transmitted from a Node-B to several user equipments (UEs), and the uplink indicates that several UEs transmit a signal to the Node-B.

The downlink in MIMO can be generally categorized into two kinds of signal reception methods: The first reception method enables a single user (i.e., a single UE) to receive a desired signal via a total of $N_R$ antennas, and the second reception method enables each of the $N_R$ UEs to receive a desired signal via a single antenna. If required, a combination of the first and second reception methods may also be made available for the present invention. In other words, some UEs may use a single Rx antenna, or some other UEs may use three Rx antennas. It should be noted that a total number of Rx antennas in all combinations is maintained at $N_R$. This case is generally called a MIMO Broadcast Channel (BC) or a Space Division Multiple Access (SDMA).

The uplink in MIMO can be generally classified into two kinds of signal transmission methods: The first transmission method enables a single UE to transmit a desired signal via $N_T$ antennas, and the second transmission method enables each of the $N_T$ UEs to transmit a desired signal via a single antenna. If required, a combination of the first and second transmission methods may also be made available for the present invention. In other words, some UEs may use a single Tx antenna, or some other UEs may use three Tx antennas. It should be noted that a total number of Tx antennas in all combinations is maintained at $N_T$. This case is generally called a MIMO Multiple Access Channel (MAC).

The uplink and the downlink are symmetrical to each other, so that a method for use in one of them may also be used for the other one.

For the convenience of description and better understanding of the present invention, although the following description will basically describe the MIMO BC, it should be noted that the method of the present invention be also used for the MIMO MAC.

FIG. 3A is a conceptual diagram illustrating a single-user MIMO communication system. FIG. 3B is a conceptual diagram illustrating a multi-user MIMO communication system.

For the convenience of description, FIGS. 3A and 3B assume the use of a downlink.

The single-user MIMO communication system shown in FIG. 3A includes a transmitter (i.e., Node-B) equipped with multiple antennas (i.e., multi-antenna) and a receiver (i.e., UE) equipped with multiple antennas. In this case, if a signal (x) to be transmitted from the transmitter is multiplied by a weight vector (W), and the multiplied resultant signal is transmitted via the multi-antenna, the present invention can acquire a maximum of channel capacity on the assumption that channel information has been correctly recognized.

In the meantime, the multi-user MIMO communication system shown in FIG. 3B includes a plurality of Multiple Input Single Output (MISO) systems, each of which assigns a single antenna to each user. Therefore, the multi-user can maximize the channel capacity using a transmission beamforming in the same manner as in the single-user MIMO communication system. In this case, the multi-user MIMO communication system must consider not only the channel information but also interference of each user, so that it requires a more complicated system than that of the single-user MIMO communication system. Therefore, the multi-user MIMO communication system must select a weight vector to minimize the interference between users in the case of using the transmission beamforming.

The above-mentioned description can be numerically described as follows.

Firstly, the single-user environment, i.e., the single-user MIMO communication system, will hereinafter be described.

Provided that all transmission/receivers have fully recognized all channel information, a singular value decomposition (SVD) H can be represented by the following equation 11:

$$H = U \Sigma V^H \quad \text{[Equation 11]}$$

where "H" is a singular value decomposition, U and V is a unitary matrix, E is a diagonal matrix.

In this case, in order to acquire a maximum gain in the light of channel capacity, the diagonal matrix V is selected by the weight matrix W, and $U^H$ is multiplied by a reception signal (Y). If the resultant signal of the receiver is denoted by y, the following equation 12 is acquired:

$$\begin{aligned} W &= V \quad \text{[Equation 12]} \\ y &= Hx + n = U\Sigma V^H x + n = U\Sigma V^H W\hat{s} + n \\ &= U\Sigma V^H V\hat{s} + n = U\Sigma \hat{s} + n \\ \tilde{y} &= U^H y = U^H U\Sigma \hat{s} + U^H n = \Sigma \hat{s} + \tilde{n} = \Sigma P s + \tilde{n} \end{aligned}$$

where P is a transmission power matrix. The transmission power matrix P can be determined by a specific algorithm (well known as a water-filling algorithm) for acquiring the channel capacity. This water-filling algorithm is an optimum method for acquiring the channel capacity.

However, in order to perform the water-filling algorithm, all the transmission/receivers must completely know all channel information. Therefore, in order to use the water-filling algorithm under the multi-user environment, each of all users must know not only his or her channel information but also channel information of other users. Due to this problem, in fact, it is almost impossible for the multi-user MIMO communication system to use the above-mentioned water-filling algorithm.

Next, the multi-user MIMO communication system will hereinafter be described.

In this case, a representative optimum method for acquiring the channel capacity is a Dirty Paper Coding (DPC) method, but this DPC method has high complexity. Also, there are other optimum methods for use in the present invention, for example, a Random BeamForming (RBF) and a Zero Forcing BeamForming (ZFBF). The above-mentioned RBF or ZFBF method may have a performance similar to the optimum performance acquired by the DPC method, if the number of users increases in the multi-user environment.

In the meantime, a codeword for use in the MIMO communication system will hereinafter be described.

A general communication system performs coding of transmission information of a transmitter using a forward error correction code, and transmits the coded information, so that an error experienced at a channel can be corrected by a receiver. The receiver demodulates a received (Rx) signal, and performs decoding of forward error correction code on the demodulated signal, so that it recovers the transmission information. By the decoding process, the Rx-signal error caused by the channel is corrected.

Each of all forward error correction codes has a maximum-correctable limitation in a channel error correction. In other words, if a reception (Rx) signal has an error exceeding the limitation of a corresponding forward error correction code, a receiver is unable to decode the Rx signal into information having no error. Therefore, the receiver must determine the presence or absence of an error in the decoded information. In this way, a specialized coding process for performing error detection is required, separately from the forward error correction coding process. Generally, a Cyclic Redundancy Check (CRC) code has been used as an error detection code.

The CRC method is an exemplary coding method for performing the error detection. Generally, the transmission information is coded by the CRC method, and then the forward error correction code is applied to the CRC-coded information. A single unit coded by the CRC and the forward error correction code is generally called a codeword.

In the meantime, if several transmission information units are overlapped and then received, the present invention can expect performance improvement using an interference-cancellation receiver. There are many cases in the above-mentioned case in which several transmission information is overlapped and then received, for example, a case in which the MIMO technology is used, a case in which a multi-user detection technology is used, and a case in which a multi-code technology is used. A brief description of the interference-cancellation structure will be as follows.

According to the interference-cancellation structure, after first information is demodulated/decoded from a total reception signal in which several information is overlapped, information associated with the first information is removed from the total reception signal. A second signal is demodulated/decoded by the resultant signal having no first information removed from the reception signal. A third signal is demodulated/decoded by the resultant signal having no first- and second-information removed from the first reception signal. A fourth signal or other signal after the fourth signal repeats the above-mentioned processes, so that the fourth or other signal is demodulated/decoded. In this way, the above-mentioned method for continuously removing the demodulated/decoded signal from a reception signal to improve a performance of the next demodulating/decoding process is called a Successive Interference Cancellation (SIC) method.

In order to use the above-mentioned interference cancellation method such as the SIC, the demodulated/decoded signal removed from the reception signal must have no error. If any error occurs in the demodulated/decoded signal, an error propagation occurs so that a negative influence continuously affects all the demodulated/decoded signals.

The above-mentioned interference cancellation technology can also be applied to the MIMO technology. If several transmission information pieces are overlapped/transmitted via multiple antennas, the above-mentioned interference cancellation technology is required. In other words, if the spatial multiplexing technology is used, each transmitted information is detected, and at the same time the interference cancellation technology can be used.

However, as described above, in order to minimize the error propagation caused by the interference cancellation, it is preferable that the interference is selectively removed after determining the presence or absence of an error in the demodulated/decoded signal. A representative method for determining the presence or absence of the error in each transmission information is the above-mentioned cyclic redundancy check (CRC) method. A unit of distinctive information processed by the CRC coding is called a codeword. Therefore, a more representative method for using the interference cancellation technology is a specific case in which several transmission information pieces and several codewords are used.

In the meantime, the number of rows and the number of columns of a channel matrix H indicating a channel condition is determined by the number of Tx/Rx antennas. In the channel matrix H, the number of rows is equal to the number ($N_R$) of Rx antennas, and the number of columns is equal to the number ($N_T$) of Tx antennas. Namely, the channel matrix H is denoted by $N_R \times N_T$ matrix.

Generally, a matrix rank is defined by a smaller number between the number of rows and the number of columns, in which the rows and the columns are independent of each other. Therefore, the matrix rank cannot be higher than the number of rows or columns. The rank of the channel matrix H can be represented by the following equation 13:

$$\text{rank}(H) \leq \min(N_T, N_R) \quad \text{[Equation 13]}$$

Another definition of the above-mentioned rank can be defined by the number of eigen values other than "0" when the matrix is eigen-value-decomposed. Similarly, if the rank is SVD-processed, the rank may also be defined by the number of singular values other than Therefore, the physical meaning of the rank in the channel matrix may be considered to be a maximum number of transmission times of a given channel capable of transmitting different information.

For the convenience of description, it is assumed that each of different information pieces transmitted via the MIMO technology is a transmission stream or a stream. This stream may also be called a layer, so that the number of transmission streams cannot be higher than the channel rank equal to the maximum number of transmission times of the channel capable of transmitting different information.

If the channel matrix is H, this channel matrix H can be represented by the following equation 14:

$$\text{\#of streams} \leq \text{rank}(H) \leq \min(N_T, N_R) \quad \text{[Equation 14]}$$

where "# of streams" is indicative of the number of streams.

In the meantime, it should be noted that a single stream may be transmitted via one or more antennas.

A method for matching the stream with the antenna can be described according to the MIMO technology types.

In the case where a single stream is transmitted via several antennas, this case may be considered to be the spatial diversity scheme. In the case where several streams are transmitted via several antennas, this case may be considered to be the spatial multiplexing scheme. Needless to say, a hybrid scheme between the spatial diversity scheme and the spatial multiplexing scheme may also be made available.

The relationship between the codeword and the stream in the MIMO communication system will hereinafter be described in detail.

FIG. 4 is a block diagram illustrating the relationship between the codeword and the stream in the MIMO communication system.

A variety of methods for matching the codeword with the stream are made available. A general method from among the various methods generates codeword(s), allows each codeword to enter a codeword-stream mapping module, matches the codeword received from the codeword-stream mapping module with the stream(s), and transmits the stream to the stream-antenna mapping module, so that the stream is transmitted via the Tx antenna.

A part for determining the combination between the codeword and the stream is denoted by a bold solid line in FIG. 4.

Ideally, the relationship between the codeword and the stream can be freely determined. A single codeword may be divided into several streams, so that the divided streams are transmitted to a destination. Several codewords are serially integrated in one stream, so that this stream including the codewords may be transmitted to a destination.

However, the above-mentioned serial-integration of several codewords may be considered to be a kind of predetermined coding process, so that the present invention assumes that a single codeword is matched with one or more streams of a real-meaningful combination. However, provided that several streams are distinguished from each other without departing from the scope or spirit of the present invention, the present invention can also be applied to the distinguished streams.

Therefore, for the convenience of description, the present invention assumes that a single codeword is matched with one or more streams. Therefore, if all information is coded and then transmitted to a destination, the following equation 15 can be acquired:

$$\text{\#of codeworks} \leq \text{\#of streams} \quad \text{[Equation 15]}$$

where "# of codewords" is the number of codewords, and "# of streams" is the number of streams.

In conclusion, the above-mentioned equations 13 to 15 can be represented by the following equation 16:

$$\text{\#of codewords} \leq \text{\#of streams} \leq \text{rank}(H) \leq \min(N_T, N_R) \quad \text{[Equation 16]}$$

By Equation 16, the following fact can be recognized. In other words, if the number of Tx/Rx antennas is limited, a maximum number of streams is also limited. If the number of codewords is limited, a minimum number of streams is also limited.

By the above-mentioned relationship between the codeword and the stream, if the number of antennas is limited, the maximum number of codewords or streams is limited, so that the limited number of codewords can be combined with the limited number of streams.

The above-mentioned combination between the codeword and the stream is required for both an uplink and a downlink.

For example, it is assumed that the MIMO technology is applied to the downlink. In this case, a receiver must correctly be informed of a combination beforehand, which is used for the above-mentioned information transmission from among all combinations between the codeword and the stream, so that the demodulating/decoding process of the information can be correctly performed.

Also, if control information is transmitted to the uplink, a preferred combination from among various combinations between the codeword and the stream must also be recognized by a receiver. In more detail, in order to implement the MIMO technology, a transmitter must recognize channel and status information of a receiver, so that the receiver must notify various control information via the uplink.

For example, the receiver considers a variety of receiver states (e.g., a measured channel or buffer status), and must notify a preferred combination between a codeword and a stream, a channel quality indicator (CQI) corresponding to this preferred combination, and a precoding matrix index (PMI) corresponding to the same. Needless to say, the contents of detailed control information may be differently determined according to the type of a used MIMO technology. However, the above-mentioned fact in which the receiver must inform the uplink of the preferred combination between the codeword and the stream is unchangeable.

For another example, if the MIMO technology is applied to the uplink, only a transmission link is changed to another link differently from the above-mentioned example's description, and the remaining facts other than the change of the transmission link are equal to those of the above-mentioned example, so that all combination between a codeword and a stream, a used combination, and a preferred combination must be notified.

If all the combinations between the codeword and the stream can be indicated by a small number of bits, control information can be more effectively transmitted to a destination. Therefore, there is needed a method for effectively indicating the combination between the codeword and the stream.

DISCLOSURE

Technical Problem

Accordingly, the present invention is directed to a layer mapping method and a data transmission method for a MIMO system that substantially obviates one or more problems due to limitations and disadvantages of the related art.

An object of the present invention is to provide a method for rationally limiting the number of combinations between a codeword and a stream, and reducing the number of bits of information indicating the number of combinations.

Another object of the present invention is to provide a method for limiting the number of combinations between a codeword and a stream under a multi-user MIMO communication system, reducing the number of bits of information required for indicating the number of combinations, and providing an effective communication service.

Yet another object of the present invention is to provide a data processing method for effectively dividing a single codeword into at least two layers when data is transmitted via multiple Tx antennas in a wireless communication system.

Yet another object of the present invention is to provide a data processing method for transmitting data via multiple Tx antennas to reduce an influence of the fading phenomenon in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a layer mapping method for a spatial multiplexing in a Multi-Input Multi-Output (MIMO) system comprising: a) modulating a predetermined bit block of each of at least one codeword, and generating a modulation symbol stream for each codeword; and b) mapping a modulation symbol for each of the at least one codeword to at least one layer according to one specific combination from among predetermined mapping combinations, wherein, in each of the predetermined mapping combinations, the number of layers to which a single codeword is mapped is limited to a predetermined number or below, when the predetermined number corresponds to a ratio acquired when the number of all layers is divided by the number of all codewords.

Preferably, the MIMO system uses a maximum of 4 layers and a maximum of 2 codewords, and the predetermined mapping combination limits the number of layers to which the single codeword is mapped to 2 or below.

Preferably, in the predetermined mapping combination, a combination, in which a single codeword is mapped to at least two layers when a maximum of one codeword is used, is removed from among all available mapping combinations between the at least one codeword and the at least one layer.

Preferably, in the predetermined mapping combination, a combination in which a single codeword is mapped to at least two layers when a maximum number of all layers is 2, is removed from among all available mapping combinations between the at least one codeword and the at least one layer.

Preferably, the predetermined mapping combination is limited to a combination in which one codeword with a lower index is mapped to a single layer and the other codeword with a higher index is mapped to two layers, when the two codewords are mapped to the three layers.

Preferably, the predetermined mapping combination is a combination in which combinations each of which has the same number of codewords and layers are denoted by a single combination.

Preferably, the MIMO system uses a maximum of 4 layers and a maximum of 2 codewords, and the predetermined mapping combination consists of a first combination in which a single codeword is mapped to a single layer, a second combination in which two codewords are mapped to two layers, respectively, a third combination in which two codewords are mapped to three layers, and a fourth combination in which two codewords are mapped to four layers.

Preferably, the MIMO system uses a maximum of 4 layers and a maximum of 2 codewords, and the predetermined mapping combination consists of a first combination in which a single codeword is mapped to a single layer, a second combination in which two codewords are mapped to two layers, respectively, a third combination in which two codewords are mapped to three layers, and a fourth combination in which two codewords are mapped to four layers, and a fifth combination for supporting retransmission based on a Hybrid ARQ (HARQ) scheme.

Preferably, in the third combination, a first codeword from among the two codewords is mapped to a first layer from among the three layers, and a second codeword from among the two codewords is mapped to second and third layers from among the three layers.

Preferably, in the fourth combination, a first codeword from among the two codewords is mapped to first and second layers from among the four layers, and a second codeword from among the two codewords is mapped to third and fourth layers from among the four layers.

Preferably, in the layer mapping step b), if a specific one codeword is mapped to two layers according to the third or fourth combination from among the predetermined mapping combinations, modulation symbol streams constructing the specific one codeword are alternately mapped to the two layers.

In another aspect of the present invention, there is provided a method for allowing a transmitter of a Multi-Input Multi-Output (MIMO) system to transmit data via multiple transmission (Tx) antennas comprising: a) performing a channel encoding on a specific data block; b) modulating a bit block formed by the channel-encoded data block, and generating a modulation symbol stream; c) mapping modulation symbols contained in the modulation symbol stream to at least one layer according to either one of predetermined mapping combinations; and d) transmitting the layer-mapped symbols, wherein each of the predetermined mapping combinations includes a specific combination in which a single codeword constituted by the symbol stream generated by the modulation of the specific data block is mapped to at least two layers, and the specific combination is designed to alternately map the symbol stream constructing the single codeword to the at least two layers.

Preferably, the MIMO system uses a maximum of 4 layers and a maximum of 2 codewords, and the predetermined mapping combination includes a first combination in which a single codeword is mapped to a single layer, a second combination in which two codewords are mapped to two layers, respectively, a third combination in which two codewords are mapped to three layers, and a fourth combination in which two codewords are mapped to four layers.

Preferably, in the third combination, a first codeword from among the two codewords is mapped to a first layer from among the three layers, and a second codeword from among the two codewords is mapped to second and third layers from among the three layers.

Preferably, in the fourth combination, a first codeword from among the two codewords is mapped to first and second layers from among the four layers, and a second codeword from among the two codewords is mapped to third and fourth layers from among the four layers.

Preferably, in the layer mapping step c), if a specific one codeword is mapped to two layers according to the third or fourth combination from among the predetermined mapping combinations, an even-th index symbol from among symbol streams constructing the specific one codeword is mapped to a first layer from among the two layers, and an odd-th index symbol is mapped to a second layer from among the two layers, so that the even-th index symbol and the odd-th index symbol are alternately mapped to the first and second layers.

It is to be understood that both the foregoing general description and the following detailed description of the present invention are exemplary and explanatory and are intended to provide further explanation of the invention as claimed.

Advantageous Effects

The method for indicating a combination between a codeword and a stream according to one embodiment of the present invention can rationally limit the number of all combinations between a codeword and a stream in consideration of a variety of aspects, so that it can reduce the number of bits of information indicating the number of all combinations between a codeword and a stream. As for the above-mentioned aspects, the above-mentioned method considers a maximum transmission rate of a specific codeword, compares the possibility of use with the number of cases indicating a corresponding combination, maintains a combination available for retransmission, improves a decoding performance of a receiver using the Successive Interference Cancellation (SIC) method, considers a stream grouping based on an antenna grouping, and considers a user's convenience in a multi-user MIMO communication system.

Therefore, the present invention indicates all codeword-stream combinations, which are required for both an uplink and a downlink in a MIMO communication system, with less number of bits, thereby increasing the efficiency of control information.

The present invention provides a method for mapping codeblocks according to layers in a MIMO communication system, transmitting the mapped codeblocks, and additionally guaranteeing a spatial diversity gain caused by the spatial multiplexing.

In the case where a single data block is divided into several codeblocks and the codeblocks are channel-coded, the present invention gives each codeblock a sufficient spatial diversity by adding simple functions to a transmission chain.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
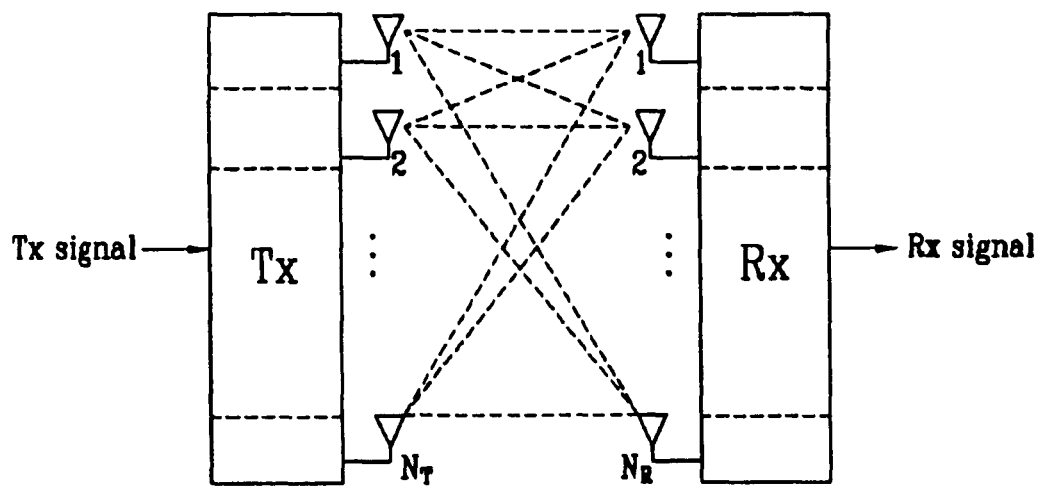
FIG. 1 is a block diagram illustrating a conventional MIMO communication system.
Figure 2:
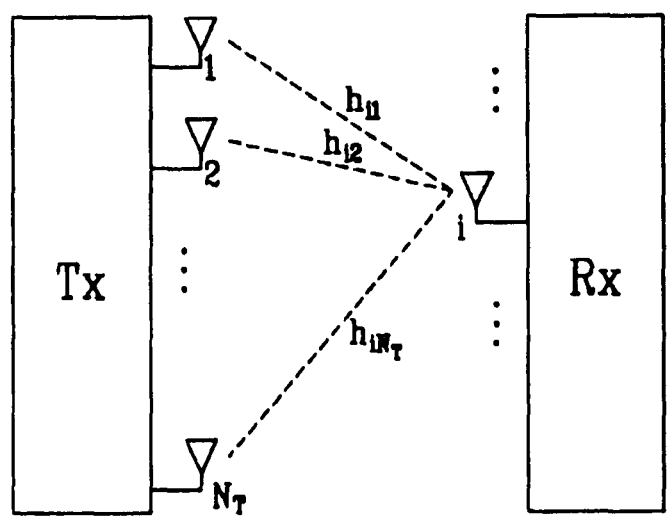
FIG. 2 shows channels from $N_T$ Tx antennas to an Rx antenna (i)
Figure 3A:
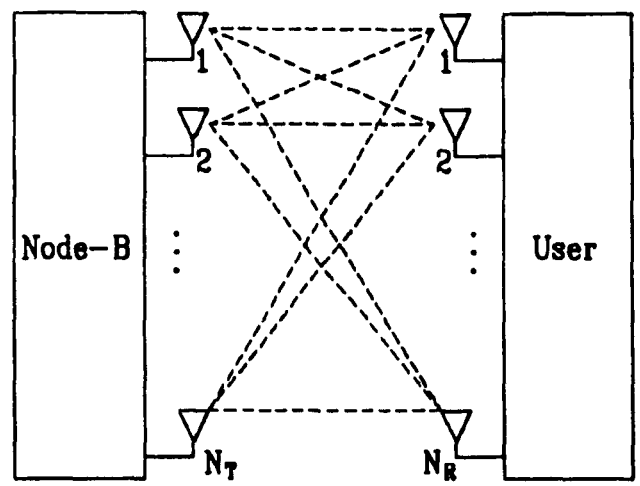
FIG. 3A is a conceptual diagram illustrating a single-user MIMO communication system.
Figure 3B:
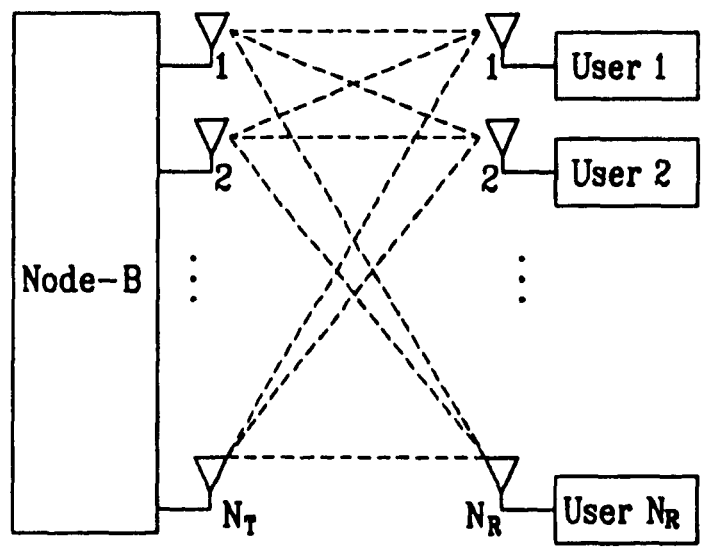
FIG. 3B is a conceptual diagram illustrating a multi-user MIMO communication system.
Figure 4:
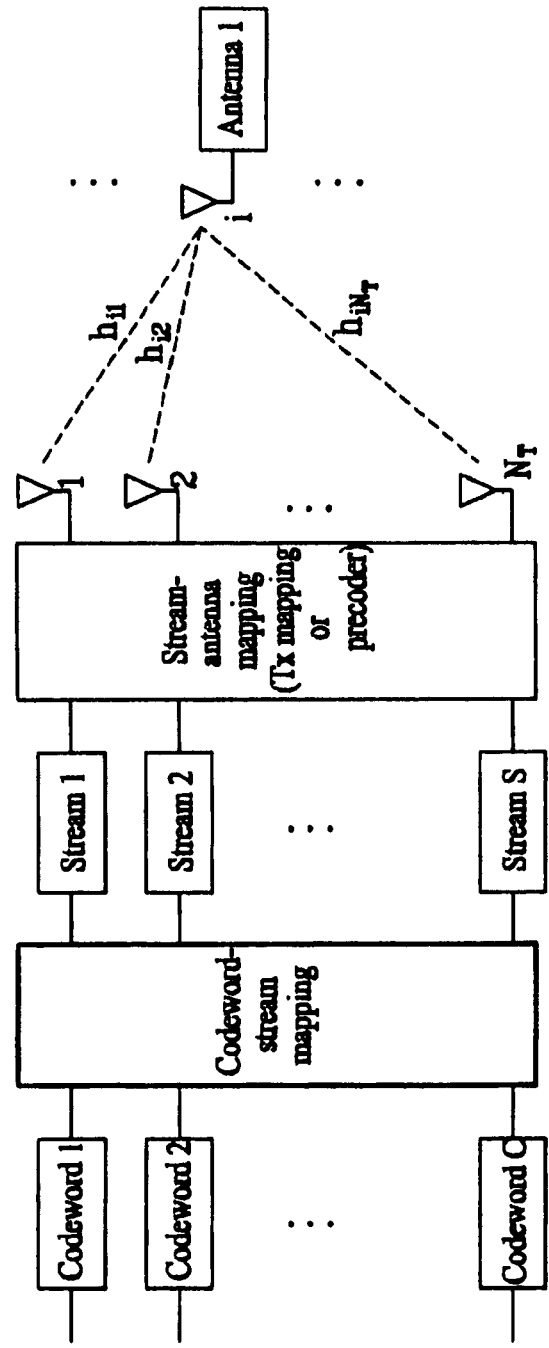
FIG. 4 is a block diagram illustrating the relationship between a codeword and a stream in a MIMO communication system.

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

For the convenience of description and better understanding of the present invention, general structures and devices well known in the art will be omitted or be denoted by a block diagram or a flow chart. Wherever possible, the same reference numbers will be used throughout the drawings to refer to the same or like parts.

The present invention provides a method for rationally limiting the number of all combinations between a codeword and a stream, and reducing a bit number of information indicating the limited number of combinations. For this purpose, the present invention considers the method for rationally limiting the number of all combinations after considering the number of available combinations between a codeword and a stream.

If the number of Tx/Rx antennas is limited as shown in equation 16, a maximum number of streams is limited. And then, if the number of codewords is limited, and a minimum number of streams is also limited.

Examples associated with the above-mentioned case will hereinafter be described.

If the number of Tx/Rx antennas is 4, a maximum number of streams or codewords is 4. Meanwhile, if the number of codewords is limited, a minimum number of available streams is limited. If the number of codewords is 2, the number of streams is equal to or higher than "2" or more. Therefore, if a minimum value of Tx/Rx antennas is 4 and the number of codewords is 2, the number of available streams may be 2, 3, or 4. If a minimum value of Tx/Rx antennas is 2 and the number of codewords is 2, the number of available streams is only "2".

Generally, the number of Tx/Rx antennas is 4 or 2 in commercial cases, and a maximum number of codewords is 2. In recent times, according to the 3GPP LTE, a maximum number ($N_T$) of Tx antennas has been set to 4, a maximum number ($N_R$) of Rx antennas has been set to 4, and a maximum number of allowable multi-codewords has been set to 2, which have been prescribed in 3GPP, R1-063013 (Approved minutes of 3GPP TSG RAN WG1 #46 in Tallinn (Tallinn, Estonia, 28 Aug.~1 Sep. 2006)), and 3GPP, R1-063613 (Approved Report of 3GPP TSG RAN WG1 #46bis (Seoul, Korea, 9~13 Oct. 2006).

Therefore, the following description of the present invention assumes that the number of Tx/Rx antennas is 4 or 2 and the maximum number of codewords is 2, but the scope of the present invention is not limited to this assumption, and can also be applied to other combinations as necessary.

A combination method between a codeword and a stream on the condition that the number of Tx/Rx antennas is 4 or 2 and the maximum number of codewords is 2 will hereinafter be described.

Figure 5A:
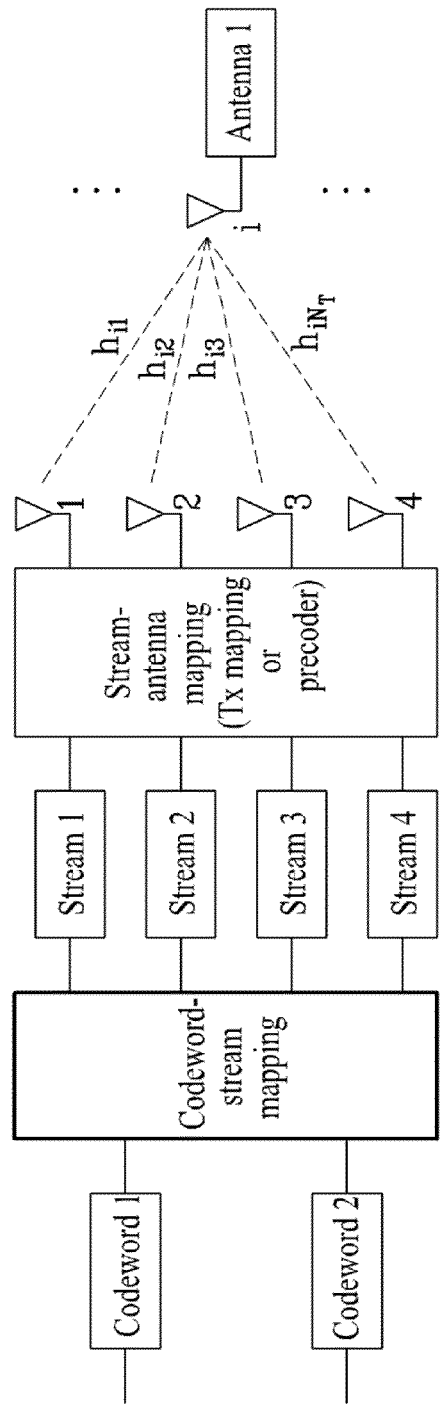
FIG. 5A is a block diagram illustrating a MIMO communication system in which a maximum number of codewords is 2 and a maximum number of antennas is 4 according to the present invention.
Figure 5B:
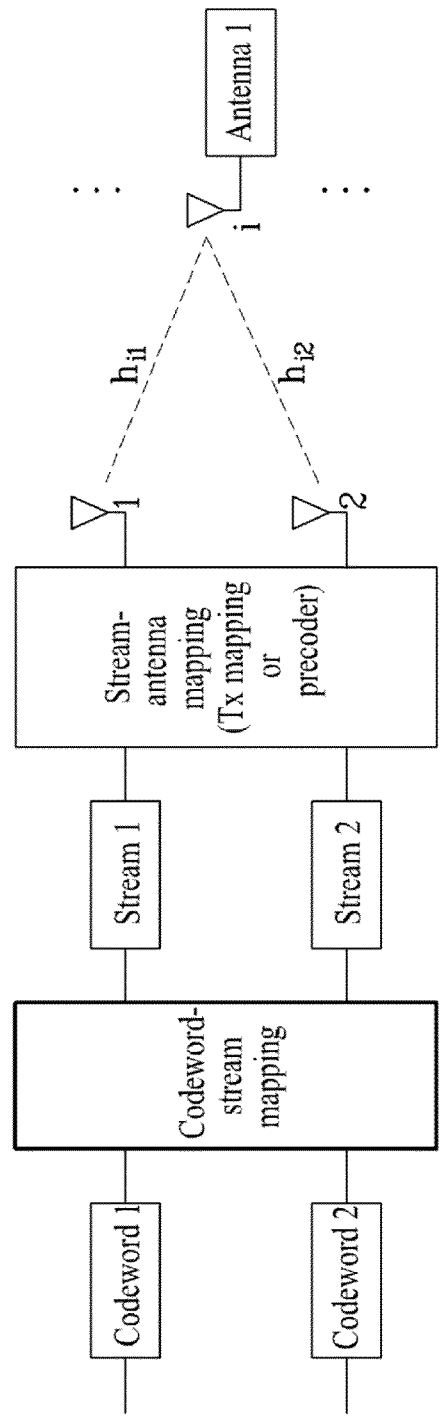
FIG. 5B is a block diagram illustrating a MIMO communication system in which a maximum number of codewords is 2 and a maximum number of antennas is 2 according to the present invention.

FIG. 5A is a block diagram illustrating a MIMO communication system in which a maximum number of codewords is 2 and a maximum number of antennas is 4 according to the present invention. FIG. 5B is a block diagram illustrating a MIMO communication system in which a maximum number of codewords is 2 and a maximum number of antennas is 2 according to the present invention.

Referring to FIG. 5A, if the number of antennas is "4", a maximum number of stream is limited to "4". Therefore, if the number of codewords is "1", the number of available streams is 1, 2, 3, or 4. If the number of codewords is "2", the number of available streams is 2, 3, or 4.

Referring to FIG. 5B, if the number of antennas is "2", a maximum number of streams is limited to "2". Therefore, if the number of codewords is "1", the number of available streams is 1 or 2. If the number of codewords is "2", the number of available streams is set to only "2".

In this case, the present invention pays attention to the combination between the codeword and the stream, instead of the combination between the stream and the antenna. This combination between the codeword and the stream is denoted by a bold-solid line in FIGS. 5A and 5B.

In fact, the combination between the stream and the antenna is differently decided according to categories of a MIMO system. Accordingly, a number of a stream is fixed under a given restriction condition, and only the combination between the codeword and the stream under the same restriction condition will be considered.

If the maximum number of streams is 4 and the maximum number of codewords is 2 as shown in FIG. 5A, the following combination is made, and a detailed description thereof will hereinafter be described.

If the number of antennas is 4, i.e., if the maximum number of stream is 4, and the maximum number of codewords is 2, all combinations between a codeword and a stream are as shown in the following tables 1 and 2:

TABLE 1

| C | S | Combination details | # |
|---|---|---|---|
| 1 | 1 | {Codeword, Stream1} | 4 |
|   |   | {Codeword, Stream2} |   |
|   |   | {Codeword, Stream3} |   |
|   |   | {Codeword, Stream4} |   |
|   | 2 | {Codeword, {Stream1, Stream2}} | 6 |
|   |   | {Codeword, {Stream1, Stream3}} |   |
|   |   | {Codeword, {Stream1, Stream4}} |   |
|   |   | {Codeword, {Stream2, Stream3}} |   |
|   |   | {Codeword, {Stream2, Stream4}} |   |
|   |   | {Codeword, {Stream3, Stream4}} |   |
|   | 3 | {Codeword, {Stream1, Stream2, Stream3}} | 4 |
|   |   | {Codeword, {Stream1, Stream3, Stream4}} |   |
|   |   | {Codeword, {Stream1, Stream2, Stream4}} |   |
|   |   | {Codeword, {Stream2, Stream3, Stream4}} |   |
|   | 4 | {Codeword, {Stream1, Stream2, Stream3, Stream4}} | 1 |
|   |   | Sub sum | 15 |

TABLE 2

| C | S | Combination details | # |
|---|---|---|---|
| 2 | 2 | [{Codeword, Stream1}, {codeword, Stream2}] | 6 |
|   |   | [{Codeword, Stream1}, {Codeword, Stream3}] |   |

TABLE 2-continued

| C | S | Combination details | # |
|---|---|---|---|
|   |   | [{Codeword, Stream1}, {Codeword, Stream4}] |   |
|   |   | [{Codeword, Stream2}, {Codeword, Stream3}] |   |
|   |   | [{Codeword, Stream2}, {Codeword, Stream4}] |   |
|   |   | [{Codeword, Stream3}, {Codeword, Stream4}] |   |
|   | 3 | [{Codeword, Stream1}, {Codeword, {Stream2, Stream3}}] | 12 |
|   |   | [{Codeword, Stream1}, {Codeword, {Stream2, Stream4}}] |   |
|   |   | [{Codeword, Stream1}, {Codeword, {Stream3, Stream4}}] |   |
|   |   | [{Codeword, Stream2}, {Codeword, {Stream1, Stream3}}] |   |
|   |   | [{Codeword, Stream2}, {Codeword, {Stream1, Stream4}}] |   |
|   |   | [{Codeword, Stream2}, {Codeword, {Stream3, Stream4}}] |   |
|   |   | [{Codeword, Stream3}, {Codeword, {Stream1, Stream2}}] |   |
|   |   | [{Codeword, Stream3}, {Codeword, {Stream1, Stream4}}] |   |
|   |   | [{Codeword, Stream3}, {Codeword, {Stream2, Stream4}}] |   |
|   |   | [{Codeword, Stream4}, {Codeword, {Stream1, Stream2}}] |   |
|   |   | [{Codeword, Stream4}, {Codeword, {Stream1, Stream3}}] |   |
|   |   | [{Codeword, Stream4}, {Codeword, {Stream2, Stream3}}] |   |
|   | 4 | [{Codeword, Stream1}, {Codeword, {Stream2, Stream3, Stream4}}] | 4 |
|   |   | [{Codeword, Stream2}, {Codeword, {Stream1, Stream3, Stream4}}] |   |
|   |   | [{Codeword, Stream3}, {Codeword, {Stream1, Stream2, Stream4}}] |   |
|   |   | [{Codeword, Stream4}, {Codeword, {Stream1, Stream2, Stream3}}] |   |
|   |   | [{Codeword, {Stream1, Stream2}}, {Codeword, (Stream3, Stream4)}] | 3 |
|   |   | [{Codeword, {Stream1, Stream3}}, {Codeword, (Stream2, Stream4)}] |   |
|   |   | [{Codeword, {Stream1, Stream4}}, {Codeword, (Stream2, Stream3)}] |   |
|   |   | Sub sum | 25 |

"C" in the table indicates the number of codewords, "S" indicates the number of streams, and "#" indicates the number of occurrences. These symbols will be equally applied to the following tables.

In this case, Table 1 shows examples of individual combinations when the number of codewords is 1, and Table shows examples of individual combinations when the number of codewords is 2.

The order of codewords in the above-mentioned Table or 2 is of no importance. Generally, each codeword includes specific information (e.g., a packet number) capable of discriminating each codeword. Therefore, the present invention considers how many codewords have been transmitted, instead of considering the order of codewords.

If each stream is mapped to an antenna, the antenna mapping operation is changed according to the order of streams. Also, if a precoding is used, the mapping operation is also changed according to the order of precoding in consideration of a corresponding weight vector. Therefore, the stream has a fixed order, so that it must indicate the order of combinations.

As can be seen from Tables 1 and 2, if the number of codewords is 1, the number of combinations is 15. If the number of codewords is 2, the number of combinations is 25. So the total of 40 combinations are required. Therefore, in the case where all combinations are allowed without any restriction on the condition that the maximum number of codewords is 2 and the maximum number of streams is 4, the combinations must be denoted by 6 bits ($2^5=32<40<2^6=64$).

In the meantime, as shown in FIG. 5B, if the maximum number of streams is 2, and the maximum number of codewords is 2, all the combinations between the codeword and the stream are as follows.

As shown in FIG. 5B, if the number of antennas is 2, i.e., if the maximum number of streams is 2, and if the maximum number of codewords is 2, all cases of individual combinations are as shown in the following table 3:

TABLE 3

| C | S | Combination details | # |
|---|---|---|---|
| 1 | 1 | {Codeword, Stream1} | 2 |
|   |   | {Codeword, Stream2} |   |
|   | 2 | {Codeword, {Stream1, Stream2}} | 1 |
| 2 | 2 | [{Codeword, Stream1}, {Codeword, Stream2}] | 1 |
|   |   | Sub sum | 4 |

The above-mentioned Table 3 shows exemplary combinations provided when the number of codewords is 1 or 2.

If the maximum number of streams is 2 and the maximum number of codewords is 2 as shown in Table 3, it can be recognized that a total of 4 codeword-stream combinations are required. In this case, if all the combinations are allowed without any restriction, the 4 codeword-stream combinations must be denoted by 2 bits ($2^1=3 2<4 \leq 2^2=4$). However, this case may be considered to be a subset of the specific case using a maximum of 4 streams shown in Table 1 or 2. Therefore, provided that the present invention can effectively indicate the aforementioned case employing the maximum of 4 streams, it can also be applied to another case employing a maximum of two streams.

In the meantime, in the case where the combination between a codeword and a stream is independently indicated according to the number of antennas, this case is left out of consideration because the number of used bits is a small number. Therefore, the following embodiments of the present invention will disclose a method for effectively indicating all combinations between a codeword and a stream with less number of bits on the basis of a specific case in which a maximum of 4 streams are used. If the combination between the codeword and the stream can be denoted with less number of bits, a transmission efficiency of a control signal can be improved.

If a given limitation between a codeword and a stream is that the maximum number of streams is 4 and the maximum number of codewords is 2, all the combinations between the codeword and the stream are made available, so that a total of 6 bits are required to indicate all the combinations without any restriction. One embodiment of the present invention provides a method for limiting all combinations between the codeword and the stream to reduce the number of information units indicating a used combination from among the combinations.

In order to implement the above-mentioned embodiment, a method for limiting the number of Tx streams via which each codeword is transmitted, and reducing the number of all combinations between the codeword and the stream will hereinafter be described.

Figure 6:
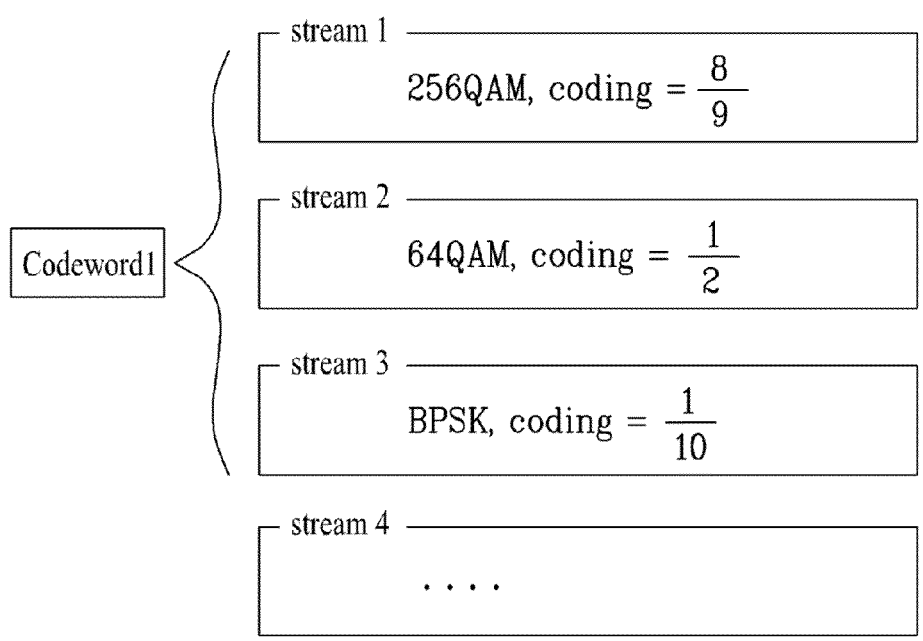
FIG. 6 is a conceptual diagram illustrating a modulation coding set (MCS) provided when a single codeword is transmitted via several streams according to the present invention.

FIG. 6 is a conceptual diagram illustrating a modulation coding set (MCS) provided when a single codeword is transmitted via several streams according to the present invention.

Referring to FIG. 6, if several streams are transmitted via multiple antennas, each stream experiences a variety of channel environments. In this case, if a single codeword (e.g., a codeword 1) is transmitted via several streams (e.g., streams 1~3), different channel environments of the individual streams are immediately averaged during the decoding of a corresponding codeword.

As shown in FIG. 6, if the codeword 1 is transmitted via a first stream 1 based on a 256QAM and an MCS of a coding rate=8/9, a second stream 2 based on a 64QAM and an MCS of a coding rate=1/2, and a third stream 3 based on a BPSK and an MCS of a coding rate=1/10, the codeword 1 has the same effect as in the case in which the codeword 1 is transmitted with an average MCS level of MCS levels of the first to third streams, so that the efficiency may be lower than that of another case in which a codeword requiring high-speed transmission is transmitted via a good stream.

In the light of channel capacity, it is most preferable that each codeword be adaptively transmitted according to channel environments of individual streams, so that it is also preferable that a single codeword be transmitted to each stream. In other words, provided there are four codewords if four streams are used to transmit the four codewords, the optimum condition can be provided.

However, according to the above-mentioned case in which a maximum of 4 streams are used and a maximum of 2 codewords are used, if a maximum of 4 streams must be used under a given condition, each codeword must be transmitted via at least two streams.

Therefore, one embodiment of the present invention limits the number of Tx streams via which each codeword is transmitted, so that a given codeword is transmitted via a minimum number of streams from among all streams. As a result, the number of all combinations between a codeword and a stream is reduced.

In more detail, according to this embodiment in which a maximum of 4 streams are used and a maximum of 2 codewords are used, it is preferable to limit the codeword-stream combinations such that a single codeword should be limited up to two streams.

Then, the combination between the codeword and the stream can be represented by the following tables 4 and 5:

TABLE 4

| C | S | Combination details | # |
|---|---|---|---|
| 1 | 1 | {Codeword, Stream1} | 4 |
|   |   | {Codeword, Stream2} |   |
|   |   | {Codeword, Stream3} |   |
|   |   | {Codeword, Stream4} |   |
|   | 2 | {Codeword, {Stream1, Stream2}} | 6 |
|   |   | {Codeword, {Stream1, Stream3}} |   |
|   |   | {Codeword, {Stream1, Stream4}} |   |
|   |   | {Codeword, {Stream2, Stream3}} |   |
|   |   | {Codeword, {Stream2, Stream4}} |   |
|   |   | {Codeword, {Stream3, Stream4}} |   |
|   |   | Sub sum | 10 |

TABLE 5

| C | S | Combination details | # |
|---|---|---|---|
| 2 | 2 | [{Codeword, Stream1}, {Codeword, Stream2}] | 6 |
|   |   | [{Codeword, Stream1}, {Codeword, Stream3}] |   |
|   |   | [{Codeword, Stream1}, {Codeword, Stream4}] |   |
|   |   | [{Codeword, Stream2}, {Codeword, Stream3}] |   |
|   |   | [{Codeword, Stream2}, {Codeword, Stream4}] |   |
|   |   | [{Codeword, Stream3}, {Codeword, Stream4}] |   |
|   | 3 | [{Codeword, Stream1}, {Codeword, (Stream2, Stream3)}] | 12 |
|   |   | [{Codeword, Stream1}, {Codeword, (Stream2, Stream4)}] |   |
|   |   | [{Codeword, Stream1}, {Codeword, (Stream3, Stream4)}] |   |
|   |   | [{Codeword, Stream2}, {Codeword, (Stream1, Stream3)}] |   |
|   |   | [{Codeword, Stream2}, {Codeword, (Stream1, Stream4)}] |   |
|   |   | [{Codeword, Stream2}, {Codeword, (Stream3, Stream4)}] |   |
|   |   | [{Codeword, Stream3}, {Codeword, (Stream1, Stream2)}] |   |
|   |   | [{Codeword, Stream3}, {Codeword, (Stream1, Stream4)}] |   |
|   |   | [{Codeword, Stream3}, {Codeword, (Stream2, Stream4)}] |   |
|   |   | [{Codeword, Stream4}, {Codeword, (Stream1, Stream2)}] |   |
|   |   | [{Codeword, Stream4}, {Codeword, (Stream1, Stream3)}] |   |
|   |   | [{Codeword, Stream4}, {Codeword, (Stream2, Stream3)}] |   |

TABLE 5-continued

| C | S | Combination details | # |
|---|---|---|---|
|   | 4 | [{Codeword, (Stream1, Stream2)}, {Codeword, (Stream3, Stream4)}]<br>[{Codeword, (Stream1, Stream3)}, {Codeword, (Stream2, Stream4)}]<br>[{Codeword, (Stream1, Stream4)}, {Codeword, (Stream2, Stream3)}] | 3 |
|   |   | Sub sum | 21 |

The above-mentioned Table 4 shows an exemplary combination between a codeword and a stream when the number of codewords is 1. The above-mentioned table 5 shows an exemplary combination between a codeword and a stream when the number of codewords is 2.

As can be seen from Tables 4 and 5, provided that a single codeword is transmitted via a maximum of 2 streams according to one embodiment of the present invention, the number of combinations is 10 when a maximum number of codewords is 1, and the number of combinations is 21 when a maximum number of codewords is 2, so that a total of 31 combinations are required. The 31 combinations can be denoted by 5 bits ($2^4=16<31<2^5=32$).

In the meantime, a more preferred embodiment of the present invention limits the number of streams used for transmitting a single codeword, and at the same time removes a specific combination having many more numbers of cases than the possibility to be used, so that the number of all combinations can be further reduced, and a detailed description thereof will hereinafter be described.

In more detail, one embodiment of the present invention further assumes a specific condition which excludes a specific case in which three streams are adapted to transmit the codeword from all combinations shown in Tables 4 and 5.

Although the above-mentioned case in which three streams are used corresponds to a channel rank of 3, the channel rank of 3 may be changed to another rank, so that the changed rank may be indicated. The reason why the aforementioned case in which three streams from among several streams are used is excluded is that the number of combinations made in the case of three streams is 12 as shown in Table 5 so that 12 combinations occupy about 38.7% of all combinations, but the possibility of selecting the case in which three streams are used is about 20% according to the simulation result.

Therefore, it is preferable that the case having many more combinations than the possibility to be selected for transmission be excluded from all the cases. As a result, the above-mentioned embodiment of the present invention removes the combination having many numbers of cases from all the combinations between a codeword and a stream, so that the number of bits of control information is effectively reduced.

A detailed example associated with the above-mentioned description can be represented by the following Table 6:

TABLE 6

| C | S | Combination details | # |
|---|---|---|---|
| 1 | 1 | {Codeword, Stream1}<br>{Codeword, Stream2}<br>{Codeword, Stream3}<br>{Codeword, Stream4} | 4 |
|   | 2 | {Codeword, {Stream1, Stream2}}<br>{Codeword, {Stream1, Stream3}}<br>{Codeword, {Stream1, Stream4}}<br>{Codeword, {Stream2, Stream3}}<br>{Codeword, {Stream2, Stream4}}<br>{Codeword, {Stream3, Stream4}} | 6 |

TABLE 6-continued

| C | S | Combination details | # |
|---|---|---|---|
| 2 | 2 | [{Codeword, Stream1}, {Codeword, Stream2}]<br>[{Codeword, Stream1}, {Codeword, Stream3}]<br>[{Codeword, Stream1}, {Codeword, Stream4}]<br>[{Codeword, Stream2}, {Codeword, Stream3}]<br>[{Codeword, Stream2}, {Codeword, Stream4}]<br>[{Codeword, Stream3}, {Codeword, Stream4}] | 6 |
|   | 4 | [{Codeword, (Stream1, Stream2)}, {Codeword, (Stream3, Stream4)}]<br>[{Codeword, (Stream1, Stream3)}, {Codeword, (Stream2, Stream4)}]<br>[{Codeword, (Stream1, Stream4)}, {Codeword, (Stream2, Stream3)}] | 3 |
|   |   | Sub sum | 19 |

According to the embodiment of the present invention shown in Table 6, provided that a specific combination having many more numbers of cases (i.e., the case in which three streams are used) than the possibility of use is removed, the number of combinations between a codeword and a stream is 10 when a maximum number of codewords is 1, and the number of combinations between a codeword and a stream is 9 when a maximum number of codewords is 2, so that a total of 19 combinations are required.

Therefore, an embodiment in which a single codeword is transmitted via a maximum of 2 streams and the case employing three streams is excluded can be denoted by 5 bits ($2^4=16<19<2^5=32$). In this case, the number of bits of control information indicating all combinations may be inferior to that of Table 4 or 5, however, if the above-mentioned case is applied to another example, all combinations can be denoted with less number of bits.

In the meantime, another embodiment of the present invention limits the number of streams used for transmitting a single codeword, and at the same time removes a specific combination having many more numbers of cases than the possibility of to be used. And, if two streams are used to improve a reception performance, the above-mentioned embodiment of the present invention removes a combination in which a single codeword is transmitted via the two streams, so that it can further reduce the number of all combinations between a codeword and a stream. A detailed description of the above-mentioned embodiment will hereinafter be described.

Figure 7:
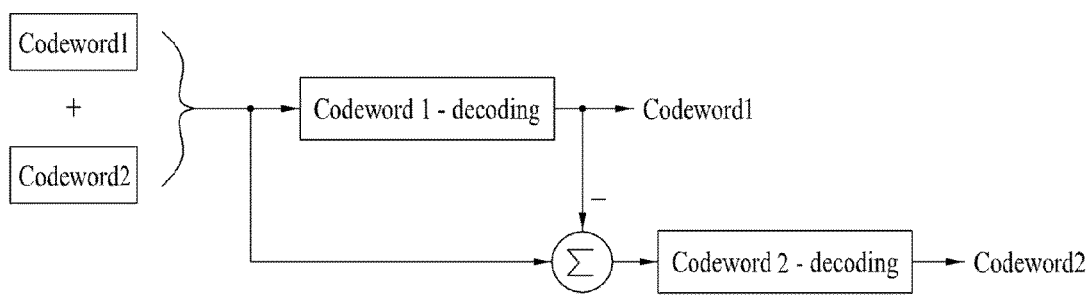
FIG. 7 is a conceptual diagram illustrating a successive interference cancellation (SIC) concept performed in a receiver so as to improve a decoding performance of a codeword according to the present invention.

FIG. 7 is a conceptual diagram illustrating a successive interference cancellation (SIC) concept performed in a receiver so as to improve a decoding performance of a codeword according to the present invention.

If several codewords are received in a receiver, the receiver may perform the SIC to improve a decoding performance of a Rx signal. If the receiver simultaneously receives a codeword 1 and a codeword 2 as shown in FIG. 7, it firstly decodes the codeword 1, removes all signals associated with the decoded codeword 1 from all Rx signals, and decodes the codeword 2 using the remaining signals, so that a decoding performance of all the signals can be improved.

In this case, in order to perform the above-mentioned SIC, there is a need for several codewords to be transmitted as shown in FIG. 7. If a single codeword is distributed to several streams and be then transmitted although several streams are received, the receiver is unable to perform the SIC shown in FIG. 7.

Figure 8A:
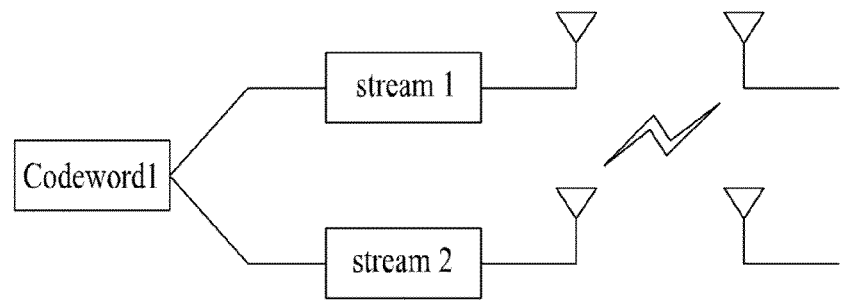
FIG. 8A shows a specific case in which a single codeword is transmitted via two streams and it is determined whether the SIC is performed in this case.
Figure 8B:
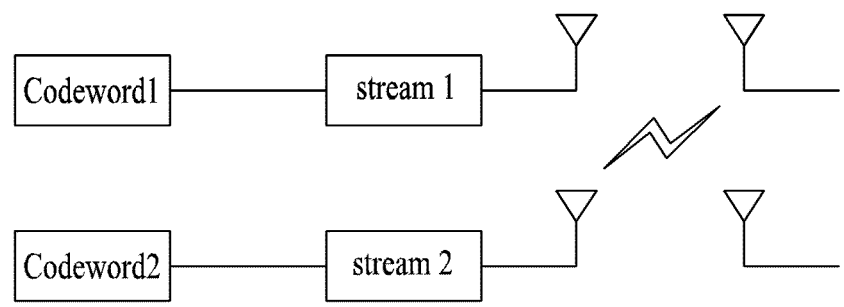
FIG. 8B shows a specific case in which two codewords are transmitted via two streams, respectively, and it is determined whether the SIC is performed in this case.

FIG. 8A shows a specific case in which a single codeword is transmitted via two streams and it is determined whether the SIC is performed in this case. FIG. 8B shows a specific case in which two codewords are transmitted via two streams, respectively, and it is determined whether the SIC is performed in this case.

Referring to FIG. 8A, if a single codeword is transmitted via two streams, an independent codeword is not contained in each of two Rx streams, so that the SIC cannot be applied to the case of FIG. 8A.

Referring to FIG. 8B, if two codewords are transmitted via two streams, the SIC shown in FIG. 7 can be applied to a Rx signal transmitted via each stream, so that the decoding performance of the Rx signal can be improved.

Therefore, another embodiment of the present invention limits the number of streams used for transmitting a single codeword as shown in Table 6 (e.g., 2 streams or below 2), and removes a specific combination having many more numbers of cases than the possibility of use (e.g., the combination in which three streams are allowed is removed). And, if two streams are used to further limit the number of bits indicating all codeword-stream combinations, the above-mentioned embodiment of the present invention removes a combination (shown in FIG. 8A) in which a single codeword is transmitted via two streams, so that a receiver can improve a decoding performance of a Rx signal using the SIC.

In this case, the above-mentioned example has no combination in which the number of streams is 3. If the number of streams is 1, 2 or 4, only one codeword-stream combination exists as shown in the following table 7:

TABLE 7

| C | S | Combination details | # |
|---|---|---|---|
| 1 | 1 | {Codeword, Stream1}<br>{Codeword, Stream2}<br>{Codeword, Stream3}<br>{Codeword, Stream4} | 4 |
| 2 | 2 | [{Codeword, Stream1}, {Codeword, Stream2}]<br>[{Codeword, Stream1}, {Codeword, Stream3}]<br>[{Codeword, Stream1}, {Codeword, Stream4}]<br>[{Codeword, Stream2}, {Codeword, Stream3}]<br>[{Codeword, Stream2}, {Codeword, Stream4}]<br>[{Codeword, Stream3}, {Codeword, Stream4}] | 6 |
|  | 4 | [{Codeword, (Stream1, Stream2)}, {Codeword, (Stream3, Stream4)}]<br>[{Codeword, (Stream1, Stream3)}, {Codeword, (Stream2, Stream4)}]<br>[{Codeword, (Stream1, Stream4)}, {Codeword, (Stream2, Stream3)}] | 3 |
|  |  | Sub sum | 13 |

With reference to Table 7, the number of combinations is 4 when a maximum number of codewords is 1, and the number of combinations is 9 when a maximum number of codewords is 2, so that a total of 13 combinations are required. Therefore, in the case of this example according to this embodiment, all combinations between a codeword and a stream can be denoted by 4 bits ($2^3=8<13<2^4=16$). Therefore, in the light of the number of bits indicating all the combinations, the method of Table 7 is better than the method of Table 6.

In the meantime, the above-mentioned embodiments of the present invention have considered a channel capacity, an efficiency of combination indication, and an Rx performance improvement based on the SIC in order to effectively reduce the number of all combinations between a codeword and a stream.

In the case of considering only the efficiency in reduction of the number of all codeword-stream combinations, if a receiver of an HARQ communication system generates a retransmission request, an unexpected problem may occur in properly dealing with the retransmission request.

Therefore, another embodiment of the present invention limits the number of all codeword-stream combinations by removing a specific combination having many more numbers of cases than the possibility of to be used from all the combinations, and maintains a combination available for a retransmission scheme such as a HARQ. A detailed description of the above-mentioned embodiment will hereinafter be described.

Figure 9:
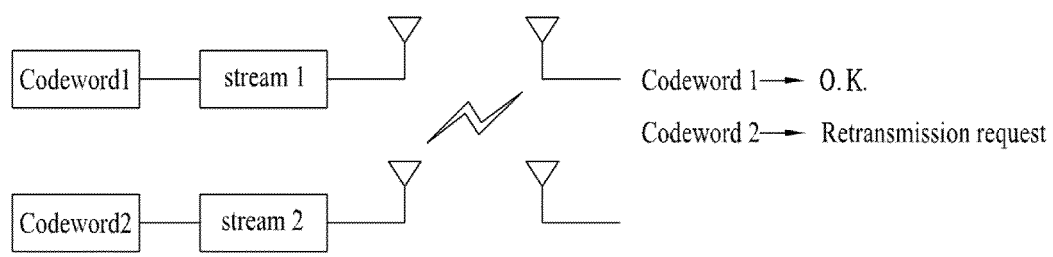
FIG. 9 shows that two codewords are transmitted via two streams, one codeword is successfully received and the other codeword fails to be received and a retransmission of the failed codeword is requested.

FIG. 9 shows that two codewords are transmitted via two streams, one codeword is successfully received and the other codeword fails to be received and a retransmission of the failed codeword is requested.

Referring to FIG. 9, if two codewords are transmitted via two streams during a first transmission, it is assumed that a codeword 1 between the two codewords is successfully received, and a codeword 2 corresponding to the other codeword fails to be received so that a NACK signal is transmitted to a transmitter. In this case, if the "Chase Combining" scheme is applied to retransmission, it is preferable that the codeword 2 be retransmitted via two streams.

However, the above-mentioned combination is not contained in the combinations shown in Table 7. Therefore, one embodiment of the present invention removes a specific combination having many more numbers of cases than the possibility to be used from all the combinations (e.g., a combination with three streams), and maintains the above-mentioned combination available for the retransmission scheme such as the HARQ. The above-mentioned embodiment of the present invention can be represented by the following tables 8 and 9:

TABLE 8

| C | S | Combination details | # |
|---|---|---|---|
| 1 | 1 | {Codeword, Stream1}<br>{Codeword, Stream2}<br>{Codeword, Stream3}<br>{Codeword, Stream4} | 4 |
|  | 2 | {Codeword, (Stream1, Stream2)}<br>{Codeword, (Stream1, Stream3)}<br>{Codeword, (Stream1, Stream4)}<br>{Codeword, (Stream2, Stream3)}<br>{Codeword, (Stream2, Stream4)}<br>{Codeword, (Stream3, Stream4)} | 6 |
|  | 4 | {Codeword, (Stream1, Stream2, Stream3, Stream4)} | 1 |
|  |  | Sub sum | 11 |

TABLE 9

| C | S | Combination details | # |
|---|---|---|---|
| 2 | 2 | [{Codeword, Stream1}, {Codeword, Stream2}]<br>[{Codeword, Stream1}, {Codeword, Stream3}]<br>[{Codeword, Stream1}, {Codeword, Stream4}]<br>[{Codeword, Stream2}, {Codeword, Stream3}]<br>[{Codeword, Stream2}, {Codeword, Stream4}]<br>[{Codeword, Stream3}, {Codeword, Stream4}] | 6 |
|  | 4 | [{Codeword, (Stream1, Stream2)}, {Codeword, (Stream3, Stream4)}]<br>[{Codeword, (Stream1, Stream3)}, {Codeword, (Stream2, Stream4)}]<br>[{Codeword, (Stream1, Stream4)}, {Codeword, (Stream2, Stream3)}] | 3 |
|  |  | Sub sum | 9 |

The above-mentioned Table 8 shows a combination between a codeword and a stream when a single codeword is used. The above-mentioned Table 9 shows a combination between a codeword and a stream when two codewords are used.

As can be seen from Tables 8 and 9, a specific combination having many more numbers of cases than the possibility of use (i.e., a specific case with three streams) is excluded from all combinations of the above-mentioned example in which a maximum of 4 streams are used and a maximum of 2 codewords are used. If a specific combination in which a single codeword capable of being used for retransmission is transmitted via two or four streams, and a combination in which each of two codewords are transmitted via one or two streams are maintained, 11 combinations are made available for the case in which a single codeword is used, and 9 combinations are made available for the other case in which two codewords are used, so that a total of 20 combinations are made available. Therefore, all the combinations can be denoted by bits ($2^4$=16<20<$2^5$=32).

5 bits are required as a bit number for indicating the combination between a codeword and a stream shown in Tables 8 and 9, so that the number of combinations for use in a specific case can be further limited, resulting in reduction of the number of corresponding combinations. The following table 10 shows that a combination in which two codewords are transmitted via two streams is further limited.

TABLE 10

| C | S | Combination details | # |
|---|---|---|---|
| 1 | 1 | {Codeword, Stream1} <br> {Codeword, Stream2} <br> {Codeword, Stream3} <br> {Codeword, Stream4} | 4 |
|   | 2 | {Codeword, (Stream1, Stream2)} <br> {Codeword, (Stream1, Stream3)} <br> {Codeword, (Stream1, Stream4)} <br> {Codeword, (Stream2, Stream3)} <br> {Codeword, (Stream2, Stream4)} <br> {Codeword, (Stream3, Stream4)} | 6 |
|   | 4 | {Codeword, (Stream1, Stream2, Stream3, Stream4)} | 1 |
| 2 | 4 | [{Codeword, (Stream1, Stream2)}, {Codeword, (Stream3, Stream4)}] <br> [{Codeword, (Stream1, Stream3)}, {Codeword, (Stream2, Stream4)}] <br> [{Codeword, (Stream1, Stream4)}, {Codeword, (Stream2, Stream3)}] | 3 |
|   |   | Sub sum | 14 |

With reference to Table 10, the number of combinations is 11 when a maximum number of codewords is 1, and the number of combinations is 3 when a maximum number of codewords is 2, so that a total of 14 combinations are required. Therefore, the above-mentioned case in which the case of three streams is excluded, the combination in which retransmission is considered is maintained, and two codewords are transmitted via two streams can be denoted by control information composed of 4 bits ($2^3$=8<13<$2^4$=16).

In the meantime, according to detailed embodiments of the present invention concerning Tables 3~10, the number of bits (i.e., a bit number) of control information required for indicating all combinations between a codeword and a stream is determined to be a bit number capable of indicating the power of 2 higher than the number of all combinations. In this case, the number of codeword-stream combinations capable of being denoted by a bit number of required control information is generally higher than the number of all combinations to which a predetermined restriction is applied.

Therefore, in association with Tables 3~10, another embodiment of the present invention adds additional combinations corresponding to a difference (e.g., 3 combinations in Table 10) between the number of combinations (e.g., 16 combinations in Table 10), denoted by the number of information pieces (e.g., 4 bits in Table 10) indicating all the limited combinations, and the number of all the limited combinations (e.g., 13 combinations in Table 10) to all the limited combinations, and a detailed description thereof will hereinafter be described.

The cases shown in Tables 6~10 indicate the cases in which the combination for the case that the number of cases is higher than the possibility to be used, such as the case when the number of streams is "3", is excluded, so that the number of bits required for indicating all combinations can be greatly reduced. However, the above-mentioned cases shown in Tables 6~10 are unable to indicate the case in which three streams are used whereas they are able to reduce the number of combinations, resulting in the occurrence of an unexpected problem.

In the meantime, there is a difference between the maximum number of combinations denoted by the number of bits required for indicating all combinations and the number of really-used combinations. In other words, it is assumed that the number of real combinations is M and N bits are required for indicating the combinations according to an equation of $2^{N-1}$<M<$2^N$. As a result, a predetermined number of combinations corresponding to a difference ($2^N$–M) between the number ($2^N$) of maximum-expressible combinations denoted by N bits and the number (M) of real combinations can be further added.

Therefore, one embodiment of the present invention adds specific combinations in which three streams are used. The number of specific combinations corresponds to a difference between the number of combinations, denoted by a bit number required for indicating all combinations, and the number of all real combinations. So, this embodiment provides a method for using three streams without increasing the number of bits required for indicating all combinations.

In more detail, Table 7 may indicate all combinations (i.e., 13 combinations) limited by 4-bit control information. In this case, a specific combination employing three streams corresponding to a difference between 16 combinations capable of being denoted by control information and 13 combinations may be added to the combinations of Table 7. In this way, the case of Table 10 may further include two combinations, each of which uses three streams.

However, the number of combinations occupied by the case employing three streams is higher than the number of combinations capable of being added. In other words, the number of cases, each of which uses a single codeword, from among several cases each of which uses two streams, is 4, and the number of other cases, each of which uses two codewords is 12. Therefore, the combination addition is selectively performed on some of the above-mentioned cases.

For example, three combinations can be added to Table 7, so that it is assumed that only successive numbers are selected from among three-stream combinations. In other words, it is assumed that the order of "Stream1, Stream2, and Stream3", "Stream2, Stream3, and Stream4", or "Stream3, Stream4, and Stream1" is selected. In fact, the stream numbers are fixed in ascending numerical order, so that the order "Stream3, Stream4, and Stream1" may be considered to be "Stream1, Stream3, and Stream4" for the convenience of description.

If a combination employing a single codeword is added, the added combination may be {Codeword, (Stream1, Stream2, Stream3)}, {Codeword, (Stream2, Stream3, Stream4)} or {Codeword, (Stream1, Stream3, Stream4)}, as represented by the following table 11:

TABLE 11

| C | S | Combination details | # |
|---|---|---|---|
| 1 | 1 | {Codeword, Stream1} | 4 |
|   |   | {Codeword, Stream2} |   |
|   |   | {Codeword, Stream3} |   |
|   |   | {Codeword, Stream4} |   |
|   | 3 | {Codeword, (Stream1, Stream2, Stream3)} | 3 |
|   |   | {Codeword, (Stream2, Stream3, Stream4)} |   |
|   |   | {Codeword, (Stream1, Stream3, Stream4)} |   |
| 2 | 2 | [{Codeword, Stream1}, {Codeword, Stream2}] | 6 |
|   |   | [{Codeword, Stream1}, {Codeword, Stream3}] |   |
|   |   | [{Codeword, Stream1}, {Codeword, Stream4}] |   |
|   |   | [{Codeword, Stream2}, {Codeword, Stream3}] |   |
|   |   | [{Codeword, Stream2}, {Codeword, Stream4}] |   |
|   |   | [{Codeword, Stream3}, {Codeword, Stream4}] |   |
|   | 4 | [{Codeword, (Stream1, Stream2)}, {Codeword, (Stream3, Stream4)}] | 3 |
|   |   | [{Codeword, (Stream1, Stream3)}, {Codeword, (Stream2, Stream4)}] |   |
|   |   | [{Codeword, (Stream1, Stream4)}, {Codeword, (Stream2, Stream3)}] |   |
| Sub sum | | | 14 |

In Table 11, the added combination is denoted by a shaded part.

And, if a combination employing two codewords is added, the added combination may be [{Codeword, Stream1}, {Codeword, (Stream2, Stream3)}], [{Codeword, Stream2}, {Codeword, (Stream3, Stream4)}], and [{Codeword, Stream1}, {Codeword, (Stream3, Stream4)}], as represented by the following table 12:

TABLE 12

| C | S | Combination details | # |
|---|---|---|---|
| 1 | 1 | {Codeword, Stream1} | 4 |
|   |   | {Codeword, Stream2} |   |
|   |   | {Codeword, Stream3} |   |
|   |   | {Codeword, Stream4} |   |
| 2 | 2 | [{Codeword, Stream1}, {Codeword, Stream2}] | 6 |
|   |   | [{Codeword, Stream1}, {Codeword, Stream3}] |   |
|   |   | [{Codeword, Stream1}, {Codeword, Stream4}] |   |
|   |   | [{Codeword, Stream2}, {Codeword, Stream3}] |   |
|   |   | [{Codeword, Stream2}, {Codeword, Stream4}] |   |
|   |   | [{Codeword, Stream3}, {Codeword, Stream4}] |   |
|   | 3 | [{Codeword, Stream1}, {Codeword, (Stream2, Stream3)}] | 3 |
|   |   | [{Codeword, Stream2}, {Codeword, (Stream3, Stream4)}] |   |
|   |   | [{Codeword, Stream1}, {Codeword, (Stream3, Stream4)}] |   |
|   | 4 | [{Codeword, (Stream1, Stream2)}, {Codeword, (Stream3, Stream4)}] | 3 |
|   |   | [{Codeword, (Stream1, Stream3)}, {Codeword, (Stream2, Stream4)}] |   |
|   |   | [{Codeword, (Stream1, Stream4)}, {Codeword, (Stream2, Stream3)}] |   |
| Sub sum | | | 14 |

In Table 12, the added combinations are denoted by shaded parts.

In the meantime, for another example, two combinations can be added to Table 10, so that it is assumed that only successive numbers are selected from among three-stream combinations. In other words, it is assumed that the orders of "Stream1, Stream2, and Stream3", and "Stream2, Stream3, and Stream4" are selected. In the case of adding a specific case of a combination employing a single codeword, {Codeword, (Stream1, Stream2, Stream3)}, and {Codeword, (Stream2, Stream3, Stream4)} may be added. In the case of adding another case of a combination employing two codewords, [{Codeword, Stream1}, {Codeword, (Stream2, Stream3)}] and [{Codeword, Stream2}, {Codeword, (Stream3, Stream4)}] may be added. The above-mentioned combinations can be shown in the following Tables 13 and 14:

TABLE 13

| C | S | Combination details | # |
|---|---|---|---|
| 1 | 1 | {Codeword, Stream1} | 4 |
|   |   | {Codeword, Stream2} |   |
|   |   | {Codeword, Stream3} |   |
|   |   | {Codeword, Stream4} |   |
|   | 2 | {Codeword, (Stream1, Stream2)} | 6 |
|   |   | {Codeword, (Stream1, Stream3)} |   |
|   |   | {Codeword, (Stream1, Stream4)} |   |
|   |   | {Codeword, (Stream2, Stream3)} |   |
|   |   | {Codeword, (Stream2, Stream4)} |   |
|   |   | {Codeword, (Stream3, Stream4)} |   |
|   | 3 | {Codeword, (Stream1, Stream2, Stream3)} | 3 |
|   |   | {Codeword, (Stream2, Stream3, Stream4)} |   |
|   |   | {Codeword, (Stream1, Stream3, Stream4)} |   |
|   | 4 | {Codeword, (Stream1, Stream2, Stream3, Stream4)} | 1 |
| 2 | 4 | [{Codeword, (Stream1, Stream2)}, {Codeword, (Stream3, Stream4)}] | 3 |
|   |   | [{Codeword, (Stream1, Stream3)}, {Codeword, (Stream2, Stream4)}] |   |
|   |   | [{Codeword, (Stream1, Stream4)}, {Codeword, (Stream2, Stream3)}] |   |
| Sub sum | | | 16 |

TABLE 14

| C | S | Combination details | # |
|---|---|---|---|
| 1 | 1 | {Codeword, Stream1} | 4 |
|   |   | {Codeword, Stream2} |   |
|   |   | {Codeword, Stream3} |   |
|   |   | {Codeword, Stream4} |   |
|   | 2 | {Codeword, (Stream1, Stream2)} | 6 |
|   |   | {Codeword, (Stream1, Stream3)} |   |
|   |   | {Codeword, (Stream1, Stream4)} |   |
|   |   | {Codeword, (Stream2, Stream3)} |   |
|   |   | {Codeword, (Stream2, Stream4)} |   |
|   |   | {Codeword, (Stream3, Stream4)} |   |
|   | 4 | {Codeword, (Stream1, Stream2, Stream3, Stream4)} | 1 |
| 2 | 3 | [{Codeword, Stream1}, {Codeword, (Stream2, Stream3)}] | 2 |
|   |   | [{Codeword, Stream2}, {Codeword, (Stream3, Stream4)}] |   |
|   | 4 | [{Codeword, (Stream1, Stream2)}, {Codeword, (Stream3, Stream4)}] | 3 |
|   |   | [{Codeword, (Stream1, Stream3)}, {Codeword, (Stream2, Stream4)}] |   |
|   |   | [{Codeword, (Stream1, Stream4)}, {Codeword, (Stream2, Stream3)}] |   |
| Sub sum | | | 16 |

In Tables 13 and 14, the added combinations are denoted by shaded parts.

In the meantime, another embodiment of the present invention considers a grouping of streams to be a rational method for limiting the number of combinations between a codeword and a stream, and a detailed description thereof will hereinafter be described.

If four antennas are used for the MIMO technology, the individual antennas must configure unique channel environments independent of each other in order to implement an optimum status. For this purpose, the individual antennas are physically spaced apart from each other.

However, the streams are grouped by various reasons when the antennas are actually used, so that antennas contained in each group may correlate with each other.

Figure 10A:
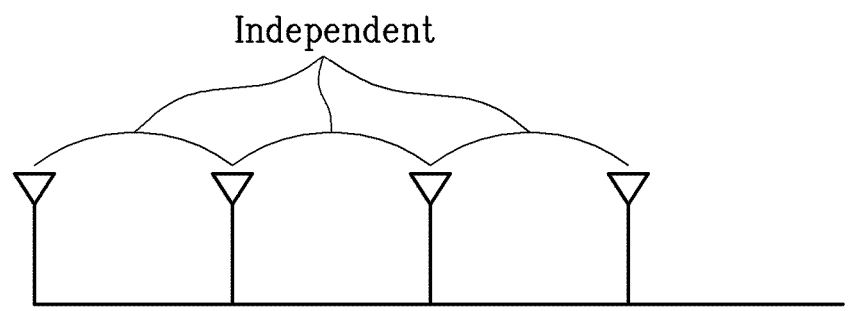
FIGS. 10A~10C show a variety of methods for grouping multiple antennas in various ways.
Figure 10B:
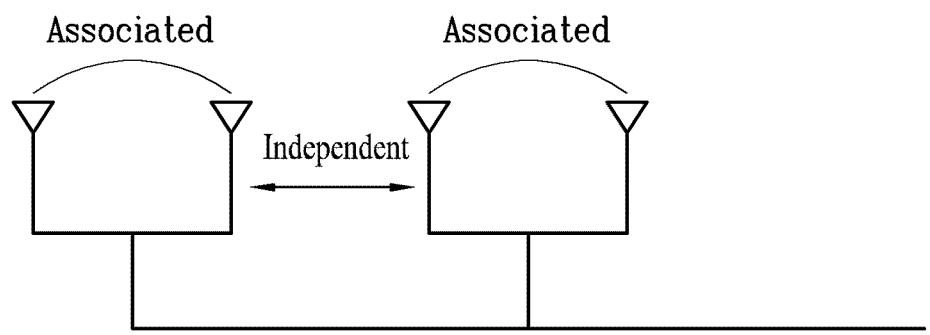
Figure 10C:
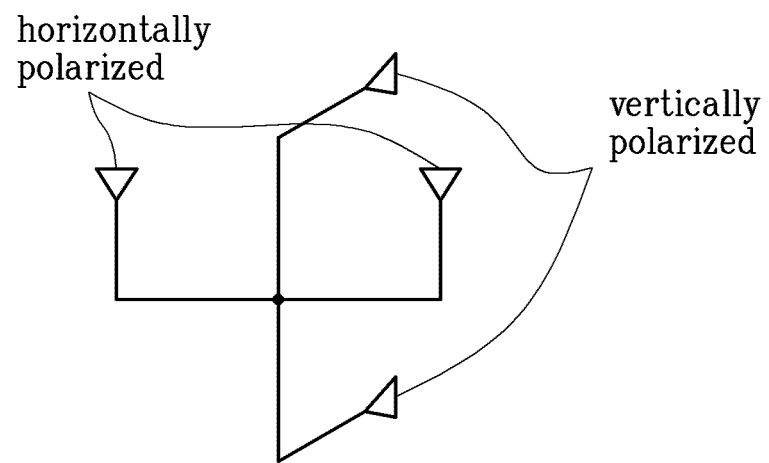

FIGS. 10A~10C show a variety of methods for grouping multiple antennas in various ways.

FIG. 10A shows an ideal case in which four antennas configure independent channels without any grouping. However, four antennas are spaced apart from each other by a predetermined distance, so that a transmitter or a receiver may have insufficient space to configure independent channels. Specifically, it is difficult for the structure of FIG. 10A to be applied to a mobile terminal.

In order to solve the above-mentioned problem, the structure of FIG. 10B has been widely used. In this structure of FIG. 10B, two antennas are grouped, antennas of each group have related channels, and other antennas of different groups have independent channels. And, another structure of FIG. 10C may also be used to solve the above-mentioned problem. In this structure of FIG. 10C, two antennas are grouped by a cross polarized diversity (CPD) scheme, antennas of one group are horizontally polarized, and antennas of the other group are vertically polarized.

In another antenna-grouping example, if a total of antennas are used, channel conditions of two antennas are stably measured, and channel conditions of the remaining two antennas are unstable so that an error frequently occurs in the remaining two antennas. Under this situation, antennas having a stable channel condition are grouped, and the other antennas having an unstable channel condition are grouped, so that the four antennas are grouped two by two.

As described above, if the antennas are grouped and limited, streams corresponding to the antennas are also limited, and it can be recognized that predetermined streams are grouped.

Therefore, one embodiment of the present invention provides a method for limiting the number of all combinations between a codeword and a stream. In more detail, the above-mentioned embodiment limits the number of streams, each of which transmits a single codeword, as shown in Tables 4 and 5, and groups streams. And, if a single codeword is transmitted via streams corresponding to the number of streams contained in a single group, the above-mentioned embodiment controls the single codeword to be transmitted via the streams contained in a single group, so that the number of combinations between a codeword and a stream is reduced. A detailed description of the above-mentioned embodiment will hereinafter be described.

In a detailed example, it is assumed that a first stream 1 and a second stream 2 form a single group, and a third stream 3 and a fourth stream 4 form another group. In this case, according to one embodiment of the present invention, if a single codeword is transmitted via two streams, this codeword may be allocated to only a single group, and all the limited combinations are shown in the following Table 15:

TABLE 15

| C | S | Combination details | # |
|---|---|---|---|
| 1 | 1 | {Codeword, Stream1}<br>{Codeword, Stream2}<br>{Codeword, Stream3}<br>{Codeword, Stream4} | 4 |
|   | 2 | {Codeword, (Stream1, Stream2)}<br>{Codeword, (Stream3, Stream4)} | 2 |
| 2 | 2 | [{Codeword, Stream1}, {Codeword, Stream2}]<br>[{Codeword, Stream1}, {Codeword, Stream3}]<br>[{Codeword, Stream1}, {Codeword, Stream4}] | 6 |

TABLE 15-continued

| C | S | Combination details | # |
|---|---|---|---|
|   |   | [{Codeword, Stream2}, {Codeword, Stream3}]<br>[{Codeword, Stream2}, {Codeword, Stream4}]<br>[{Codeword, Stream3}, {Codeword, Stream4}] | |
|   | 3 | [{Codeword, Stream1}, {Codeword, (Stream3, Stream4)}]<br>[{Codeword, Stream2}, {Codeword, (Stream3, Stream4)}]<br>[{Codeword, Stream3}, {Codeword, (Stream1, Stream2)}]<br>[{Codeword, Stream4}, {Codeword, (Stream1, Stream2)}] | 4 |
|   | 4 | [{Codeword, (Stream1, Stream2)}, {Codeword, (Stream3, Stream4)}] | 1 |
| | | Sub sum | 17 |

With reference to Table 15, if a maximum number of codewords is 1, the number of available combinations is 6. If a maximum number of codewords is 2, the number of available combinations is 11, so that a total of 17 combinations are made available.

Therefore, as described above, if a single codeword is transmitted via a maximum of 2 streams, several streams are grouped two by two, and the single codeword is transmitted via two streams, the present invention allows the single codeword to be transmitted via only streams contained in the same group. In this case, all codeword-stream combinations can be denoted by a maximum of 5 bits ($2^4=16<17<2^5=32$).

In the meantime, according to another embodiment of the present invention, if the combination between a codeword and a stream is limited and at the same time several codewords are transmitted in association with Table 15, the above-mentioned embodiment allows the codewords to be transmitted via streams of different groups, or allows the codewords to be transmitted via streams of the same group, so that the number of all codeword-stream combinations can be further reduced. A detailed description of the above-mentioned embodiment will hereinafter be described.

In association with Table 15, if several codewords are transmitted to further reduce the number of bits required for indicating all combinations, i.e., if two codewords are transmitted, individual codewords are transmitted via streams of different groups or other streams of the same group, so that they are transmitted via different channel environments, resulting in acquisition of a diversity gain.

In this case, the above-mentioned case in which two codewords are transmitted via streams of different group may indicate that streams having the same or similar channel environments in their grouping are grouped into a single group. The other case in which two codewords are transmitted via streams of the same group may indicate that streams having different channel environments in their grouping are grouped into a single group. In other words, if two codewords are transmitted via different channel environments, they are transmitted via streams of different groups or other streams of the same group according to a stream grouping method.

In association with Table 15, if a first stream 1 and a second stream 2 configure a single group, and a third stream 3 and a fourth stream 4 configure another single group, the above-mentioned case in which two codewords are transmitted via streams of different groups can be denoted by the following Table 16:

TABLE 16

| C | S | Combination details | # |
|---|---|---|---|
| 1 | 1 | {Codeword, Stream1} | 4 |
|   |   | {Codeword, Stream2} |   |
|   |   | {Codeword, Stream3} |   |
|   |   | {Codeword, Stream4} |   |
|   | 2 | {Codeword, (Stream1, Stream2)} | 2 |
|   |   | {Codeword, (Stream3, Stream4)} |   |
| 2 | 2 | [{Codeword, Stream1},{Codeword, Stream3}] | 4 |
|   |   | [{Codeword, Stream1},{Codeword, Stream4}] |   |
|   |   | [{Codeword, Stream2},{Codeword, Stream3}] |   |
|   |   | [{Codeword, Stream2},{Codeword, Stream4}] |   |
|   | 3 | [{Codeword, Stream1}, | 4 |
|   |   | {Codeword, (Stream3, Stream4)}] |   |
|   |   | [{Codeword, Stream2}, |   |
|   |   | {Codeword, (Stream3, Stream4)}] |   |
|   |   | [{Codeword, Stream3}, |   |
|   |   | {Codeword, (Stream1, Stream2)}] |   |
|   |   | [{Codeword, Stream4}, |   |
|   |   | {Codeword, (Stream1, Stream2)}] |   |
|   | 4 | [{Codeword, (Stream1, Stream2)}, | 1 |
|   |   | {Codeword, (Stream3, Stream4)}] |   |
| Sub sum | | | 15 |

In Table 16, the limited parts are denoted by shaded parts.

With reference to Table 16, if a maximum number of codewords is 1, the number of all combinations is 6. If a maximum number of codewords is 2, the number of all combinations is 9, so that a total of 15 combinations are made available. Therefore, in the above-mentioned example of the present invention, a maximum of 4 bits ($2^3=8<15<2^4=16$) are required to indicate all combinations between a codeword and a stream.

In the meantime, the above-mentioned case in which two codewords are transmitted via streams of the same group can be denoted by the following Table 17:

TABLE 17

| C | S | Combination details | # |
|---|---|---|---|
| 1 | 1 | {Codeword, Stream1} | 4 |
|   |   | {Codeword, Stream2} |   |
|   |   | {Codeword, Stream3} |   |
|   |   | {Codeword, Stream4} |   |
|   | 2 | {Codeword, (Stream1, Stream2)} | 2 |
|   |   | {Codeword, (Stream3, Stream4)} |   |
| 2 | 2 | [{Codeword, Stream1},{Codeword, Stream3}] | 2 |
|   |   | [{Codeword, Stream3},{Codeword, Stream4}] |   |
|   | 3 | [{Codeword, Stream1}, | 4 |
|   |   | {Codeword, (Stream3, Stream4)}] |   |
|   |   | [{Codeword, Stream2}, |   |
|   |   | {Codeword, (Stream3, Stream4)}] |   |
|   |   | [{Codeword, Stream3}, |   |
|   |   | {Codeword, (Stream1, Stream2)}] |   |
|   |   | [{Codeword, Stream4}, |   |
|   |   | {Codeword, (Stream1, Stream2)}] |   |
|   | 4 | [{Codeword, (Stream1, Stream2)}, | 1 |
|   |   | {Codeword, (Stream3, Stream4)}] |   |
| Sub sum | | | 13 |

In Table 17, the limited parts are denoted by shaded parts.

With reference to Table 17, if a maximum number of codewords is 1, the number of all combinations is 6. If a maximum number of codewords is 2, the number of all combinations is 7, so that a total of 13 combinations are made available. Therefore, in the above-mentioned example of the present invention, a maximum of 4 bits ($2^3=8<15<2^4=16$) are required to indicate all combinations between a codeword and a stream.

In the meantime, another embodiment of the present invention provides a method for limiting the number of codewords or streams in association with Tables 4 and 5. In more detail, the above-mentioned embodiment limits the number of Tx streams via which a single codeword is transmitted, groups streams using Tables 15~17, allows at least two streams to be transmitted via at least two codewords, and allows a receiver to perform the SIC scheme related with FIG. 7, so that it reduces the number of all codeword-stream combinations and improves a decoding performance of a Rx signal.

In other words, in association with FIGS. 7, 8A, and 8B, if several streams (e.g., two streams) are transmitted, and the individual streams have independent codewords, a Rx signal receiving the independent codewords may improve a decoding performance of each codeword. However, if a single codeword is distributed to the individual streams and be then transmitted, a receiver is unable to perform the SIC scheme.

Therefore, provided that at least two streams transmit at least two codewords, the following Table 18 is made:

TABLE 18

| C | S | Combination details | # |
|---|---|---|---|
| 1 | 1 | {Codeword, Stream1} | 4 |
|   |   | {Codeword, Stream2} |   |
|   |   | {Codeword, Stream3} |   |
|   |   | {Codeword, Stream4} |   |
| 2 | 2 | [{Codeword, Stream1}, {Codeword, Stream2}] | 6 |
|   |   | [{Codeword, Stream1}, {Codeword, Stream3}] |   |
|   |   | [{Codeword, Stream1}, {Codeword, Stream4}] |   |
|   |   | [{Codeword, Stream2}, {Codeword, Stream3}] |   |
|   |   | [{Codeword, Stream2}, {Codeword, Stream4}] |   |
|   |   | [{Codeword, Stream3}, {Codeword, Stream4}] |   |
|   | 3 | [{Codeword, Stream1}, {Codeword, (Stream3, Stream4)}] | 4 |
|   |   | [{Codeword, Stream2}, {Codeword, (Stream3, Stream4)}] |   |
|   |   | [{Codeword, Stream3}, {Codeword, (Stream1, Stream2)}] |   |
|   |   | [{Codeword, Stream4}, {Codeword, (Stream1, Stream2)}] |   |
|   | 4 | [{Codeword, (Stream1, Stream2)}, {Codeword, (Stream3, Stream4)}] | 1 |
| Sub sum | | | 15 |

With reference to Table 18, if a maximum number of codewords is 1, the number of all codeword-stream combinations is 4. If a maximum number of codewords is 2, the number of all codeword-stream combinations is 11, so that a total of 15 combinations are made available. Therefore, in the above-mentioned example of the present invention, a maximum of 4 bits ($2^3=8<15<2^4=16$) of a control signal are required to indicate all combinations between a codeword and a stream.

The above-mentioned embodiments of the present invention assume that a single-user MIMO communication system is used. However, in the case of considering a multi-user MIMO communication system, a condition between a codeword and a stream may be changed to another condition.

Another embodiment of the present invention provides a method for rationally limiting the number of all codeword-stream combinations in consideration of the above-mentioned multi-user environment, and a detailed description thereof will hereinafter be described.

In order to acquire a multi-user diversity gain from the multi-user MIMO communication system, a searching process for users having channels orthogonal to each other is of importance. If a single user uses all streams, a single-user MIMO system is made so that the user cannot acquire a multi-user diversity gain. In order to implement the multi-user MIMO communication system, it is preferable that the number of streams capable of being used by each user be reduced.

This embodiment of the present invention limits the number of all codeword-stream combinations to effectively acquire a multi-user diversity gain from the single-user or multi-user MIMO communication system. For the convenience of description, it is assumed that a maximum number of streams is 4 and a maximum number of codewords is 2 in the following examples.

Preferably, the multi-user MIMO communication system may select users having channels orthogonal to each other from among several users. However, in fact, there is a low probability of selecting only the orthogonal users. The multi-user MIMO communication system has a high probability of selecting users having channels orthogonal to each other, so that it can be more stably operated.

Figure 11:
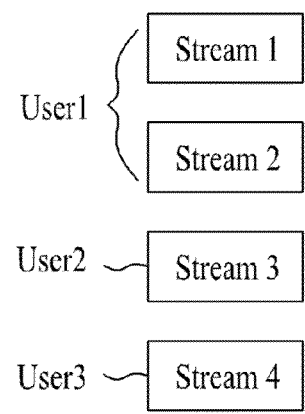
FIG. 11 shows the number of available streams of a user in a multi-user MIMO communication system.

FIG. 11 shows the number of available streams of a user in a multi-user MIMO communication system.

Referring to FIG. 11, if a single user uses at least two streams, another limitation is applied to a user's selection process.

In other words, if a single user uses two or more streams, channels passing through all streams of a corresponding user must be orthogonal to each other. The user who uses two or more streams must be selected from among several users satisfying the following condition. Thereafter, a process for searching for specific users having channels orthogonal to each other from among corresponding users must be performed. In this case, a variety of methods may be used as a final selection, for example, a Max Sum-Rate method.

In more detail, as shown in FIG. 11, if a first user 1 uses a first stream 1 and a second stream 2, two channels of the first user 1 employing the first and second streams 1 and 2 must be orthogonal to each other, and the first user 1 must be selected from among users who satisfy the above-mentioned orthogonal condition.

A channel of a second user 2 employing a third stream 3 must be orthogonal to a channel of a third user employing a fourth stream 4, the process for selecting users who satisfy the above-mentioned orthogonal condition is more difficult than that of another case in which all users use a single stream. Therefore, in order to support the above-mentioned case in which a single user uses several streams, the above-mentioned operation can be easily performed under the condition that many more users exist.

Therefore, in order to easily select desired users in the multi-user MIMO communication system, one embodiment of the present invention allows a single user to use only one stream to limit the number of all codeword-stream combinations. In this case, available combinations between a codeword and a stream can be represented by the following Table 19:

TABLE 19

| C | S | Combination details | # |
|---|---|---|---|
| 1 | 1 | {Codeword, Stream1}<br>{Codeword, Stream2}<br>{Codeword, Stream3}<br>{Codeword, Stream4} | 4 |
|   |   | Sub sum | 4 |

As can be seen from Table 19, in order to easily select a desired user in the multi-user MIMO communication system, the above-mentioned embodiment of the present invention limits the number of codeword-stream combinations so that a single user can use only one stream. In this case, the number of all combinations is 4, and can be denoted by a maximum of 2 bits ($2^1 < 4 < 2^2 = 4$).

In the meantime, in association with Table 19, the above-mentioned embodiment of the present invention allows a single user to use only one stream, so that the multi-user MIMO communication system can easily select an orthogonal channel between users, however, it should be noted that a maximum peak-rate of each user may be damaged.

Therefore, in order to solve the above-mentioned problem, another embodiment of the present invention allows a single user to use several streams, but it allows the individual streams to use different codewords. A detailed description of the above-mentioned embodiment will hereinafter be described.

In more detail, provided that a single user uses two streams, a maximum peak-rate of each user can be higher than that of the case shown in Table 19. Also, the above-mentioned embodiment of the present invention allows the individual streams to use different codewords, and applies the SIC scheme to a Rx signal received in a receiver, so that it can improve a decoding performance.

Under this situation, all combinations between a codeword and a stream can be represented by the following Table 20:

TABLE 20

| C | S | Combination details | # |
|---|---|---|---|
| 2 | 2 | [{Codeword, Stream1}, {Codeword, Stream2}]<br>[{Codeword, Stream1}, {Codeword, Stream3}]<br>[{Codeword, Stream1}, {Codeword, Stream4}]<br>[{Codeword, Stream2}, {Codeword, Stream3}]<br>[{Codeword, Stream2}, {Codeword, Stream4}]<br>[{Codeword, Stream3}, {Codeword, Stream4}] | 6 |
|   |   | Sub sum | 6 |

With reference to Table 20, the number of all codeword-stream combinations is 6, and can be denoted by a maximum of 3 bits ($2^2=4<6<2^3=8$). In the meantime, in association with Tables 19 and 20, the above-mentioned embodiments of the present invention have the aforementioned advantages and disadvantages. A multi-user MIMO communication system according to another embodiment of the present invention accommodates a codeword-stream combination to which the advantages and disadvantages are applied, and may selectively use the combination according to various situations.

In this case, all combinations between a codeword and a stream can be represented by the following Table 21:

TABLE 21

| C | S | Combination details | # |
|---|---|---|---|
| 1 | 1 | {Codeword, Stream1}<br>{Codeword, Stream2}<br>{Codeword, Stream3}<br>{Codeword, Stream4} | 4 |
| 2 | 2 | [{Codeword, Stream1}, {Codeword, Stream2}]<br>[{Codeword, Stream1}, {Codeword, Stream3}]<br>[{Codeword, Stream1}, {Codeword, Stream4}]<br>[{Codeword, Stream2}, {Codeword, Stream3}]<br>[{Codeword, Stream2}, {Codeword, Stream4}]<br>[{Codeword, Stream3}, {Codeword, Stream4}] | 6 |
|   |   | Sub sum | 10 |

In this case, as can be seen from Table 21, if a single user uses a single stream, 4 combinations are made available. If a single user uses two streams, 6 combinations are made available, so that a total of 10 combinations are made available. Therefore, the above-mentioned combinations can be denoted by a maximum of 4 bits ($2^3=8<10<2^4=16$).

The above-mentioned embodiments have disclosed a logical method for reducing the number of combinations between a codeword and a stream.

In the meantime, one embodiment of the present invention will disclose a method for additionally reducing the number of codeword-stream combinations in consideration of an Rx-scheme and Rx-performance of a receiver, and a detailed description thereof will hereinafter be described.

If an SIC-based receiver is used as a receiver of the present invention and several codewords exist, an overall system performance may be changed according to the protection order of the codewords. Therefore, the order of codewords in each combination must be considered.

Firstly, as shown in FIG. 5A, if a maximum number of streams is 4 and a maximum number of codewords is 2, the following combinations are provided.

If the number of antennas is 4, i.e., if a maximum number of streams is 4, a maximum number of codewords is 2. In this case, all available codeword-stream combinations are shown in the following Tables 22 and 23:

TABLE 22

| C | S | Combination details | # |
|---|---|---|---|
| 1 | 1 | {Codeword1, Stream1} | 4 |
|   |   | {Codeword1, Stream2} |   |
|   |   | {Codeword1, Stream3} |   |
|   |   | {Codeword1, Stream4} |   |
|   | 2 | {Codeword1, (Stream1, Stream2)} | 6 |
|   |   | {Codeword1, (Stream1, Stream3)} |   |
|   |   | {Codeword1, (Stream1, Stream4)} |   |
|   |   | {Codeword1, (Stream2, Stream3)} |   |
|   |   | {Codeword1, (Stream2, Stream4)} |   |
|   |   | {Codeword1, (Stream3, Stream4)} |   |
|   | 3 | {Codeword1, (Stream1, Stream2, Stream3)} | 4 |
|   |   | {Codeword1, (Stream1, Stream2, Stream4)} |   |
|   |   | {Codeword1, (Stream1, Stream2, Stream4)} |   |
|   |   | {Codeword1, (Stream2, Stream3, Stream4)} |   |
|   | 4 | {Codeword1, (Stream1, Stream2, Stream3, Stream4)} | 1 |
|   |   | Sub sum | 15 |

TABLE 23

| C | S | Combination details | # |
|---|---|---|---|
| 2 | 2 | [{Codeword1, Stream1}, {Codeword2, Stream2}] | 12 |
|   |   | [{Codeword1, Stream2}, {Codeword2, Stream1}] |   |
|   |   | [{Codeword1, Stream1}, {Codeword2, Stream3}] |   |
|   |   | [{Codeword1, Stream3}, {Codeword2, Stream1}] |   |
|   |   | [{Codeword1, Stream1}, {Codeword2, Stream4}] |   |
|   |   | [{Codeword1, Stream4}, {Codeword2, Stream1}] |   |
|   |   | [{Codeword1, Stream2}, {Codeword2, Stream3}] |   |
|   |   | [{Codeword1, Stream3}, {Codeword2, Stream2}] |   |
|   |   | [{Codeword1, Stream2}, {Codeword2, Stream4}] |   |
|   |   | [{Codeword1, Stream4}, {Codeword2, Stream2}] |   |
|   |   | [{Codeword1, Stream3}, {Codeword2, Stream4}] |   |
|   |   | [{Codeword1, Stream4}, {Codeword2, Stream3}] |   |
|   | 3 | [{Codeword1, Stream1}, {Codeword2, (Stream2, Stream3)}] | 24 |
|   |   | [{Codeword1, (Stream2, Stream3)}, {Codeword2, Stream1},] |   |
|   |   | [{Codeword1, Stream1}, {Codeword2, (Stream2, Stream4)}] |   |
|   |   | [{Codeword1, (Stream2, Stream4)}, {Codeword2, Stream1}] |   |
|   |   | [{Codeword1, Stream1}, {Codeword2, (Stream3, Stream4)}] |   |
|   |   | [{Codeword1, (Stream3, Stream4)}, {Codeword2, Stream1}] |   |
|   |   | [{Codeword1, Stream2}, {Codeword2, (Stream1, Stream3)}] |   |

TABLE 23-continued

| C | S | Combination details | # |
|---|---|---|---|
|   |   | [{Codeword1, (Stream1, Stream3)}, {Codeword2, Stream2}] |   |
|   |   | [{Codeword1, Stream2}, {Codeword2, (Stream1, Stream4)}] |   |
|   |   | [{Codeword1, (Stream1, Stream4)}, {Codeword2, Stream2}] |   |
|   |   | [{Codeword1, Stream2}, {Codeword2, (Stream3, Stream4)}] |   |
|   |   | [{Codeword1, (Stream3, Stream4)}, {Codeword2, Stream2}] |   |
|   |   | [{Codeword1, Stream3}, {Codeword2, (Stream1, Stream2)}] |   |
|   |   | [{Codeword1, (Stream1, Stream2)}, {Codeword2, Stream3}] |   |
|   |   | [{Codeword1, Stream3}, {Codeword2, (Stream1, Stream4)}] |   |
|   |   | [{Codeword1, (Stream1, Stream4)}, {Codeword2, Stream3}] |   |
|   |   | [{Codeword1, Stream3}, {Codeword2, (Stream2, Stream4)}] |   |
|   |   | [{Codeword1, (Stream2, Stream4)}, {Codeword2, Stream3}] |   |
|   |   | [{Codeword1, Stream4}, {Codeword2, (Stream1, Stream2)}] |   |
|   |   | [{Codeword1, (Stream1, Stream2)}, {Codeword2, Stream4}] |   |
|   |   | [{Codeword1, Stream4}, {Codeword2, (Stream1, Stream3)}] |   |
|   |   | [{Codeword1, (Stream1, Stream3)}, {Codeword2, Stream4}] |   |
|   |   | [{Codeword1, Stream4}, {Codeword2, (Stream2, Stream3)}] |   |
|   |   | [{Codeword1, (Stream2, Stream3)}, {Codeword2, Stream4}] |   |
|   | 4 | [{Codeword1, Stream1}, {Codeword2, (Stream2, Stream3, Stream4)}] | 8 |
|   |   | [{Codeword1, (Stream2, Stream3, Stream4)}, {Codeword2, Stream1}] |   |
|   |   | [{Codeword1, Stream2}, {Codeword2, (Stream1, Stream3, Stream4)}] |   |
|   |   | [{Codeword1, (Stream1, Stream3, Stream4)}, {Codeword2, Stream2}] |   |
|   |   | [{Codeword1, Stream3}, {Codeword2, (Stream1, Stream2, Stream4)}] |   |
|   |   | [{Codeword1, (Stream1, Stream2, Stream4)}, {Codeword2, Stream3}] |   |
|   |   | [{Codeword1, Stream4}, {Codeword2, (Stream1, Stream2, Stream3)}] |   |
|   |   | [{Codeword1, (Stream1, Stream2, Stream3)}, {Codeword2, Stream4}] |   |
|   |   | [{Codeword1, (Stream1, Stream2)}, {Codeword2, (Stream3, Stream4)}] | 6 |
|   |   | [{Codeword1, (Stream3, Stream4)}, {Codeword2, (Stream1, Stream2)}][{Codeword1, (Stream1, Stream3)}, {Codeword2, (Stream2, Stream4)}] |   |
|   |   | [{Codeword1, (Stream2, Stream4)}, {Codeword2, (Stream1, Stream3)}][{Codeword1, (Stream1, Stream4)}, {Codeword2, (Stream2, Stream3)}] |   |
|   |   | [{Codeword1, (Stream2, Stream3)}, {Codeword2, (Stream1, Stream4)}] |   |
|   |   | Sub sum | 50 |

Table 22 shows examples of individual combinations when the number of codewords is 1. Table 23 shows examples of individual combinations when the number of codewords is 2.

The order of codewords in Table 22 or 23 is denoted by successive numbers. The codeword number indicates a decoding order when a receiver uses the SIC-based receiver. Thereafter, the codeword 1 is firstly decoded as shown in FIG. 7, an interference signal related with the codeword 1 is removed from the Rx signal, and then a codeword 2 is decoded.

In other words, the antenna mapping operation is changed according to the order of streams when each stream is remapped to the antenna. Also, if a pre-coding method is used, the antenna mapping operation is changed according to the pre-coding order in association with a corresponding weight vector. Therefore, the streams have a fixed order, so that the order of the streams in a combination must also be indicated.

As can be seen from Tables 22 and 23, if the number of codewords is 1, the number of combinations is 15. If the number of codeword is 2, the number of combination is 50, so that a total of 65 combinations are required. Therefore, in order to allow all combinations without any restriction under the condition that a maximum number of codewords is 2 and a maximum number of streams is 4, a maximum of 7 bits ($2^6=64<65<2^7=128$) are needed.

In the meantime, as shown in FIG. 5B, all codeword-stream combinations provided when a maximum number of streams is 2 and a maximum number of codewords is 2 are as follows.

As shown in FIG. 5B, if the number of antennas is 2, i.e., if a maximum number of streams is 2, a maximum number of codewords is 2. All cases of individual combinations are shown in the following Table 24:

TABLE 24

| C | S | Combination details | # |
|---|---|---|---|
| 1 | 1 | {Codeword1, Stream1}<br>{Codeword1, Stream2} | 2 |
|   | 2 | {Codeword1, (Stream1, Stream2)} | 1 |
| 2 | 2 | [{Codeword1, Stream1}, {Codeword2, Stream2}]<br>[{Codeword1, Stream2}, {Codeword2, Stream1}] | 2 |
|   |   | Sub sum | 5 |

Table 24 shows all examples of individual combinations provided when the number of codewords is 1 or 2.

As shown in Table 14, if a maximum number of streams is 2 and a maximum number of codewords is 2, a total of 5 codeword-stream combinations are needed. In this case, in order to allow all combinations without any restriction under the condition that the maximum number of streams is 2 and the maximum number of codewords is 2, a maximum of 3 bits ($2^2=4<5<2^3=8$) are needed. However, the above-mentioned case may be considered to be a subset of the case in which a maximum of 4 streams shown in Tables 22 and 23 are used. Therefore, if the above-mentioned case in which a maximum of 4 streams are used can be effectively indicated, it should be noted that this case can also be applied to another case in which a maximum of 2 streams are used.

As described above, the above-mentioned case in which the maximum number of streams requires a small number of bits to independently indicate the combination between a codeword and a stream, so that it is left out of consideration. Therefore, the following embodiment of the present invention will disclose a method for effectively indicating all codeword-stream combinations with less number of bits on the basis of the above-mentioned case in which a maximum of 4 streams are used. If the combination between a codeword and a stream can be denoted with less number of bits, Tx efficiency of a control signal can be enhanced.

As previously stated above, if a given restriction condition between a codeword and a stream is that a maximum number of streams is 4 and a maximum number of codewords is 2, 65 combinations between the codeword and the stream are made available. In order to indicate all the 65 combinations without any restriction, a total of 7 bits are needed.

One embodiment of the present invention will disclose a method for limiting all combinations between a codeword and a stream in consideration of an Rx-scheme and Rx-performance of a receiver, so that it can reduce the number of information pieces indicating used combinations from among all combinations.

Figure 12:
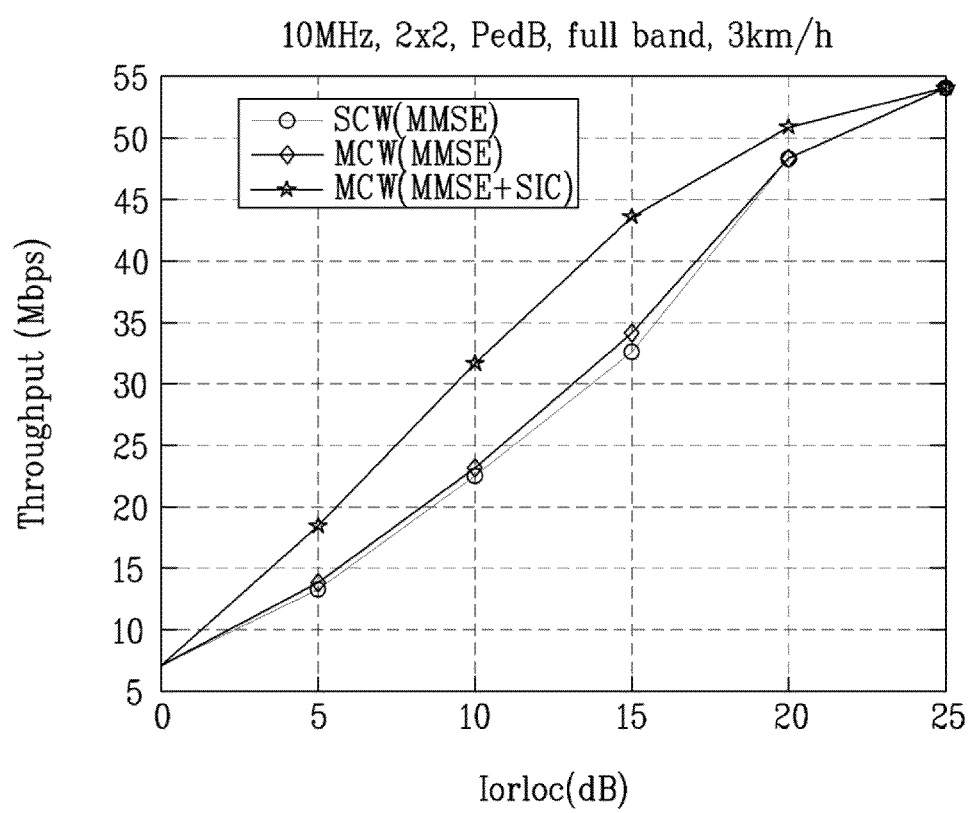
FIG. 12 shows a simulation result indicating a difference in system throughput between a first case in which only one codeword is used and a second case in which two codewords are used on the condition that there are several streams.

FIG. 12 shows a simulation result indicating a difference in system throughput between a first case in which only one codeword is used and a second case in which two codewords are used on the condition that there are several streams.

In FIG. 12, "SCW" is an abbreviation of a Single Codeword, "MCW" is an abbreviation of Multiple Codewords. "MMSE" indicates a specific case in which a minimum mean square error (MMSE)-based receiver is used in a receiver. "MMSE+SIC" indicates that a specific receiver capable of performing interference cancellation by applying the SIC scheme to the MMSE-resultant signal is used in a receiver. "Ior/Ioc" on a horizontal axis indicates the ratio of a Tx power of a Node-B to an interference power. The ratio of the Tx power to the interference power can be calculated by a SINR, and is physically similar to the SINR.

A detailed simulation assumption of FIG. 12 is as follows. Two Tx antennas and two Rx antennas are used, a MCS scheme based on the 3GPP TR 25.892 is used, and the simplest Per Antenna Rate Control (PARC) scheme is used as the MIMO scheme. It is assumed that "Pedestrian B" model proposed by the ITU is used as a simulation channel, and a mobile terminal has a speed of 3 km/h. And, it is assumed that an OFDM scheme is used as a transmission scheme, the length of FFT is 1024, the number of sub-carriers actually used for a bandwidth of 10 MHz is 600, and the size of a cyclic prefix (CP) is 74.

As can be seen from the result of FIG. 12, in the case of transmitting two streams, a first case in which the two streams are distributed to two codewords has a good performance superior to that of a second case in which the two streams are transmitted via a single codeword. The above-mentioned result has the same result in the light of the number of streams or codewords. If the above-mentioned result is generalized, the following result may be acquired. In other words, if several streams are used, it is preferable that several codewords instead of a single codeword be used to increase an overall system performance. Therefore, if several streams are used to limit the number of all combinations between a codeword and a stream, one embodiment of the present invention provides a method for limiting a combination which allows a single codeword to use all streams.

In more detail, as described above, the above-mentioned embodiment, in which a maximum of 4 streams are used and a maximum of 2 codewords are used, may allow desired data to be transmitted via two codewords when the codeword-stream combination has two or more streams.

The combination between a codeword and a stream according to the above-mentioned embodiment of the present invention can be represented by the following Table 25:

TABLE 25

| C | S | Combination details | # |
|---|---|---|---|
| 1 | 1 | {Codeword1, Stream1}<br>{Codeword1, Stream2}<br>{Codeword1, Stream3}<br>{Codeword1, Stream4} | 4 |
| 2 | 2 | [{Codeword1, Stream1}, {Codeword2, Stream2}]<br>[{Codeword1, Stream2}, {Codeword2, Stream1}]<br>[{Codeword1, Stream1}, {Codeword2, Stream3}]<br>[{Codeword1, Stream3}, {Codeword2, Stream1}] | 12 |

TABLE 25-continued

| C | S | Combination details | # |
|---|---|---|---|
|   |   | [{Codeword1, Stream1}, {Codeword2, Stream4}] |   |
|   |   | [{Codeword1, Stream4}, {Codeword2, Stream1}] |   |
|   |   | [{Codeword1, Stream2}, {Codeword2, Stream3}] |   |
|   |   | [{Codeword1, Stream3}, {Codeword2, Stream2}] |   |
|   |   | [{Codeword1, Stream2}, {Codeword2, Stream4}] |   |
|   |   | [{Codeword1, Stream4}, {Codeword2, Stream2}] |   |
|   |   | [{Codeword1, Stream3}, {Codeword2, Stream4}] |   |
|   |   | [{Codeword1, Stream4}, {Codeword2, Stream3}] |   |
|   | 3 | [{codeword1, Stream1}, {Codeword2, (Stream2, Stream3)}] | 24 |
|   |   | [{Codeword1, (Stream2, Stream3)}, {codeword2, Stream1}] |   |
|   |   | [{Codeword1, Stream1}, {Codeword2, (Stream2, Stream4)}] |   |
|   |   | [{Codeword1, (Stream2, Stream4)}, {Codeword2, Stream1}] |   |
|   |   | [{Codeword1, Stream1}, {Codeword2, (Stream3, Stream4)}] |   |
|   |   | [{Codeword1, (Stream3, Stream4)}, {Codeword2, Stream1}] |   |
|   |   | [{Codeword1, Stream2}, {Codeword2, (Stream1, Stream3)}] |   |
|   |   | [{Codeword1, (Stream1, Stream3)}, {Codeword2, Stream2}] |   |
|   |   | [{Codeword1, Stream2}, {Codeword2, (Stream1, Stream4)}] |   |
|   |   | [{Codeword1, (Stream1, Stream4)}, {Codeword2, Stream2}] |   |
|   |   | [{Codeword1, Stream2}, {Codeword2, (Stream3, Stream4)}] |   |
|   |   | [{Codeword1, (Stream3, Stream4)}, {Codeword2, Stream2}] |   |
|   |   | [{Codeword1, Stream3}, {Codeword2, (Stream1, Stream2)}] |   |
|   |   | [{Codeword1, (Stream1, Stream2)}, {Codeword2, Stream3}] |   |
|   |   | [{Codeword1, Stream3}, {Codeword2, (Stream1, Stream4)}] |   |
|   |   | [{Codeword1, (Stream1, Stream4)}, {Codeword2, Stream3}] |   |
|   |   | [{Codeword1, Stream3}, {Codeword2, (Stream2, Stream4)}] |   |
|   |   | [{Codeword1, (Stream2, Stream4)}, {Codeword2, Stream3}] |   |
|   |   | [{Codeword1, Stream4}, {Codeword2, (Stream1, Stream2)}] |   |
|   |   | [{Codeword1, (Stream1, Stream2)}, {Codeword2, Stream4}] |   |
|   |   | [{Codeword1, Stream4}, {Codeword2, (Stream1, Stream3)}] |   |
|   |   | [{Codeword1, (Stream1, Stream3)}, {Codeword2, Stream4}] |   |
|   |   | [{Codeword1, Stream4}, {Codeword2, (Stream2, Stream3)}] |   |
|   |   | [{Codeword1, (Stream2, Stream3)}, {Codeword2, Stream4}] |   |
|   | 4 | [{Codeword1, Stream1}, {Codeword2, (Stream2, Stream3, Stream4)}] | 8 |
|   |   | [{Codeword1, (Stream2, Stream3, Stream4)}, {Codeword2, Stream1}] |   |
|   |   | [{Codeword1, Stream2}, {Codeword2, (Stream1, Stream3, Stream4)}] |   |
|   |   | [{Codeword1, (Stream1, Stream3, Stream4)}, {Codeword2, Stream2}] |   |
|   |   | [{Codeword1, Stream3}, {Codeword2, (Stream1, Stream2, Stream4)}] |   |
|   |   | [{Codeword1, (Stream1, Stream2, Stream4)}, {Codeword2, Stream3}] |   |
|   |   | [{Codeword1, Stream4}, {Codeword2, (Stream1, Stream2, Stream3)}] |   |
|   |   | [{Codeword1, (Stream1, Stream2, Stream3)}, {Codeword2, Stream4}] |   |
|   |   | [{Codeword1, (Stream1, Stream2)}, {Codeword2, (Stream3, Stream4)}] | 6 |
|   |   | [{Codeword1, (Stream3, Stream4)}, {Codeword2, (Stream1, Stream2)}][{Codeword1, (Stream1, Stream3)}, {Codeword2, (Stream2, Stream4)}] |   |
|   |   | [{Codeword1, (Stream2, Stream4)}, {Codeword2, (Stream1, Stream3)}][{Codeword1, (Stream1, Stream4)}, {Codeword2, (Stream2, Stream3)}] |   |
|   |   | [{Codeword1, (Stream2, Stream3)}, {Codeword2, (Stream1, Stream4)}] |   |
|   |   | Sub sum | 54 |

With reference to Table 25, provided that several codewords can be available when several streams are used, and there are restrictions for allowing several codewords to be used instead of a single codeword, the number of combinations is 4 when a maximum number of codewords is 1, the number of combinations is 50 when a maximum number of codewords is 2, so that a total of 54 combinations are needed. These 54 combinations can be denoted by a maximum of 6 bits ($2^5=32<54<2^6=64$).

A more preferred embodiment of the present invention provides a method for fixing the decoding order based on the SIC scheme to reduce the number of all combinations.

Figure 13A:
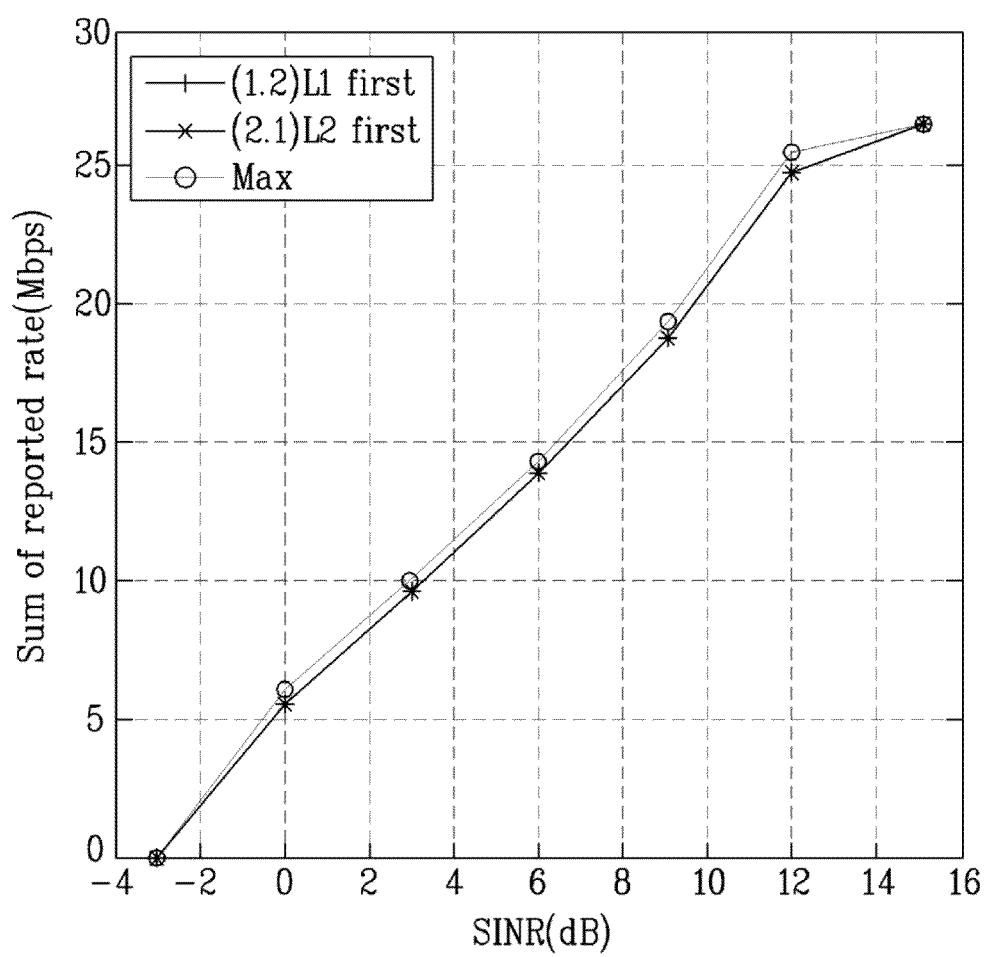
FIGS. 13A~13C show the simulation results of a reception-end performance according to the order of SIC decoding.
Figure 13B:
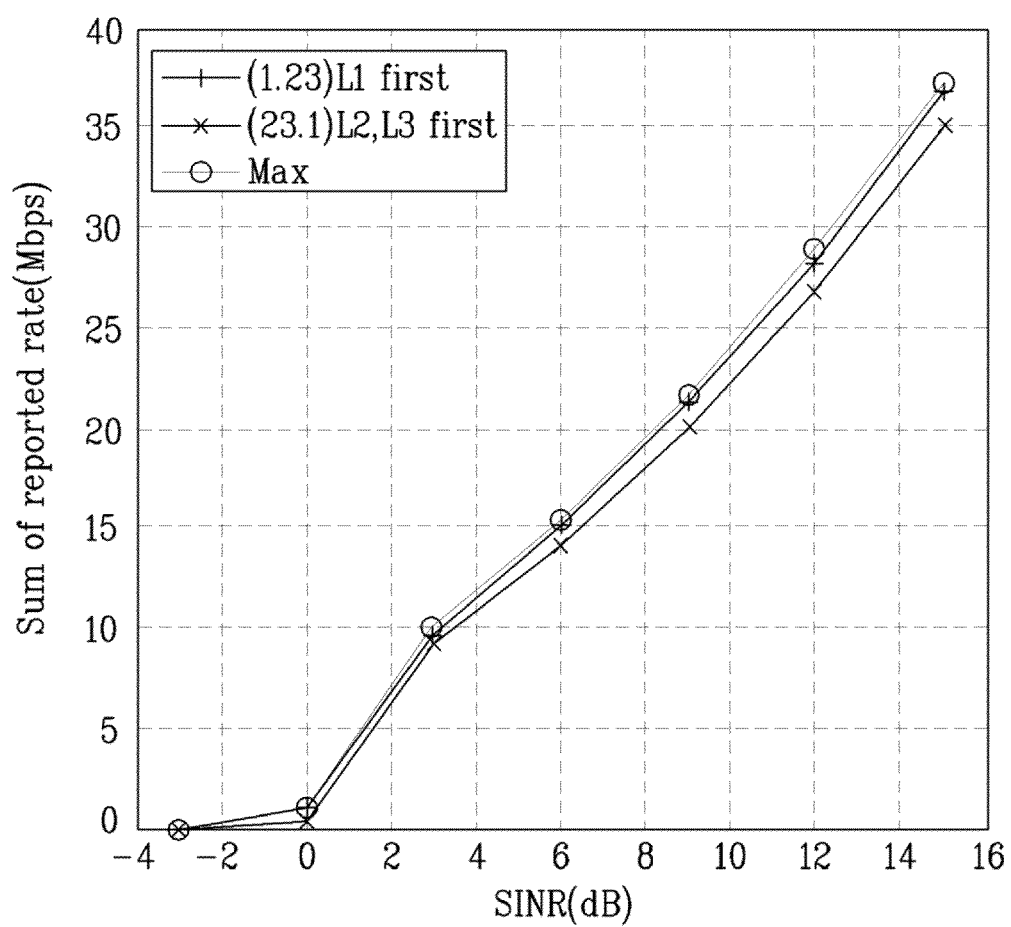
Figure 13C:
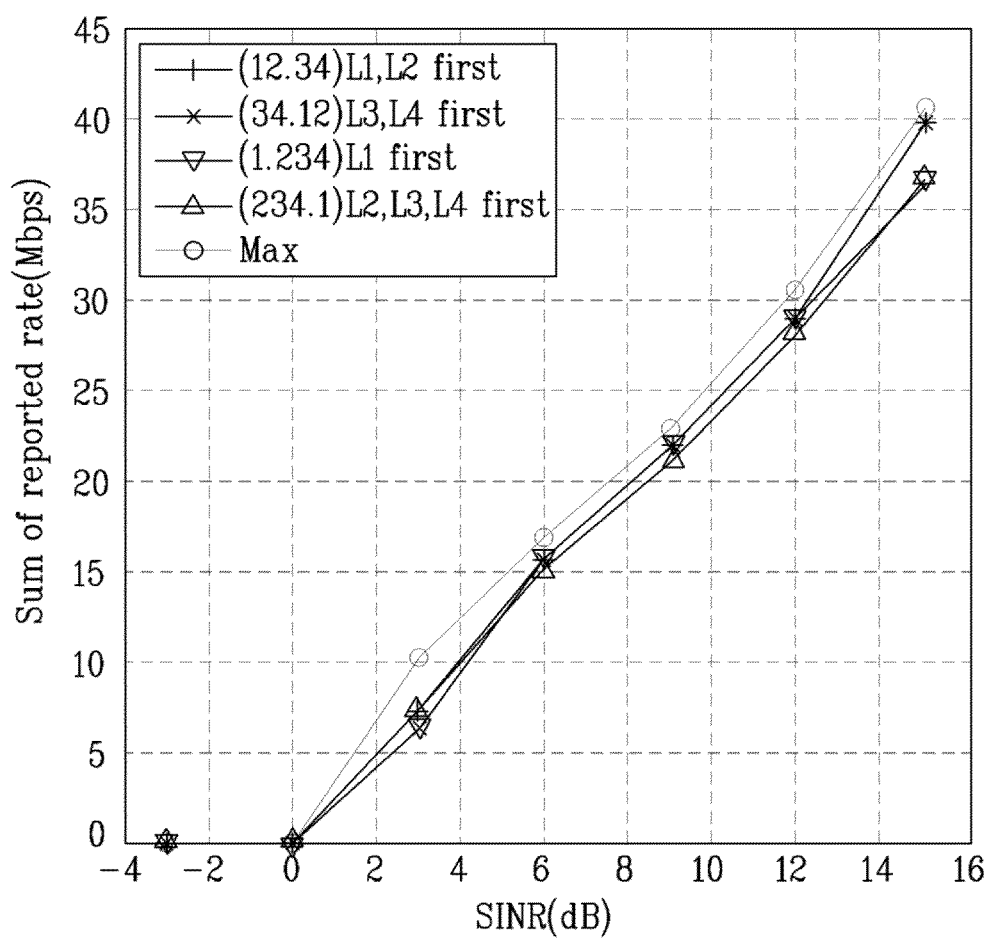

FIGS. 13A~13C show the simulation results of a reception-end performance according to the order of SIC decoding.

It can be recognized that all combinations shown in Table 25 include a specific part indicating the decoding order when the SIC scheme is used in a receiver. In order to indicate the decoding order of codewords and associated SIC receiver, the combination between a codeword and a stream is symmetrically repeated.

For example, if two streams (i.e., stream 1 and stream 2) are used, first combinations (Codeword1, Stream1) and (Codeword2, Stream2) exist, and second combinations (Codeword1, Stream2) and (Codeword2, Stream1) also exist. The decoding orders of the first combinations are symmetrically different from those of the second combinations. The simulation result indicating a performance difference between the first and second combinations is shown in FIG. 13A. FIG. 13B shows a case in which three streams are used, and FIG. 13C shows another case in which four streams are used. The simultaneously environments of FIGS. 13A~13C are different in the number of antennas, and the remaining parts of FIGS. 13A~13C are equal to those of FIG. 12. In more detail, FIG. 13A shows two antennas, FIG. 13B shows three antennas, and FIG. 13C shows four antennas, and the remaining parts other than the number of antennas are equal to those of FIG. 12.

In order to analyze the simulation result, the case of FIG. 13C illustrating a performance of the case employing 4 streams will hereinafter be described.

In FIG. 13A, "Max" is a specific case in which all original combinations indicating the SIC-decoding order are included. "(12, 34) L1, L2 first" is a specific case, in which streams 1 and 2 (or layers 1 and 2) L1 and L2 are assigned to a first codeword 1, the streams 1 and 2 of the first codeword 1 are firstly decoded during the SIC decoding when streams 3 and 4 (or layers 3 and 4) are used for a second codeword 2, and then the streams 3 and 4 of a second codeword 2 are decoded. In this way, "(34, 12) L3, L4 first" is a specific case, in which streams 3 and 4 are assigned to a first codeword 1, streams 1 and 2 are assigned to a second codeword 2, the streams 3 and 4 corresponding to the first codeword 1 are firstly decoded, and then the other streams 1 and 2 corresponding to the second codeword 2 are decoded.

As can be seen from the result of FIG. 13C, in the case of (12,34) or (34,12) in which two streams are assigned to each codeword, there is almost no difference in performance between the case of (12,34) and the other case of (34,12).

Also, in the case of (1,234) or (234,1) in which a single stream is assigned to a single codeword and three streams are assigned to other streams, there is almost no difference in order between the case of (1,234) and the case of (234,1).

In another aspect, the case in which two streams are assigned to each codeword has a good performance superior to that of the other case in which a single stream is assigned to a single codeword and three streams are assigned to other streams. Although the above-mentioned case in which two streams are assigned to each codeword has a performance slightly lower than that of the other case in which all cases are allowed, it should be noted that their performances of the above-mentioned two cases are very close to each other. Therefore, in the performance aspect, it is preferable that the SIC-decoding order be fixed to only a predetermined order, and a maximum of 2 codewords be selected by a single codeword.

FIG. 13B shows different performances when three streams are used, in which a single stream is assigned to a single codeword and two streams are assigned to the other codeword. In this case, it is more preferable that the codeword composed of the two streams be decoded after the single stream has been decoded, resulting in the implementation of a higher performance.

FIG. 13A shows a performance when a total of 2 streams are used, in which a single stream is assigned to each codeword. In this case, it can be recognized that there is almost no difference in performance between decoded codewords, irrespective of the decoding order of the codewords.

The following three results are acquired by the performances of FIGS. 13A~13C.

According to a first result, the decoding order of the SIC receiver is fixed, so that the codeword 1 is firstly decoded, and the codeword 2 is then decoded.

According to a second result, if the number of streams assigned to the first codeword 1 is asymmetrical to the number of streams assigned to the second codeword 2, a codeword with less number of streams from among the first and second codewords 1 and 2 is firstly decoded. For example, if the number of all combinations is 3, one codeword has a single stream and the other codeword has two streams, the codeword composed of only one stream is firstly decoded. For this purpose, a single stream is assigned to the first codeword 1, and two streams are assigned to the second codeword 2.

According to a third result, a maximum of 2 streams are assigned to a single codeword.

In more detail, according to this embodiment in which a maximum of 4 streams and a maximum of 2 codewords are used, it is assumed that the decoding order of the SIC receiver in all combinations shown in Tables 22 and 23 is fixed, the allocation process having a symmetrical structure to indicate the SIC decoding order is removed, and the SIC receiver firstly decodes the first codeword 1 and then decodes the second codeword 2. Namely, the term "SIC decoding order" used in the above-mentioned embodiment of the present invention is indicative of the decoding order of individual codewords when the SIC receiver is used.

Also, if a total of 3 streams exist, the above-mentioned embodiment considers only a specific case, in which a single stream is assigned to a first codeword 1 and two streams are assigned to a second codeword 2. And, if a total of 4 streams exist, the above-mentioned embodiment considers only a specific case, in which two streams are assigned to a first codeword 1 and the remaining two streams are assigned to a second codeword 2.

A detailed example associated with the above-mentioned embodiment is shown in the following Table 26:

TABLE 26

| C | S | Combination details | # |
|---|---|---|---|
| 1 | 1 | {Codeword1, Stream1}<br>{Codeword1, Stream2}<br>{Codeword1, Stream3}<br>{Codeword1, Stream4} | 4 |
|   | 2 | {Codeword1, (Stream1, Stream2)}<br>{Codeword1, (Stream1, Stream3)}<br>{Codeword1, (Stream1, Stream4)}<br>{Codeword1, (Stream2, Stream3)}<br>{Codeword1, (Stream2, Stream4)}<br>{Codeword1, (Stream3, Stream4)} | 6 |
|   | 3 | {Codeword1, (Stream1, Stream2, Stream3)}<br>{Codeword1, (Stream1, Stream2, Stream4)}<br>{Codeword1, (Stream1, Stream2, Stream4)}<br>{Codeword1, (Stream2, Stream3, Stream4)} | 4 |
|   | 4 | {Codeword1, (Stream1, Stream2, Stream3, Stream4)} | 1 |
| 2 | 2 | [{Codeword1, Stream1}, {Codeword2, Stream2}]<br>[{Codeword1, Stream1}, {Codeword2, Stream3}]<br>[{Codeword1, Stream1}, {Codeword2, Stream4}]<br>[{Codeword1, Stream2}, {Codeword2, Stream3}]<br>[{Codeword1, Stream2}, {Codeword2, Stream4}]<br>[{Codeword1, Stream3}, {Codeword2, Stream4}] | 6 |
|   | 3 | [{Codeword1, Stream1}, {Codeword2, (Stream2, Stream3)}]<br>[{Codeword1, Stream1}, {Codeword2, (Stream2, Stream4)}]<br>[{Codeword1, Stream1}, {Codeword2, (Stream3, Stream4)}]<br>[{Codeword1, Stream2}, {Codeword2, (Stream1, Stream3)}]<br>[{Codeword1, Stream2}, {Codeword2, (Stream1, Stream4)}]<br>[{Codeword1, Stream2}, {Codeword2, (Stream3, Stream4)}]<br>[{Codeword1, Stream3}, {Codeword2, (Stream1, Stream2)}]<br>[{Codeword1, Stream3}, {Codeword2, (Stream1, Stream4)}]<br>[{Codeword1, Stream3}, {Codeword2, (Stream2, Stream4)}]<br>[{Codeword1, Stream4}, {Codeword2, (Stream1, Stream2)}]<br>[{Codeword1, Stream4}, {Codeword2, (Stream1, Stream3)}]<br>[{Codeword1, Stream4}, {Codeword2, (Stream2, Stream3)}] | 12 |
|   | 4 | [{Codeword1, (Stream1, Stream2)}, {Codeword2, (Stream3, Stream4)}]<br>[{Codeword1, (Stream1, Stream3)}, {Codeword2, (Stream2, Stream4)}]<br>[{Codeword1, (Stream1, Stream4)}, {Codeword2, (Stream2, Stream3)}] | 3 |
|   |   | Sub sum | 36 |

Therefore, a detailed embodiment of the present invention has a total of 36 cases, which are denoted by a maximum of 6 bits ($2^5=32<36<2^6=64$). In each case, the SIC-decoding order is fixed, a single codeword has a maximum of 2 streams, and a codeword with less number of streams is firstly decoded in the case of an asymmetrical stream. In the light of the number of bits of control information indicating all combinations, the above-mentioned case has a gain of 1 bit as compared to the cases shown in Tables 22 and 23.

In the meantime, the method for reducing the number of cases in the above-mentioned combination may also be applied to the above-mentioned embodiment. In other words, if several streams are used, several codewords are used, a single codeword has a maximum of 2 streams, and a codeword with less number of streams is fixed to a first codeword, so that the number of all combinations can be limited.

Provided that the SIC-based receiver is used in a receiver, several codewords are used when several streams are used, and a single codeword has a maximum of 2 streams. In the case of an asymmetrical stream, a codeword with less number of streams is firstly decoded, and the SIC-decoding order is fixed, so that the number of all combinations can be limited.

A detailed example associated with the above-mentioned description is shown in the following Table 27:

TABLE 27

| C | S | Combination details | # |
|---|---|---|---|
| 1 | 1 | {Codeword1, Stream1}<br>{Codeword1, Stream2}<br>{Codeword1, Stream3}<br>{Codeword1, Stream4} | 4 |
| 2 | 2 | [{Codeword1, Stream1}, {Codeword2, Stream2}]<br>[{Codeword1, Stream1}, {Codeword2, Stream3}]<br>[{Codeword1, Stream1}, {Codeword2, Stream4}]<br>[{Codeword1, Stream2}, {Codeword2, Stream3}]<br>[{Codeword1, Stream2}, {Codeword2, Stream4}]<br>[{Codeword1, Stream3}, {Codeword2, Stream4}] | 6 |
|   | 3 | [{Codeword1, Stream1}, {Codeword2, (Stream2, Stream3)}]<br>[{Codeword1, Stream1}, {Codeword2, (Stream2, Stream4)}]<br>[{Codeword1, Stream1}, {Codeword2, (Stream3, Stream4)}]<br>[{Codeword1, Stream2}, {Codeword2, (Stream1, Stream3)}]<br>[{Codeword1, Stream2}, {Codeword2, (Stream1, Stream4)}]<br>[{Codeword1, Stream2}, {Codeword2, (Stream3, Stream4)}]<br>[{Codeword1, Stream3}, {Codeword2, (Stream1, Stream2)}]<br>[{Codeword1, Stream3}, {Codeword2, (Stream1, Stream4)}]<br>[{Codeword1, Stream3}, {Codeword2, (Stream2, Stream4)}]<br>[{Codeword1, Stream4}, {Codeword2, (Stream1, Stream2)}]<br>[{Codeword1, Stream4}, {Codeword2, (Stream1, Stream3)}]<br>[{Codeword1, Stream4}, {Codeword2, (Stream2, Stream3)}] | 12 |
|   | 4 | [{Codeword1, (Stream1, Stream2)}, {Codeword2, (Stream3, Stream4)}]<br>[{Codeword1, (Stream1, Stream3)}, {Codeword2, (Stream2, Stream4)}]<br>[{Codeword1, (Stream1, Stream4)}, {Codeword2, (Stream2, Stream3)}] | 3 |
|   |   | Sub sum | 25 |

Therefore, a detailed embodiment of the present invention has a total of 25 cases. In each case, several codewords are used when several streams are used, and a single codeword has a maximum of 2 streams. And, in the case of an asymmetrical stream, i.e., if individual codewords use different numbers of streams, a codeword with less number of streams is assigned to a first codeword.

Also, a detailed description embodiment of the present invention has a total of 25 cases. In each case, if several streams are used, several codewords are used in consideration of usages of the SIC decoder contained in a receiver, the SIC-decoding order is fixed, and a single codeword has a maximum of 2 streams. And, in the case of an asymmetrical stream, i.e., if individual codewords use different numbers of streams, a codeword with less number of streams is firstly decoded. Therefore, the number of cases is 25, so that it must be denoted by a maximum of 5 bits ($2^4=16<25<2^5=32$). In this case, in the light of the number of bits of control information indicating all combinations, the above-mentioned case has a gain of 2 bits as compared to the cases shown in Tables 22 and 23.

As described above, each stream has a plurality of combinations. But, the present invention aims to reduce the number of combinations for each stream.

Figure 14:
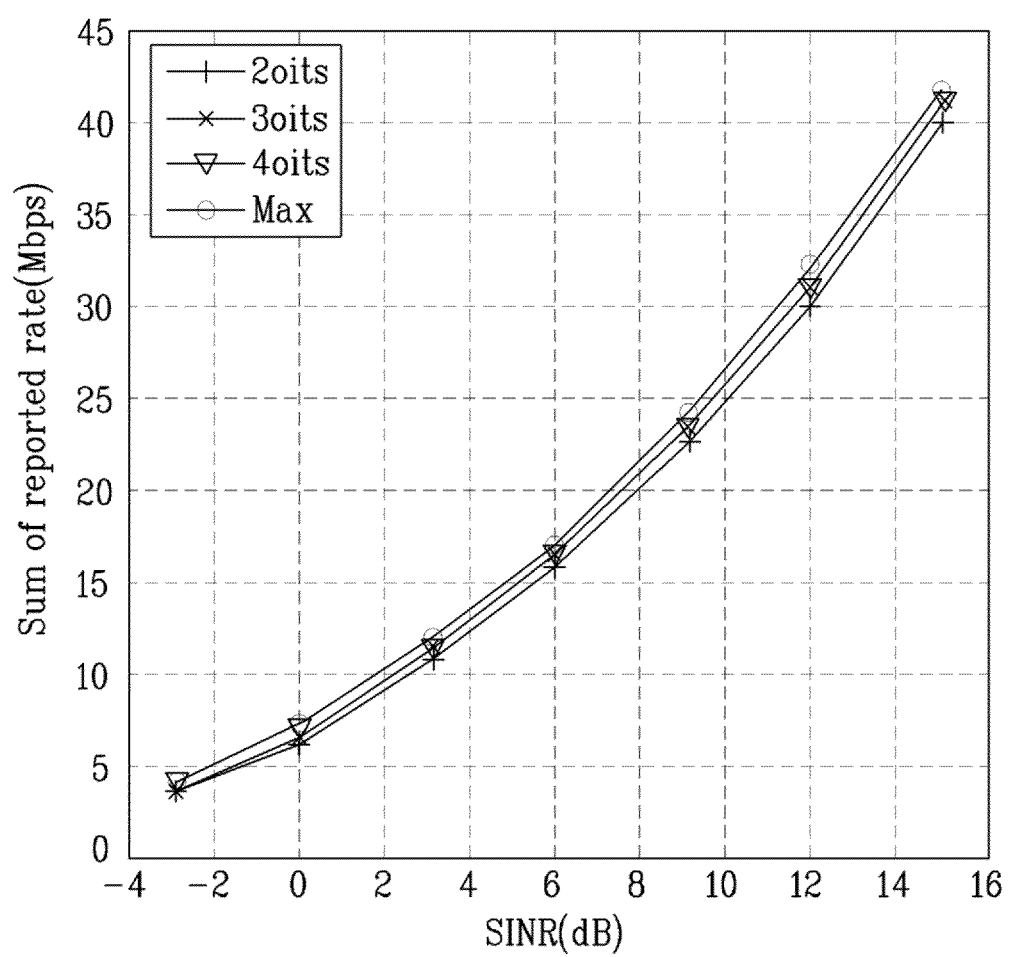
FIG. 14 shows the simulation result of a reception-end performance when the number of all combinations between a codeword and a stream is limited to a specific number of combinations capable of being indicated by a given bit number.

FIG. 14 shows the simulation result of a reception-end performance when the number of all combinations between a codeword and a stream is limited to a specific number of combinations capable of being indicated by a given bit number.

In more detail, FIG. 14 shows the simulation result in which 4 Tx antennas and 4 Rx antennas were used, i.e., a maximum number of streams is 4. Other simulation assumptions other than the number of antennas are equal to those of FIG. 12.

A detailed description of the simulation result of FIG. 14 will hereinafter be described. In the case where the number of all combinations is determined to be Tables and 23, this case is denoted by "max". If only one combination is allowed for each stream, the number of all combinations is 4, 4 combinations are denoted by 2 bits, as represented by "bit2". If two combinations are allowed for each stream, 8 cases are denoted by 3 bits, as represented by "bit3". If 4 combinations are allowed for each stream, 16 cases are denoted by 4 bits, as represented by "bit4".

As can be seen from the simulation result of FIG. 14, if only one combination is allowed for each stream, this case has a performance almost similar to that of another case in which all combinations are made available.

As can be seen from the simulation result of FIG. 14, although a combination selected for reducing combinations as many as the number of corresponding bits is arbitrarily selected, there is almost no difference in performance between this case and the above-mentioned case in which all combinations are made available. Therefore, in the aspect of reducing the number of cases in each combination, it is most preferable that the number of cases in each combinations be reduced to 4 combinations.

In a detailed example associated with the above-mentioned description, if a maximum of 4 streams and a maximum of 2 codewords are used, the "2 bit" case capable of being denoted by a minimum of combinations can be represented by the following Table 28:

TABLE 28

| C | S | Combination details | # |
|---|---|---|---|
| 1 | 1 | {Codeword1, Stream1} | 1 |
| 2 | 2 | [{Codeword1, Stream1}, {Codeword2, Stream2}] | 1 |
|   | 3 | [{Codeword1, Stream1}, {Codeword2, (Stream2, Stream3)}] | 1 |
|   | 4 | [{Codeword1, (Stream1, Stream2)}, {Codeword2, (Stream3, Stream4)}] | 1 |
|   |   | Sub sum | 4 |

Therefore, a detailed embodiment of the present invention has a total of 4 cases. In each case, if several streams are used, several codewords are used, a single codeword has a maximum of 2 streams, a codeword with less number of streams is set to a first codeword in the case of an asymmetrical stream, each stream uses only one combination.

Also, a detailed embodiment of the present invention has a total of 4 cases. In each case, if several streams are used in consideration of a specific case in which a receiver uses the SIC decoder, several codewords are used, the SIC decoding order is fixed, a single codeword has a maximum of 2 streams, a codeword with less number of streams is firstly decoded in the case of an asymmetrical stream, and only one stream is allowed for each stream. The total number of cases is 4, so that 4 cases must be denoted by a maximum of 2 bits ($2^1=2<4≤2^2=4$). In this case, in the light of the number of bits of control information indicating all combinations, the above-mentioned case has a gain of 5 bits as compared to the cases shown in Tables 22 and 23.

In the meantime, the "3 bit" case from among other detailed examples must select two combinations for each stream, and the "0bit" case must select four combinations for each stream. The above-mentioned examples are well known to those skilled in the art, so that their detailed description will be omitted for the convenience of description. In this case, a process for selecting a combination corresponding to a fixed number may be arbitrarily executed. By the simulation result, although the combination is arbitrarily selected, there is almost no difference in performance.

In the meantime, considering a specific case in which a HARQ (Hybrid ARQ) scheme is used in the above-mentioned combination, the addition of a combination may also be considered. If the number of codewords is 2, one codeword has an error, and the other codeword has no error, the number of retransmitted codewords is only one. If a chase combining technique which has been widely used for the HARQ is used for the retransmission, two codewords should be retransmitted without any modification from the first transmission. Therefore, the retransmitted codewords must be transmitted via one or two streams. A detailed description thereof will hereinafter be described.

It is assumed that two codewords are transmitted via three streams during a first transmission. Also, it is assumed that one of the two codewords has an error and the other one has no error. Especially, the retransmitted codeword is assumed to be only one first codeword, so that it is transmitted via only one stream. The case in which a single codeword is transmitted via a single stream is contained in an original combination, so that this case can be made available.

However, for another example, if a first codeword has no error and a second codeword has an error, a retransmitted codeword is only one second codeword and must be transmitted via two streams.

In addition, the case in which one codeword is transmitted via two streams is not contained in the original combination. In order to retransmit a desired codeword of the first transmission without any change, a combination in which a single codeword is mapped to two streams may also be added as necessary. The above-mentioned case is shown in the following Table 29:

TABLE 29

| C | S | Combination details | # |
|---|---|---|---|
| 1 | 1 | {Codeword1, Stream1} | 1 |
|   | 2 | [{Codeword1, Stream1, Stream2}] | 1 |
| 2 | 2 | [{Codeword1, Stream1}, {Codeword2, Stream2}] | 1 |
|   | 3 | [{Codeword1, Stream1}, {Codeword2, (Stream2, Stream3)}] | 1 |
|   | 4 | [{Codeword1, (Stream1, Stream2)}, {Codeword2, (Stream3, Stream4)}] | 1 |
|   |   | Sub sum | 5 |

The above-mentioned embodiments of the present invention have disclosed a variety of methods for minimizing the number of codeword-stream combinations from among all available combinations according to the number of given codewords and streams (or layers). A method for allowing the combination to effectively process data under a given condition, and transmitting a signal will hereinafter be described.

As described above, a general wireless communication system performs a channel coding to reliably transmit data. This channel coding indicates that a transmission performs a coding on Tx information using a forward error correction code, so that a channel error can be corrected by a receiver. The receiver demodulates an Rx signal, decodes the forward error correction code, and recovers Tx information. In this decoding process, the Rx-signal error caused by the channel is corrected.

An example of the forward error correction code is a turbo-code. The turbo-code includes at least two recursive systematic convolution encoders and an interleaver connecting between the at least two recursive systematic convolution encoders. The larger the data block, the higher the performance of the turbo-code. An actual communication system divides a predetermined-sized data block into several smaller-sized data blocks, and performs encoding on the divided blocks, so that it is really convenient to implement the actual communication system. These smaller-sized data blocks are called codeblocks. The forward error correction coding process is performed in units of a predetermined-sized codeblock, is mapped to wireless resources, and is then transmitted to a destination.

If wireless resources are mapped after the channel encoding is performed in units of a codeblock by the MIMO communication system, the spatial multiplexing is needed. The individual MIMO channels are independent of each other. If the spatial multiplexing of codeblocks is performed for multiple Tx antennas, a transmission efficiency can be improved.

Therefore, a method for effectively transmitting channel-encoded data via multiple Tx antennas is needed.

Therefore, one embodiment of the present invention provides a method for effectively transmitting data in consideration of the spatial multiplexing by the MIMO communication system, and a detailed description thereof will hereinafter be described.

A wireless communication system may be based on an Orthogonal Frequency Division Multiplexing (OFDM) scheme. This OFDM scheme uses several orthogonal sub-carriers. The OFDM scheme uses orthogonality between an Inverse Fast Fourier Transform (IFFT) and a Fast Fourier Transform (FFT). The transmitter performs the IFFT on data, and transmits the IFFT-resultant data. The transmitter uses the IFFT to combine multi-subcarriers. In order to separate the multi-subcarriers from each other, the receiver uses the FFT corresponding to the multi-subcarrier. The OFDM scheme reduces the complexity of the receiver under frequency selective fading environments of a broadband channel, uses different channel characteristics of sub-carriers, and performs selective scheduling in a frequency domain, thereby increasing spectral efficiency. The Orthogonal Frequency Division Multiple Access (OFDMA) scheme is a multiple access scheme based on the OFDM scheme. By the OFDMA scheme, different sub-carriers are assigned to multiple users, so that the efficiency of wireless resources increases.

Figure 15:
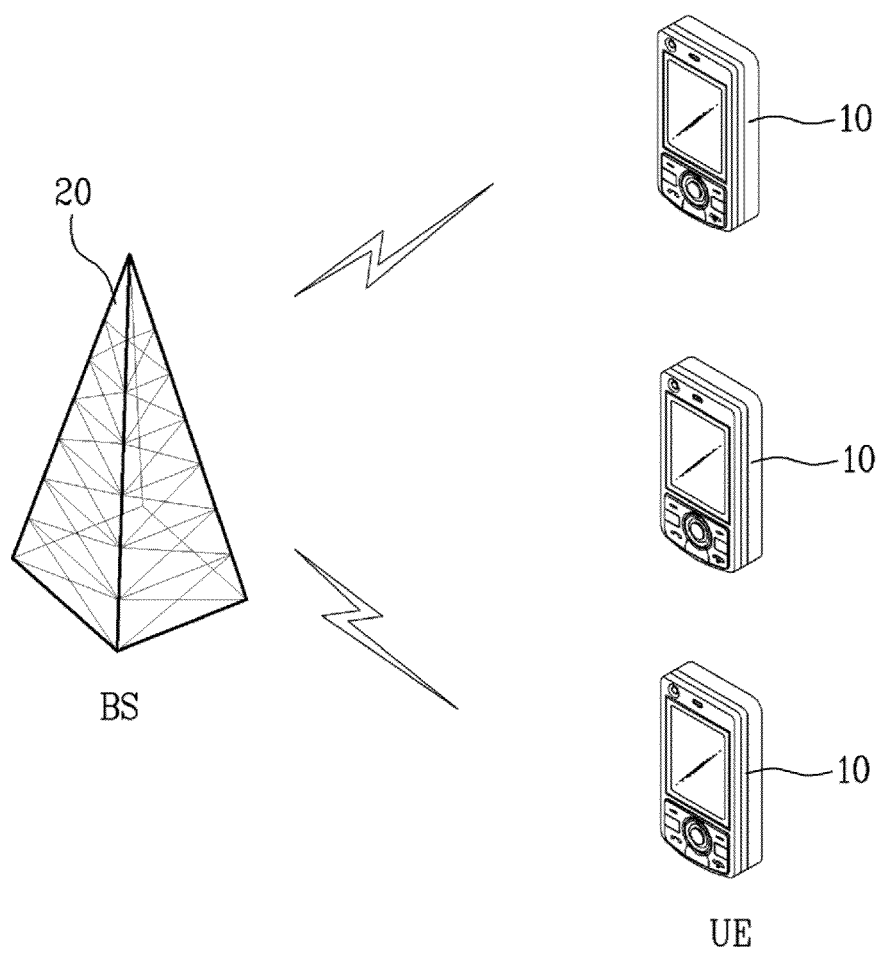
FIG. 15 is a block diagram illustrating a wireless communication system.

FIG. 15 is a block diagram illustrating a wireless communication system.

The wireless communication system has been widely used to provide a variety of communication services, for example, voice or packet data.

Referring to FIG. 15, the wireless communication system includes a user equipment (UE) 10 and a base station (BS) 20. The user equipment (UE) 10 may be fixed or have mobility. The user equipment (UE) may also be called a Mobile Station (MS), a User Terminal (UT), a Subscriber Station (SS) or a wireless device. The base station (BS) 20 may be a fixed station communicating with the user equipment (UE) 10, or may also be called a Node-B, a Base Transceiver System (BTS), or an Access Point (AP). A single base station (BS) 20 may have one or more cells.

The term "downlink" is indicative of a communication path from the base station (BS) 20 to the user equipment (UE) 20. The term "uplink" is indicative of a communication path from the user equipment (UE) 10 to the base station (BS) 20. A transmitter for use in the downlink may be some parts of the base station (BS) 20, or a receiver may be some parts of the user equipment (UE) 10. A transmitter for use in the uplink may be some parts of the user equipment (UE) 10, or a receiver may be some parts of the base station (BS) 20.

Figure 16:
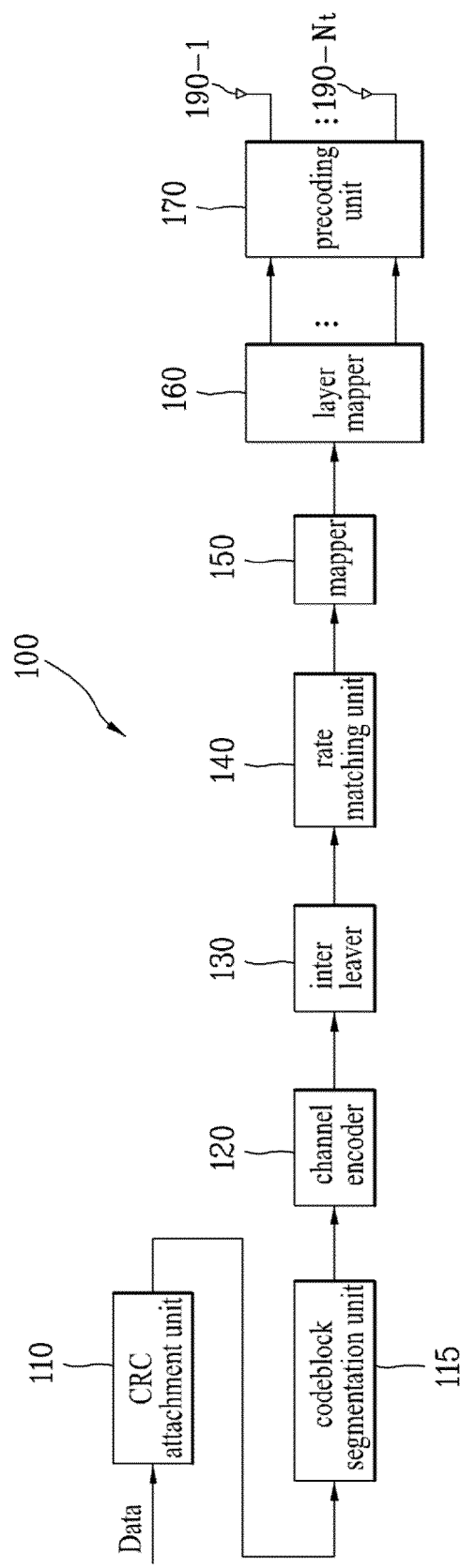
FIG. 16 is a block diagram illustrating a transmitter according to one embodiment of the present invention.

FIG. 16 is a block diagram illustrating a transmitter according to one embodiment of the present invention.

Referring to FIG. 16, a transmitter 100 includes a CRC attachment unit 110, a codeblock segmentation unit 115, a channel encoder 120, an interleaver 130, a rate matching unit 140, a mapper 150, a layer mapper 160-, and a precoding unit 170. The transmitter 100 includes Nt Tx antennas (190-1, . . . , 190-Nt) (where Nt>1).

The CRC attachment unit 110 attaches a cyclic redundancy check (CRC) code for detecting an error to input data. The codeblock segmentation unit 155 segments the CRC-added code into codeblock units. In this case, the CRC code may be attached to data, and be then segmented into codeblock units. Otherwise, the CRC code may be attached to data in codeblock units.

The channel encoder 120 performs channel encoding on codeblocks. The interleaver 130 performs interleaving on the channel-encoded codes. The rate matching unit 140 adjusts the interleaved codes according to the amount of wireless resources used for actual transmission. The rate matching may be conducted by a puncturing or repetition process. The mapper 150 maps the rate-matched code to a symbol indicating a signal constellation location. An interleaver (not shown) may be located before the mapper 150. Namely, the interleaver may be located between the rate matching unit 140 and the mapper 150.

The layer mapper 160 performs mapping of input symbols according to individual layers caused by the spatial multiplexing. The mapped-resultant data for each layer is called a datastream. The precoding unit 170 precodes an input datastream according to the MIMO scheme based on transmission antennas (190-1, . . . 190-Nt).

In this case, several datastreams are generated from a single channel-encoded code in the system of FIG. 16, so that this system is called a single codeword (SCW) system.

Figure 17:
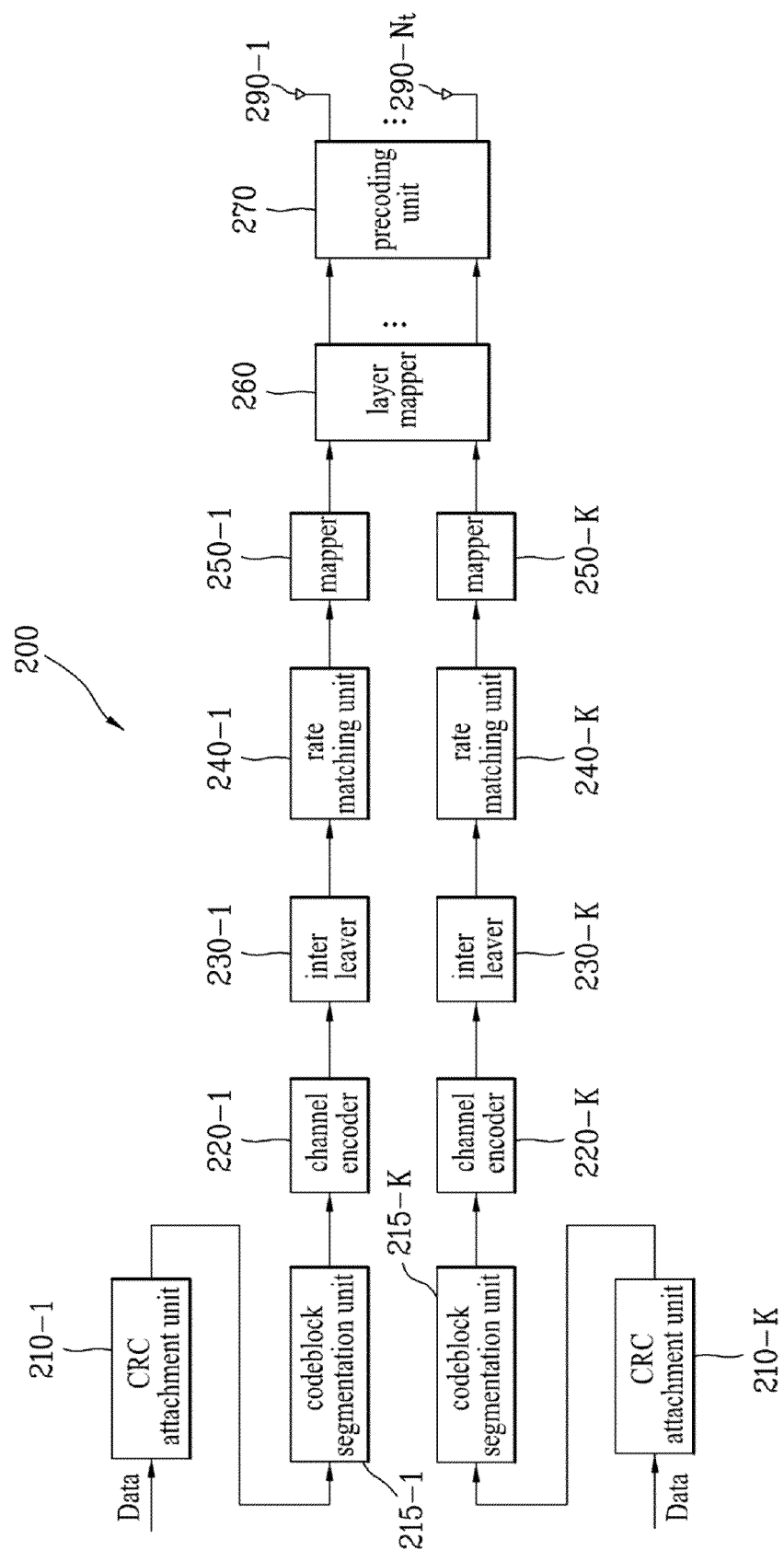
FIG. 17 is a block diagram illustrating a transmission according to another embodiment of the present invention.

FIG. 17 is a block diagram illustrating a transmission according to another embodiment of the present invention.

Compared with the transmitter 100 shown in FIG. 16, the transmission of FIG. 17 generates several datastreams upon receiving at least one channel-encoded code, so that the system of FIG. 17 is called a multiple codeword (MCW) system.

Referring to FIG. 17, the transmitter 200 includes a plurality of CRC attachment units (210-1, . . . , 210-K) (where K>1), a plurality of codeblock segmentation units (215-1, . . . , 215-K), a plurality of channel encoders (220-1, . . . , 220-K), a plurality of interleavers (230-1, . . . , 230-K), a plurality of rate matching units (240-1, . . . , 240-K), a plurality of mappers (250-1, . . . , 250-K), a layer mapper 260, and a precoding unit 270. The transmitter 200 includes Nt Tx antennas (290-1, . . . , 290-Nt) (where Nt>1). The CRC attachment unit (210-1, . . . , 210-K) attaches a cyclic redundancy check (CRC) code for detecting an error to input data. The codeblock segmentation unit (215-1, . . . , 215-K) segments the CRC-added code into codeblock units. The channel encoder (220-1, . . . , 220-K) performs channel encoding on codeblocks. The interleaver (240-1, . . . , 230-K) performs interleaving on the channel-encoded codes. The rate matching unit (240-1, . . . , 240-K) adjusts the interleaved codes according to the amount of wireless resources used for actual transmission. The rate matching may be conducted by a puncturing or repetition process. The mapper (250-1, . . . , 250-K) maps the rate-matched code to a symbol indicating a signal constellation location. An interleaver (not shown) may be located between the rate matching unit (240-1, . . . , 240-K) and the mapper (250-1, . . . , 250-K).

The layer mapper 260 performs mapping of input symbols according to individual layers caused by the spatial multiplexing. The mapped-resultant data for each layer is called a datastream. This datastream may also be called a layer. The precoding unit 270 precodes an input datastream according to the MIMO scheme based on transmission antennas (290-1, . . . 290-Nt).

Figure 18:
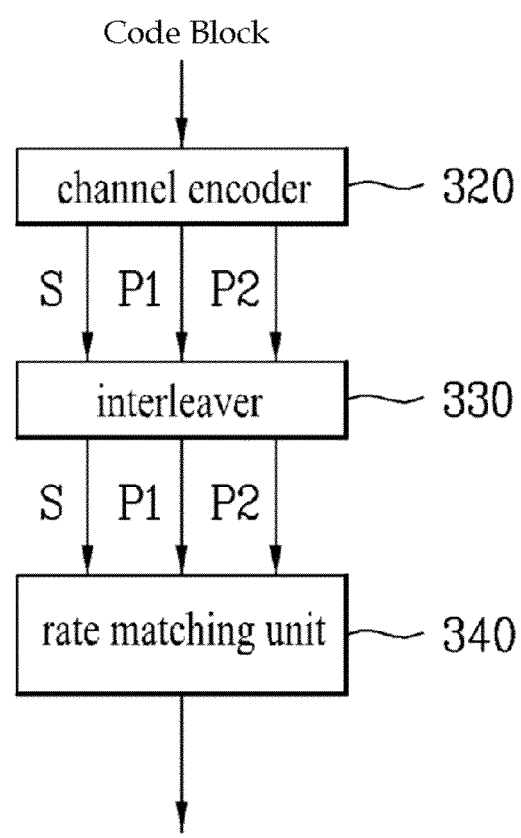
FIG. 18 is a block diagram illustrating a channel encoding scheme according to one embodiment of the present invention.

FIG. 18 is a block diagram illustrating a channel encoding scheme according to one embodiment of the present invention.

Referring to FIG. 18, the channel coding, the interleaving, and the rate matching are performed on a single codeblock, so that the single codeblock is transmitted via several datastreams. The codeblock is a predetermined-sized data block for performing the channel encoding. The codeblock may have the same size, and several codeblocks may have different sizes.

Referring to FIG. 18, the channel encoder 320 performs the channel encoding on an input codeblock. The channel encoder 320 may be a turbo-code. The turbo-code may include a recursive systematic convolution encoder and an interleaver. The turbo-code generates a systematic bit and a parity bit in bit units upon receiving the input codeblock. In this case, it is assumed that a code rate is ⅓, and a single systematic block S and two parity blocks P1 and P2 are generated. The systematic block is a set of systematic bits, and the parity block is a set of parity bits.

The interleaver 330 performs interleaving on the channel-encoded codeblock, so that it reduces the influence of a burst error caused by RF-channel transmitter. The interleaver 330 may perform the interleaving on the systematic block S and each parity block P1 or P2, respectively.

The rate matching unit 340 adjusts the channel-encoded codeblock according to the size of radio resources. The rate matching may be performed in units of the channel-encoded codeblock. Or, the systematic block S and two parity blocks P1 and P2 are separated from each other, so that the rate matching may be performed on each of them.

A data transmitter method based on the spatial multiplexing will hereinafter be described.

For the convenience of description and better understanding of the present invention, it is assumed that data is transmitted via two datastreams (i.e., two layers).

The systematic block S and two parity blocks P1 and P2 generated from a single codeblock are equally distributed to two datastreams, and are then transmitted to a destination. In the case where the codeblock is equally distributed to two data blocks and be then transmitted to the destination, a system may acquire the spatial diversity, resulting in the increased performance. The systematic block S is more important for the decoding as compared to two parity blocks P1 and P2. So, if the systematic block S is transmitted to a datastream having a better channel condition, the performance may be improved. In this case, if two datastreams are mapped to radio resources, a specific pattern may be used as necessary.

Next, it is assumed that there are two or more codeblocks to be transmitted. In this case, it is assumed that three codeblocks are equally distributed to two datastreams, and are then transmitted to a destination.

Figure 19:
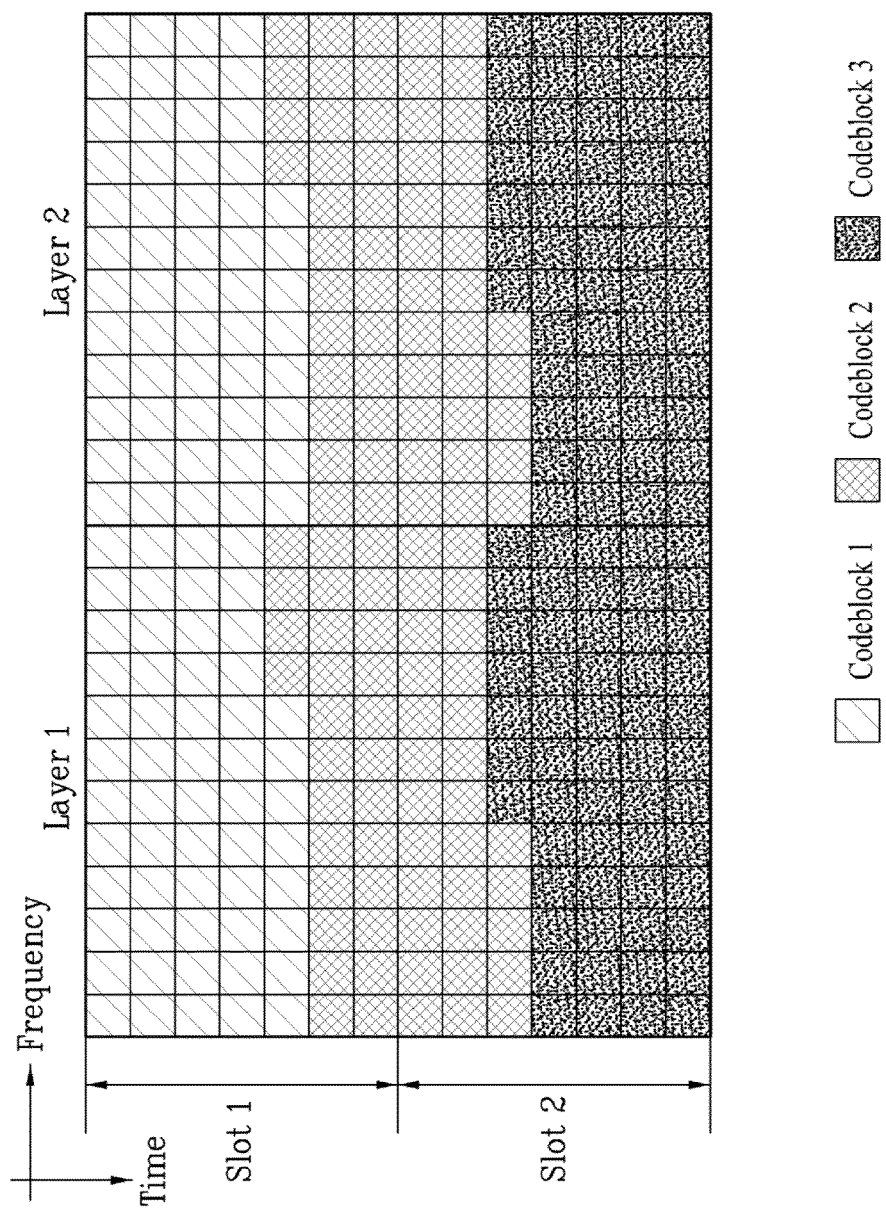
FIG. 19 is a conceptual diagram illustrating a data transmission according to one embodiment of the present invention.

FIG. 19 is a conceptual diagram illustrating a data transmission according to one embodiment of the present invention.

Referring to FIG. 19, two datastreams (i.e., two layers) are distributed to a frequency domain during a single subframe, so that they are separated from each other in the frequency domain. A single subframe is indicative of a frequency domain, which includes a plurality of resource blocks. A single resource block includes a plurality of sub-carriers. For example, a single resource block may include 12 sub-carriers. A single subframe is indicative of a time domain including two slots, each of which includes 7 OFDM symbols. However, the above-mentioned description exemplarily defines the number of resource blocks, the number of slots, and the number of OFDM symbols contained in the single subframe, so that the scope of the present invention is not limited to the above-mentioned values, and can also be applied to other examples.

A single codeblock is equally mapped to two datastreams. Radio resources allocated to the single codeblock are equally allocated to the two datastreams. After the single codeblock has been mapped, the next codeblock is mapped by the same method as in the mapped codeblock. In this case, three codeblocks are equally distributed to two datastreams, and are then mapped. In this case, an interval occupied in the time domain may be a minimum interval.

In the case of using the turbo-code, a single codeblock is divided into a systematic block S and two parity blocks P1 and P2. The systematic block S and the parity blocks P1 and P2 are equally distributed to two datastreams, and are then transmitted to a destination. The mapping of the systematic block S and the parity blocks P1 and P2 may have a specific pattern. Specifically, the systematic block S is more important for the error correction as compared to the parity blocks P1 and P2, so that the systematic block S may be equally distributed to two datastreams, and be then transmitted to a destination. Therefore, the spatial diversity gain for the systematic block S may be acquired, or the systematic block S may be mapped to a datastream having a good channel condition.

The codeblock is distributed to two datastreams, and is then mapped. And, two datastreams are transmitted via multiple antennas, so the spatial diversity gain caused by the datastream is acquired. The codeblock is equally mapped to two datastreams, so that the decoding delay caused by transmission of the datastreams can be reduced.

When the codeblock is mapped to N datastreams (where N>1 and N=even number), it can be equally mapped to the N datastreams. If N is an odd number, the codeblock may be maximum-equally mapped to the N datastreams.

Figure 20:
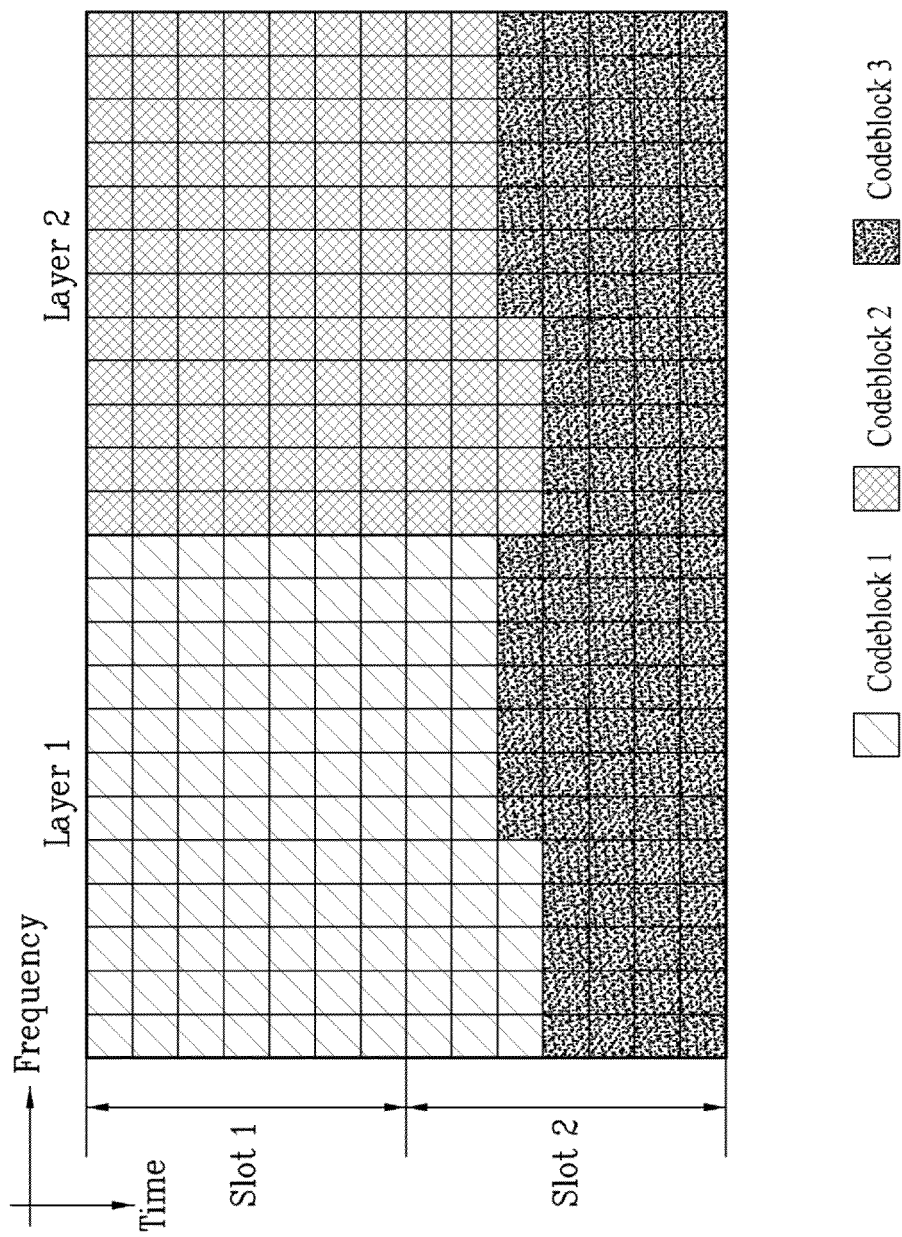
FIG. 20 is a conceptual diagram illustrating a data transmission according to another embodiment of the present invention.

FIG. 20 is a conceptual diagram illustrating a data transmission according to another embodiment of the present invention.

In more detail, FIG. 20 shows an exemplary case in which a codeblock is distributed to two datastreams, and is then transmitted via the two datastreams.

Referring to FIG. 20, a first codeblock is mapped to one of the two datastreams, and a second codeblock is mapped to the other datastream. A third codeblock is mapped via two datastreams.

When a single codeblock is mapped to a single datastream, a redundant codeblock may occur. In other words, when M codeblocks (where M>1) are mapped to N datastreams (where N>1), the relationship between the M and N values is not denoted by a multiple, as denoted by M=k×N+q (k=integer, 0<q<N−1). In this case, the q codeblock may be distributed to N datastreams, and be then mapped to them.

If a single codeblock includes a systematic block S and parity blocks P1 and P2, the systematic block S and the parity blocks P1 and P2 may be mapped to a single datastream according to a specific pattern.

Figure 21:
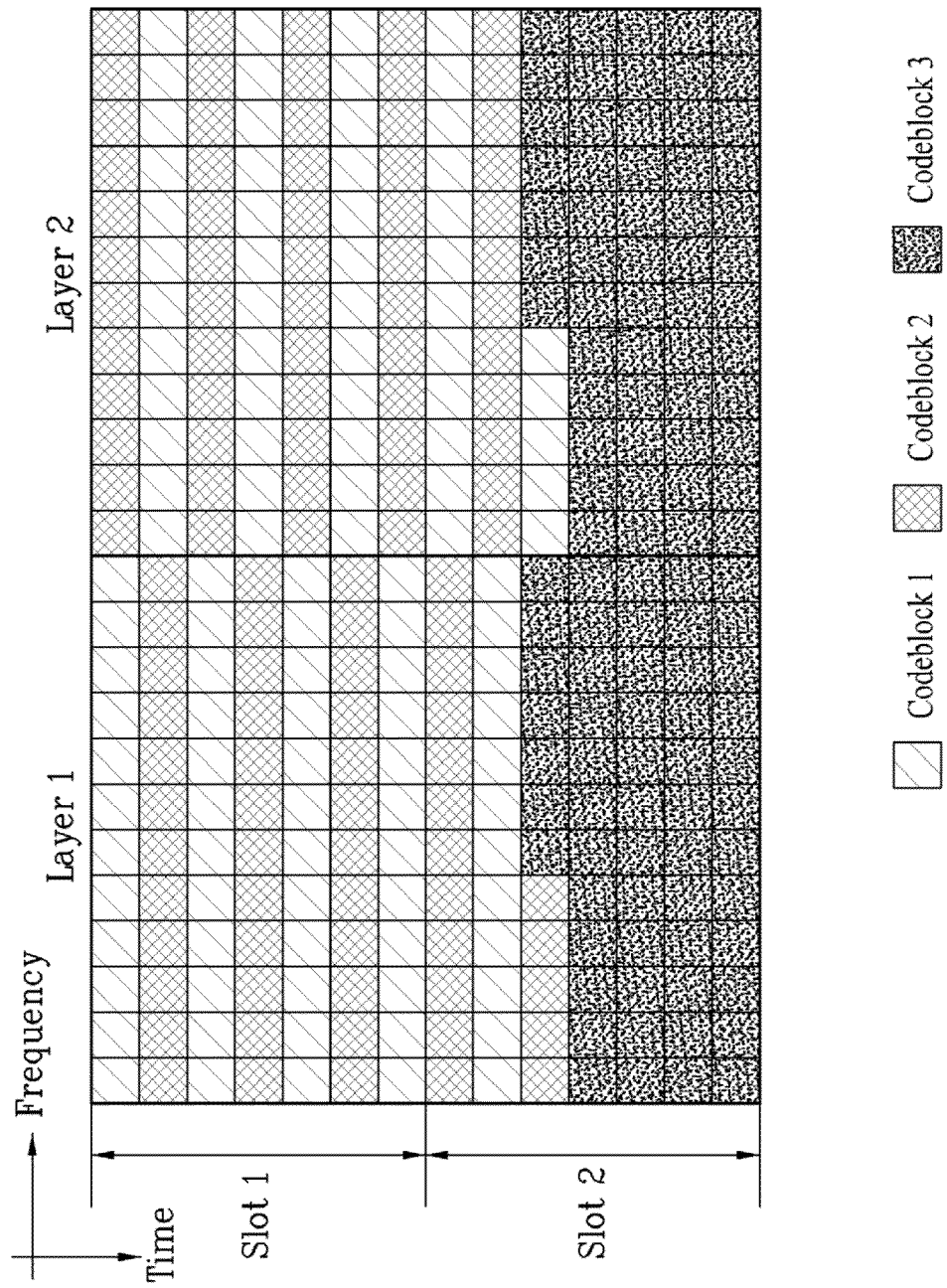
FIG. 21 is a conceptual diagram illustrating a data transmission according to yet another embodiment of the present invention.

FIG. 21 is a conceptual diagram illustrating a data transmission according to yet another embodiment of the present invention.

Referring to FIG. 21, a first codeblock and a second codeblock are mapped to two datastreams according to a specific pattern. The first codeblock and the second codeblock cross each other in units of an OFDM symbol. A third codeblock is mapped via two datastreams.

If M codeblocks are transmitted during L OFDM symbol intervals, the first codeblock is mapped to N datastreams during a "ceil(L/M)" interval, and the second codeblock is mapped. "ceil(x)" may be a minimum integer higher than "x". Symbols from a first OFDM symbol to the ceil(L/M)−1 OFDM symbol are fully filled with data, but the ceil(L/M)-th OFDM symbol may be partially filled. Subsequently, the next codeblock is mapped.

If a single codeblock includes the systematic block S and parity blocks P1 and P2, the systematic block S and the parity blocks P1 and P2 may be equally mapped with two datastreams. The mapping of the systematic block S and the parity blocks P1 and P2 via the two datastreams may have a specific pattern.

Figure 22:
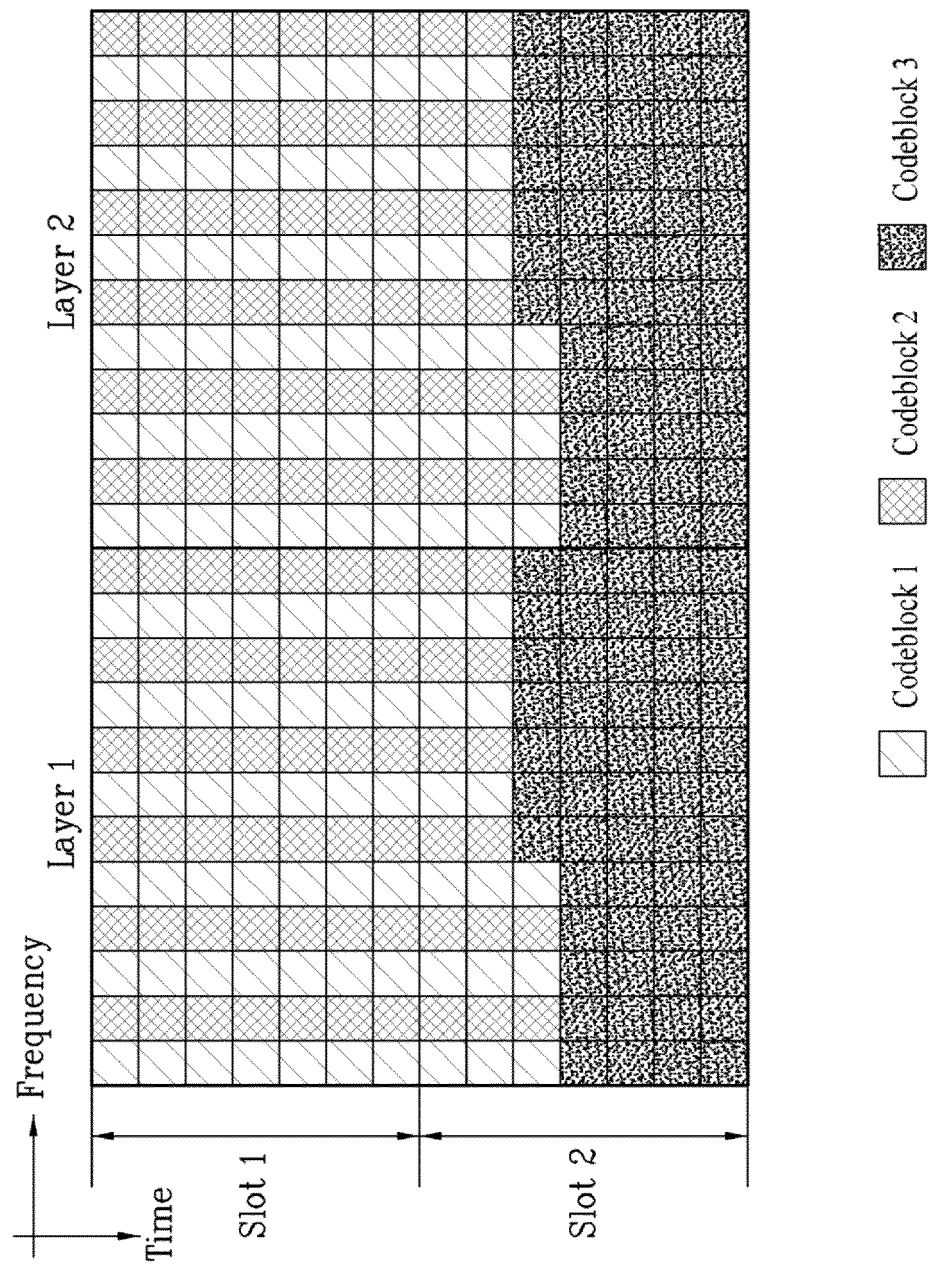
FIG. 22 is a conceptual diagram illustrating a data transmission according to yet another embodiment of the present invention.

FIG. 22 is a conceptual diagram illustrating a data transmission according to yet another embodiment of the present invention.

Referring to FIG. 22, a first codeblock and a second codeblock are mapped to two datastreams according to a specific pattern. The first codeblock and the second codeblock cross each other in units of a resource block. A third codeblock is mapped via two datastreams.

If a single codeblock includes the systematic block S and parity blocks P1 and P2, the systematic block S and the parity blocks P1 and P2 may be equally mapped with two datastreams. The mapping of the systematic block S and the parity blocks P1 and P2 via the two datastreams may have a specific pattern.

Figure 23:
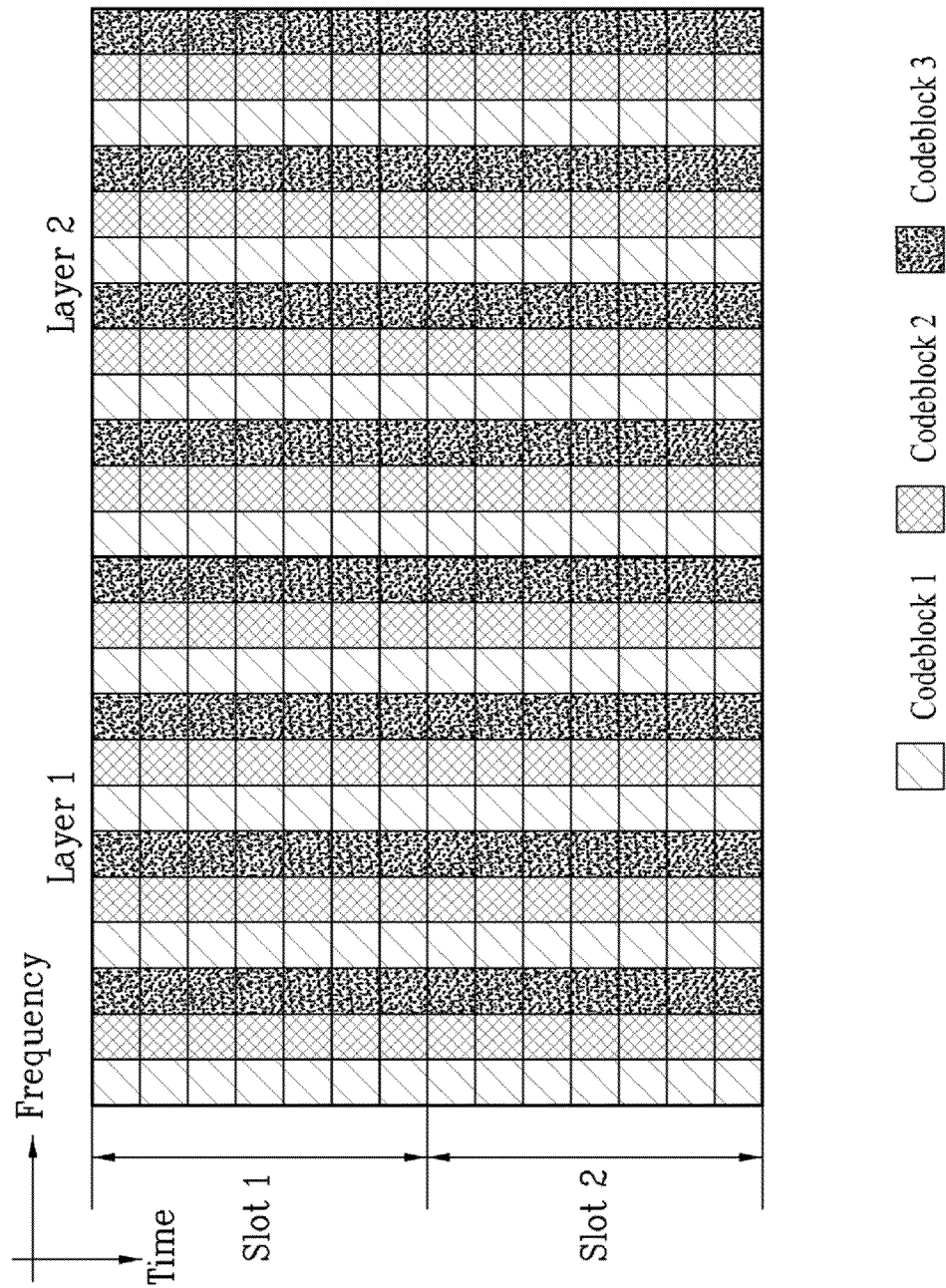
FIG. 23 is a conceptual diagram illustrating a data transmission according to yet another embodiment of the present invention.

FIG. 23 is a conceptual diagram illustrating a data transmission according to yet another embodiment of the present invention.

Referring to FIG. 23, three codeblocks are mapped via all subframes. The three codeblocks are transmitted via two datastreams. The three codeblocks may be mapped to two datastreams according to a specific pattern.

In this case, 3 codeblocks are mapped one by one in units of a resource block (i.e., on a frequency axis), and the 3 codeblocks may be mapped one by one in units of an OFDM symbol (i.e., on a time axis).

The above-mentioned codeblock segmentation method and the data transmitter method using the same will hereinafter be described in detail. For the better understanding of the present invention, a data processing step of OFDM-based transmission/receivers will also be described in detail.

Figure 24A:
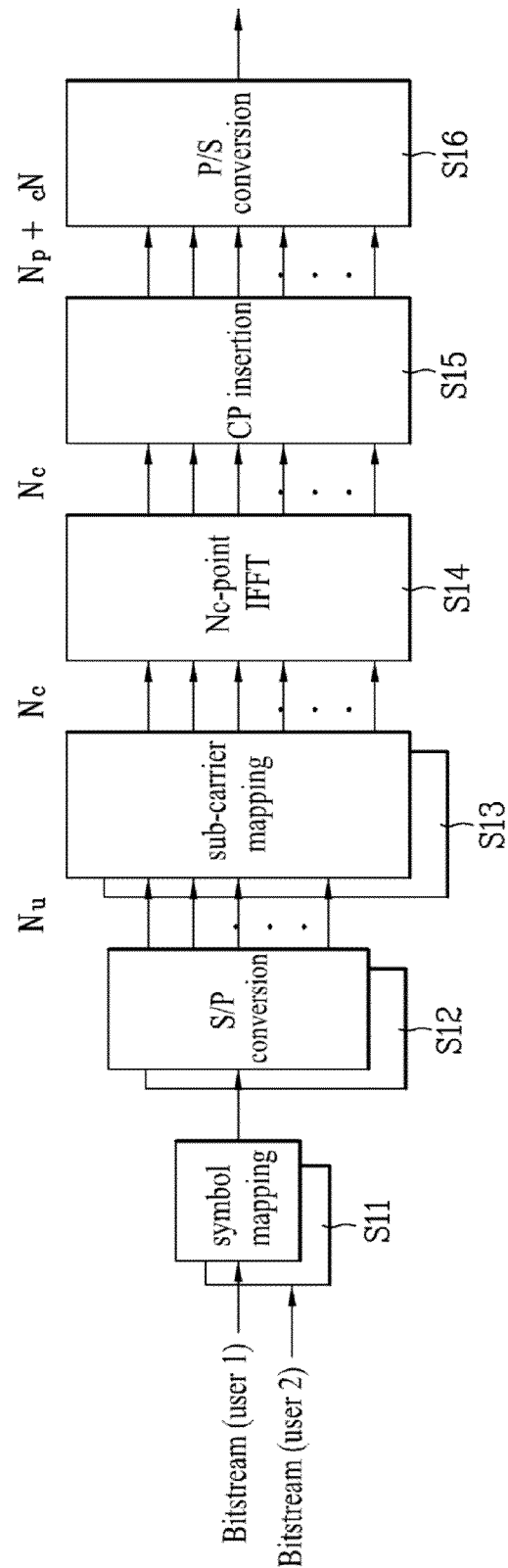
FIG. 24A is a block diagram illustrating a data processing method of a transmitter according to an OFDMA scheme.
Figure 24B:
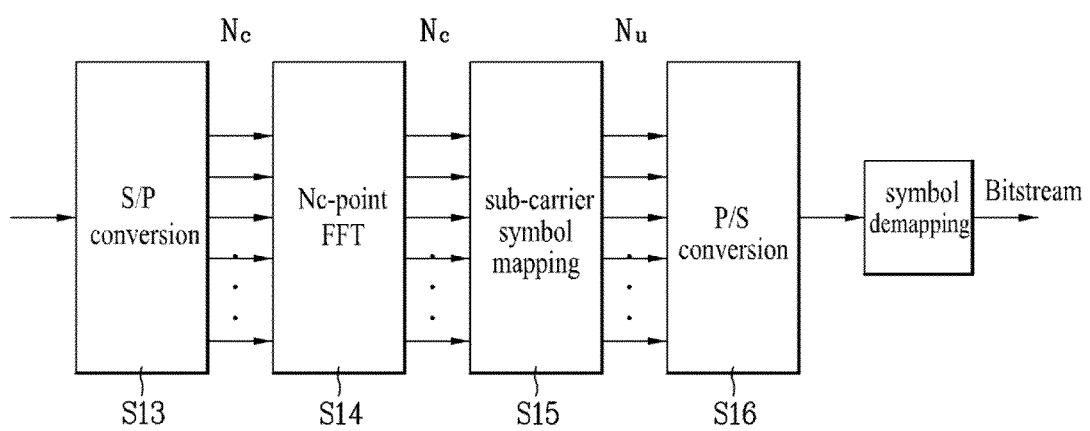
FIG. 24B is a block diagram illustrating a data processing method of a receiver according to an OFDMA scheme.

FIG. 24A is a block diagram illustrating a data processing method of a transmitter according to an OFDMA scheme. FIG. 24B is a block diagram illustrating a data processing method of a receiver according to an OFDMA scheme.

Referring to FIG. 24A, the transmitter end performs a modulation or a symbol mapping (also called a constellation mapping) on a bit stream for each user according to a QPSK (Quadrature Phase Shift Keying)-, 16 QAM (Quadrature Amplitude Modulation)-, or 64 QAM-modulation scheme at step S11. By this symbol mapping, at least two bits are mapped to one symbol.

The bit stream is mapped to a data symbol. This data symbol is converted into a parallel data symbol by a S/P (Serial/Parallel) converter at step S12. By the S/P conversion, the data symbol is converted into parallel symbols as many as the number of sub-carriers allocated to each user (n). As shown in FIG. 24A, a data symbol of a first user 1 is converted into parallel symbols as many as the number (Nu(1)) of sub-carriers allocated to the first user 1. The sub-carriers allocated to individual users (n) may be equal to each other or be different from each other, so that the data symbols of the individual may be converted into the same or different numbers of parallel symbols. In this case, the different numbers of parallel symbols are denoted by Nu(n).

The parallel data symbols for a specific user are mapped to Nu(n) sub-carriers assigned to a n-th user from among all Nc sub-carriers, and the remaining Nc−(Nu(n)) sub-carriers are mapped to data symbols of other users at step S13. By a symbol-to-subcarrier mapping module, the sub-carrier to which no user is allocated is filled with i.e., a zero-padding. The output of the symbol-to-subcarrier mapping module is converted into time-domain signals by an Nc-point IFFT (Inverse Fast Fourier Transform) module at step S14.

A cyclic prefix (CP) is inserted into the OFDM symbol generated from the above-mentioned IFFT module to reduce an inter-symbol interference (ISI) at step S15. The CP-inserted OFDM symbols are converted into serial symbols by a parallel-to-serial converter at step S16, and then the serial symbols are transmitted to a receiver.

Referring to FIG. 24B, the data processing method of the receiver according to the OFDMA scheme is performed in reverse order of a data processing method of the transmitter. The received data symbols pass the S/P converter and the Nc-point FFT module, and then a subcarrier-to-symbol mapping process is applied to the resultant data symbols. Parallel symbols are converted into serial symbols, are demapped, and a bit stream is generated.

The above-mentioned turbo-code from among a variety of channel-coding methods will hereinafter be described.

A turbo-encoder includes two encoders (i.e., a constituent encoder and a recursive systematic convolution encoder) and an interleaver. The interleaver is adapted to facilitate the parallel decoding of the turbo-code, and is a kind of Quadratic Polynomial Permutation (QPP). This QPP interleaver has defined the size of only a specific data block. The larger the data-block size, the higher the turbo-code performance.

However, an actual communication system divides a pre-determined-sized data block (e.g., a transport block) into several smaller-sized data blocks, and then performs coding on the smaller-sized data blocks, so that it is really convenient to implement the actual communication system. These smaller-sized data blocks are called codeblocks. In other words, a single codeword with a long length is divided into several codeblocks. Generally, a single unit coded by both the CRC and the forward error correction code is called a codeword. However, the term "codeword" of the present invention indicates a data unit. This data unit is acquired when the CRC-added transport block is channel-encoded. Therefore, if the size of a single transport block is larger than a reference value, and is then segmented into two or more codeblocks, all codeblocks are channel-encoded so that a single codeword is made.

Generally, the codeblocks have the same size. But, due to the limitation in the size of the QPP interleaver, one codeblock from among several codeblocks may have a different size. The forward error correction coding process is performed in units of a codeblock, and the interleaving is also performed on the resultant data, so that the influence of a burst error during a RF-channel transmission can be reduced.

Thereafter, the resultant data is mapped to actual radio resources, and then transmitted to a destination. Since the amount of radio resources used for actual transmission is constant, the rate matching for the encoded codeblocks is needed. Generally, the rate matching is performed by a puncturing or repetition process. The rate matching may be performed in units of an encoded codeblock as in the 3GPP WCDMA system. The systematic part and the parity part of the encoded codeblock are separated from each other, and the rate matching may be performed on each of them.

Figure 25:
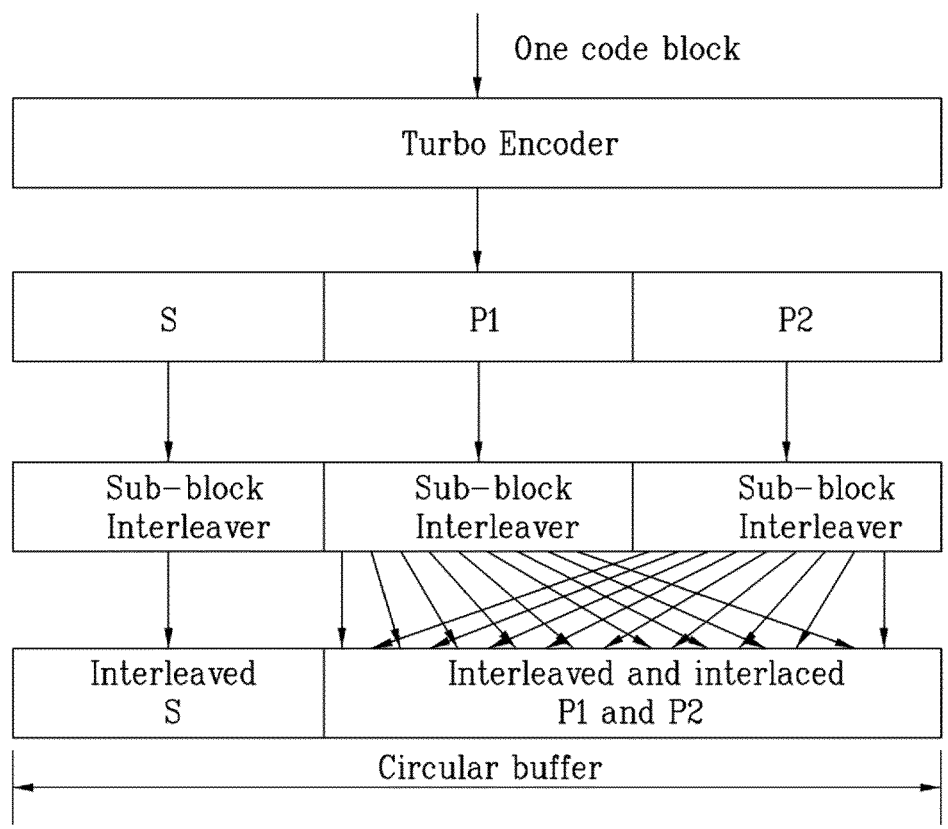
FIG. 25 is a conceptual diagram illustrating a method for separating a systematic part and a parity part of a coded code-block from each other, and performing a rate-matching on the separated parts.

FIG. 25 is a conceptual diagram illustrating a method for separating a systematic part and a parity part of a coded code-block from each other, and performing a rate-matching on the separated parts.

Referring to FIG. 25, a circular buffer may perform the rate matching according to a transmission start position and the size of data to be transmitted. In FIG. 25, it is assumed that a code rate is ⅓.

The MIMO communication system based on the spatial multiplexing uses the SCW (Single Codeword) method and the MCW (Multiple Codewords) method. The SCW method indicates that a single codeword is transmitted via several Tx datastreams, and the MCW method indicates that one or more codewords are transmitted.

Figure 26A:
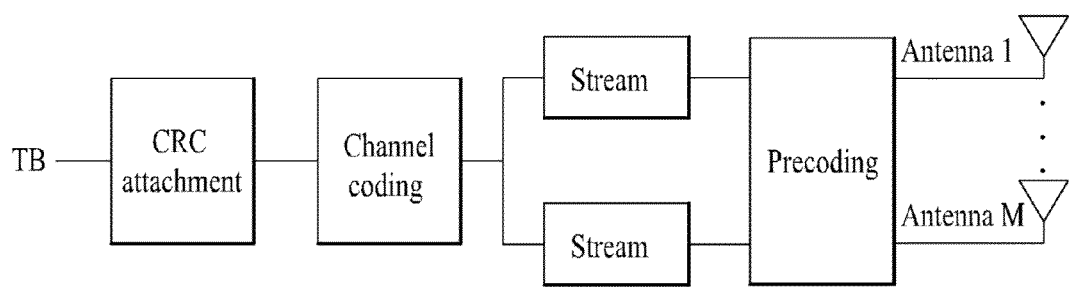
FIGS. 26A~26B are conceptual diagrams illustrating a single codeword (SCW) and multiple codewords (MCW), respectively.
Figure 26B:
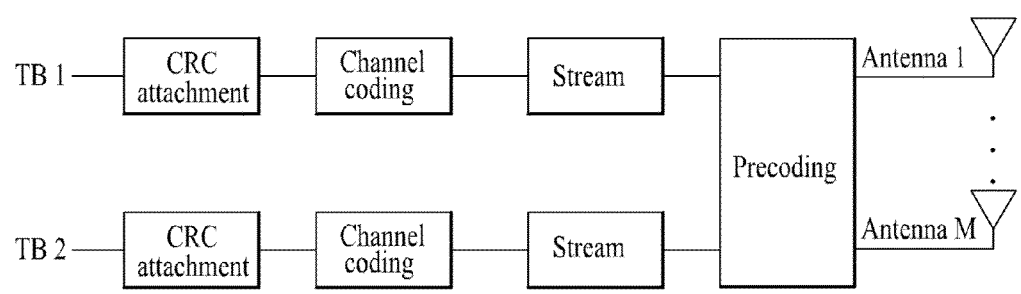

FIGS. 26A~26B are conceptual diagrams illustrating a single codeword (SCW) and multiple codewords (MCW), respectively. A hybrid of the SCW and MCW method may also be made available. For example, provided that four Tx antennas and four Rx antennas are used, only two codewords may be used. In this case, two SCWs transmitting two datastreams are interconnected so that the MCW system is configured.

Figure 27:
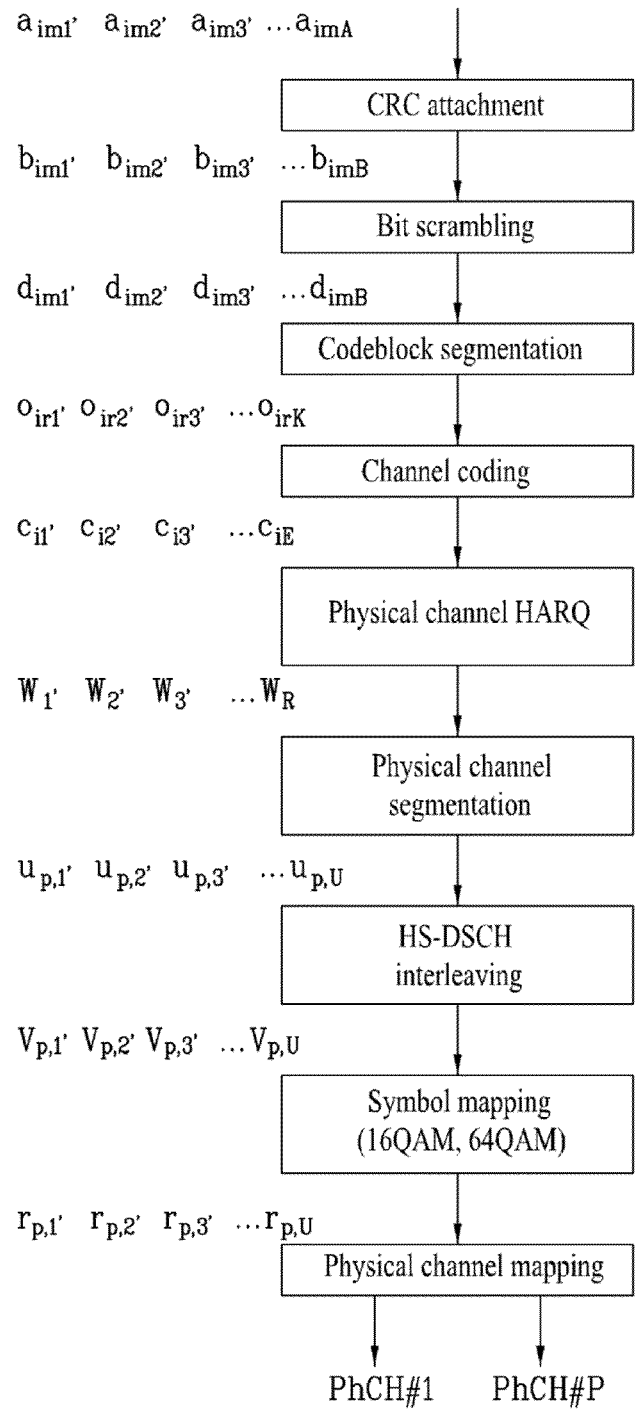
FIG. 27 shows a coding chain used for a HS-DSCH of a WCDMA system according to the present invention.

FIG. 27 shows a coding chain used for a HS-DSCH of a WCDMA system according to the present invention.

If the spatial multiplexing is used, a maximum of 2 datastreams can be transmitted, and the streams are transmitted via the MCW. A coding chain of a first case in which a single stream is transmitted is equal to that of a second case in which two streams are transmitted.

If a wireless communication system transmits data via multiple Tx antennas, a data processing method for effectively segmenting a single codeword into two or more layers will hereinafter be described.

In order to reduce the influence of fading in the wireless communication system, the present invention provides a data processing method for transmitting data via the multiple Tx antennas, and a detailed description thereof will hereinafter be described.

The fading is one of the principal reasons causing a deterioration of performance of the wireless communication system. The channel gain value is changed with time, frequency, and space. The lower the channel gain, the lower the performance. A diversity method used as one of solutions for the fading phenomenon uses the fact that there is a low probability that all independent channels have low gain values. Generally, the longer the time-, frequency-, or space-distance, the higher the independency of a correlation of a channel gain value between two points on time, frequency, or space. Therefore, in order to solve the fading problem, the codeblock-encoded bits are arranged to be evenly dispersed in a time-, frequency-, or space-domain, so that they acquire a higher gain caused by the diversity.

The following embodiments will disclose examples in which inventive features of the present invention are applied to an Evolved Universal Mobile Telecommunications System (E-UMTS). The E-UMTS may also be called a Long Term Evolution (LTE) system. The technical specifications of the UMTS or E-UMTS have been prescribed in Releases 7 and 8 of Technical Specification Group Radio Access Network of the 3rd Generation Partnership Project (GPP).

Figure 28:
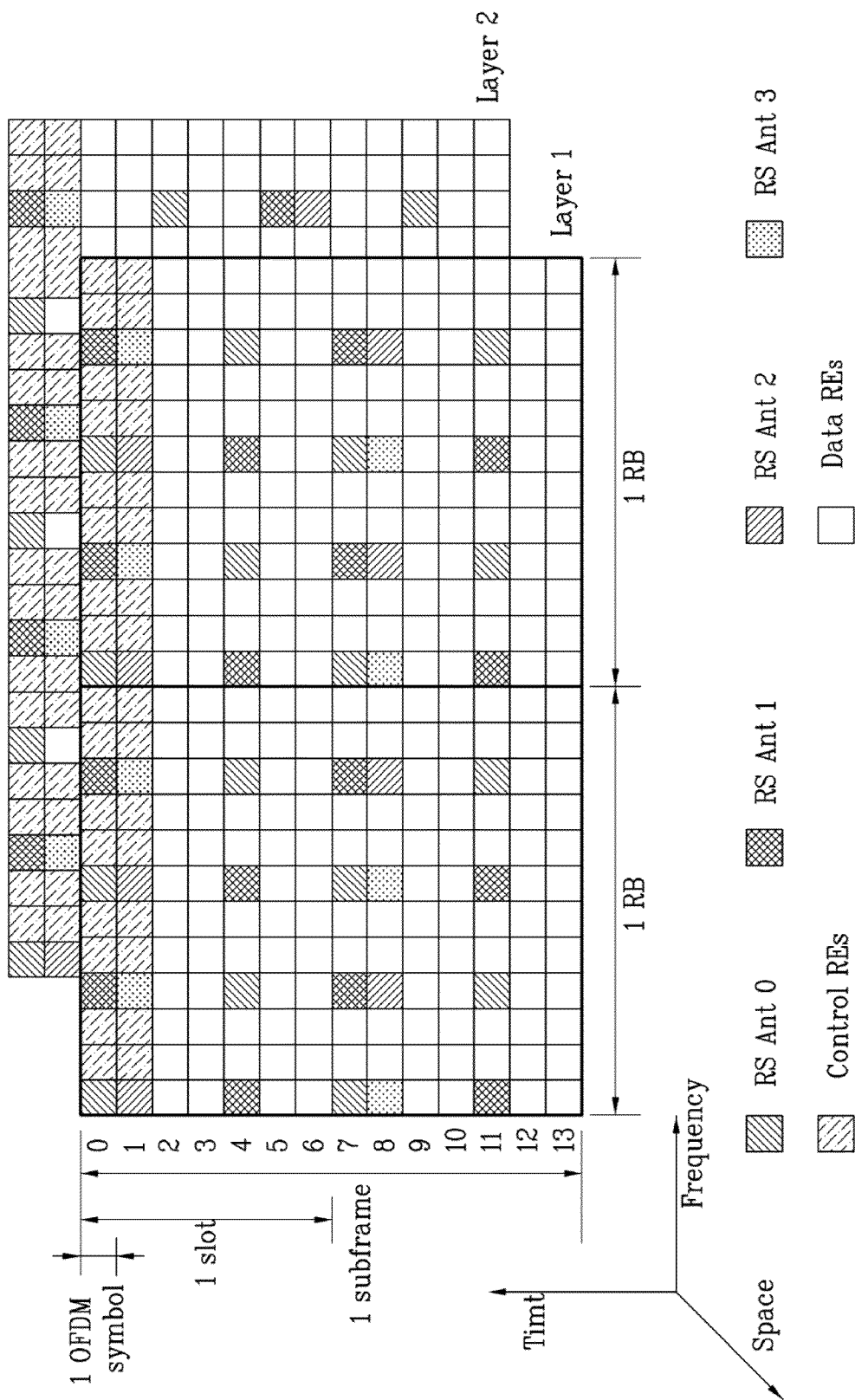
FIG. 28 shows a downlink FDD sub-frame structure of an LTE system according to the present invention.

FIG. 28 shows a downlink Frequency Division Duplex (FDD) sub-frame structure of an LTE system according to the present invention.

Referring to FIG. 28, a single subframe has a short length of 1 ms, so that the degree of a channel variation on a time axis is low. But, a maximum of 20 MHz may be used on a frequency axis, so that a channel variation on the frequency axis is high. Channels may be independent of each other on a space axis, so that they are evenly distributed on the frequency- and space-axes to gain a diversity gain. The above-mentioned embodiments of the present invention may be applied to not only the FDD system but also a Time Division Duplex (TDD) system having a subframe different from that of the FDD system.

Figure 29A:
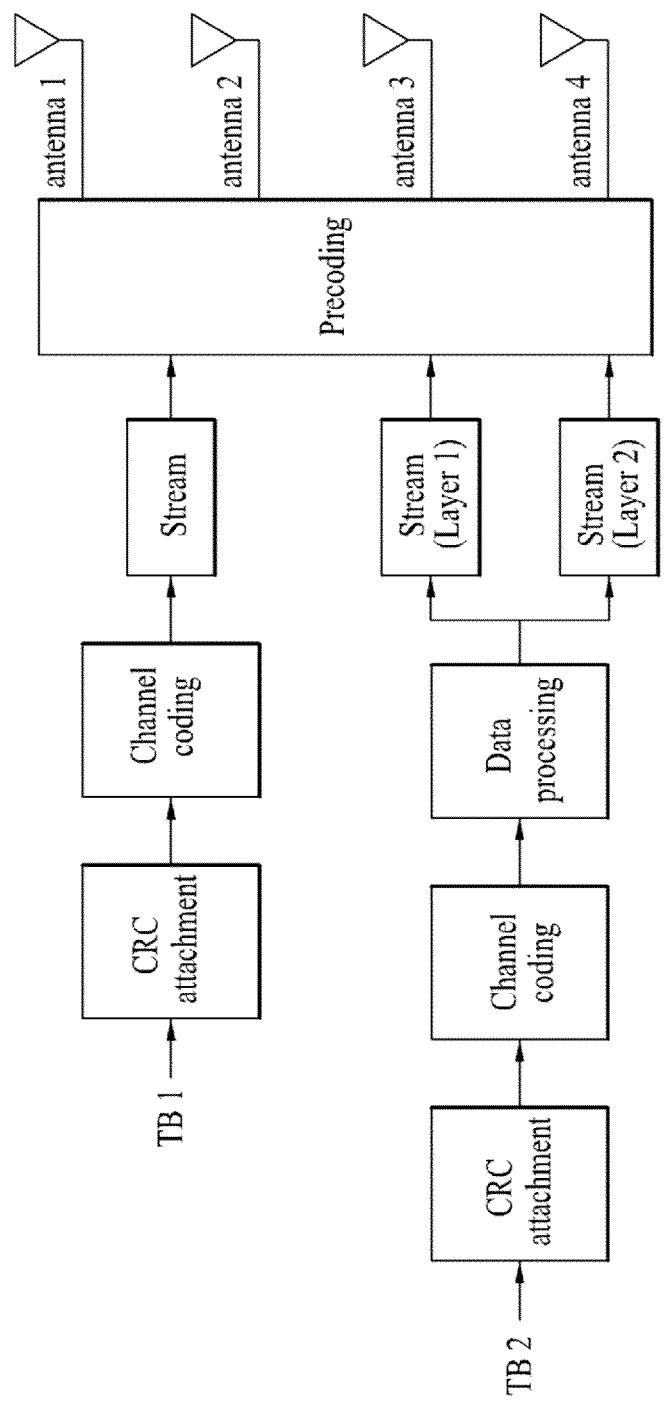
FIGS. 29A~29B show transmission-chain structures of an LTE system according to the present invention.
Figure 29B:
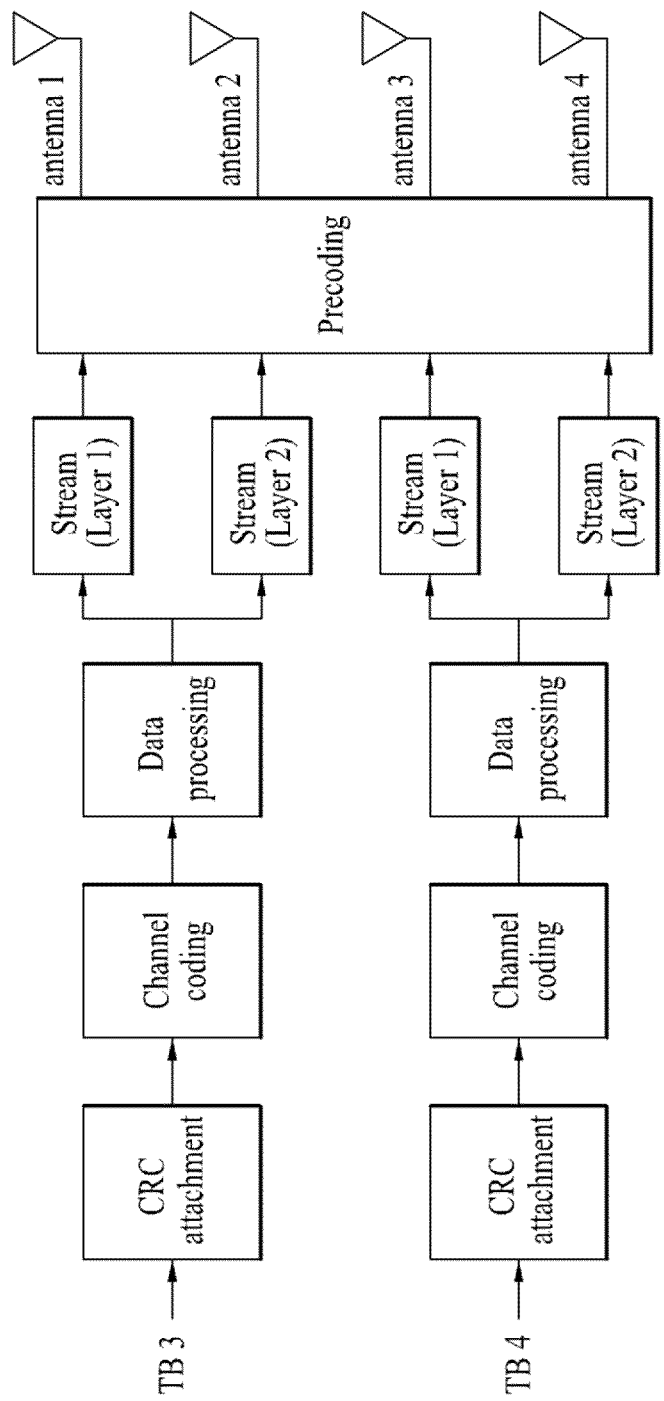

FIGS. 29A~29B show transmission-chain structures of an LTE system according to the present invention. FIG. 29A is a transmission structure of a Rank 3 equipped with three layers, and FIG. 29B is a transmission structure of a Rank 4 equipped with four layers.

In association with embodiments for effectively reducing the codeword-to-layer mapping combinations, the structure of FIG. 29A may correspond to a third combination of Table 28, and the structure of FIG. 29B may correspond to a fourth combination of Table 28.

The term "transport block" has been widely used for the UMTS or E-UMTS system, and is a basic data unit exchanged via a transport channel. A first transport block TB1 of FIG. 29A undergoes a data processing step of a transmission chain, so that it is connected to a single stream (i.e., a single layer). In other words, the CRC is added to a single transport block by the CRC attachment algorithm, and is channel-encoded, so that the channel-encoded result is allocated to a single layer. The term "transport block" has been widely used for the UMTS or E-UMTS system, and is a basic data unit exchanged via a transport channel. The channel encoding may be performed by a turbo-code or Low Density Parity Check (LDPC) code.

In the case of a second transport block (TB2) of FIG. 29A, and first and second transport blocks (TB3 and TB4) of FIG. 29B, a single transport block is connected to two streams (i.e., two layers). If the size of the single transport block is larger than a predetermined value, the single transport block is segmented into several codeblocks (CBs). In this case, the CRC may be attached in units of a codeblock or transport block. Also, if required, the CRC-attached transport block is segmented into several codeblocks, and the CRC may be re-attached to each codeblock. The channel encoding is performed in units of a codeblock. When the channel-encoded codeblocks are allocated to each layer, a data processing step considering the spatial diversity is needed. The symbol streams allocated to each layer is pre-coded for multiple antenna transmission, so that they are transmitted to a receiver via multiplex Tx antennas.

A variety of embodiments associated with the data processing step before data is allocated to each layer after the channel encoding of FIGS. 29A and 29B will hereinafter be described.

Figure 30:
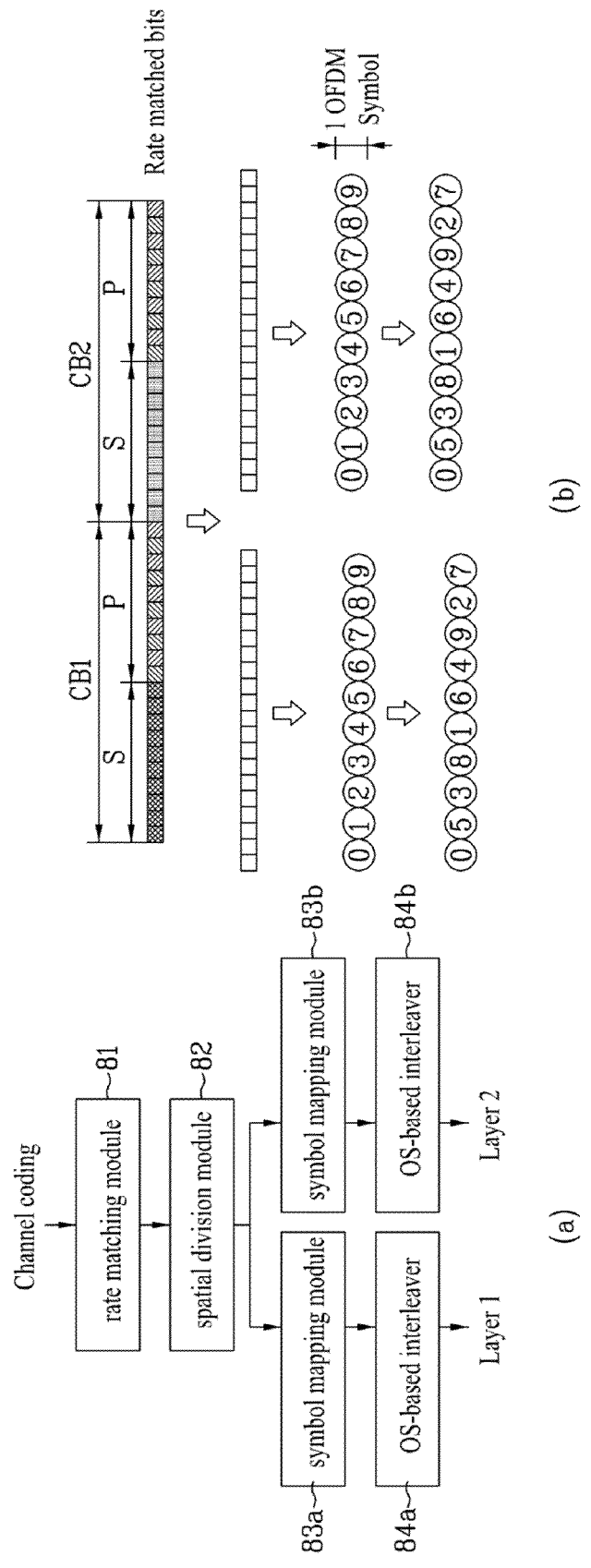
FIG. 30 shows a transmission-chain structure according to one embodiment of the present invention.

FIG. 30 shows a transmission-chain structure according to one embodiment of the present invention.

Referring to FIG. 30, each channel-encoded codeblock CB1 or CB2 includes a systematic part and a parity part. A rate matching module 81 performs the rate matching on the channel-encoded codeblocks. The rate matching process indicates that the sizes of the channel-encoded codeblocks are matched with a predetermined value. For example, a transmission start position is controlled by a circular buffer of FIG. 25, so that the size of a codeword to be transmitted can be adjusted. The rate matching may be performed for each channel-encoded codeblock or may also be performed on an overall part in which all codeblocks are interconnected.

The spatial division module 82 divides the rate-matched bitstream into two bitstreams, and outputs the two bitstreams. In this case, the order of individual bits in the bitstream is unchangeable. The number of divided bitstreams is equal to the number of layers. The number of layers in FIG. 30 is 2.

Divided bitstreams are applied to the symbol mapping modules 83a and 83b. Each symbol mapping module 83a or 83b performs the symbol mapping on the received bitstreams, and outputs a symbol sequence. In order to perform the symbol mapping, a QPSK (Quadrature Phase Shift Keying), 16QAM (QWuadrature Amplitude Modulation), or 64QAM method may be used, but it should be noted that the scope of the present invention is not limited to the above-mentioned methods, and can also be applied to other methods as necessary.

Output symbol streams of each symbol mapping module 83a or 83b is applied to each interleaver 84a or 84b. Each interleaver 84a or 84b performs interleaving on each symbol stream, so that the order of symbols is rearranged. It is preferable that the interleaving be set to an OFDM-symbol-based interleaving. The OFDM-symbol-based interleaving indicates that a symbol assigned to a sub-carrier is interleaved within a single OFDM symbol. The order of symbols assigned to the sub-carriers is rearranged by the OFDM-symbol-based interleaving. The individual symbol streams interleaved by each interleavers 84a and 84b are assigned to individual layers, respectively.

Figure 31A:
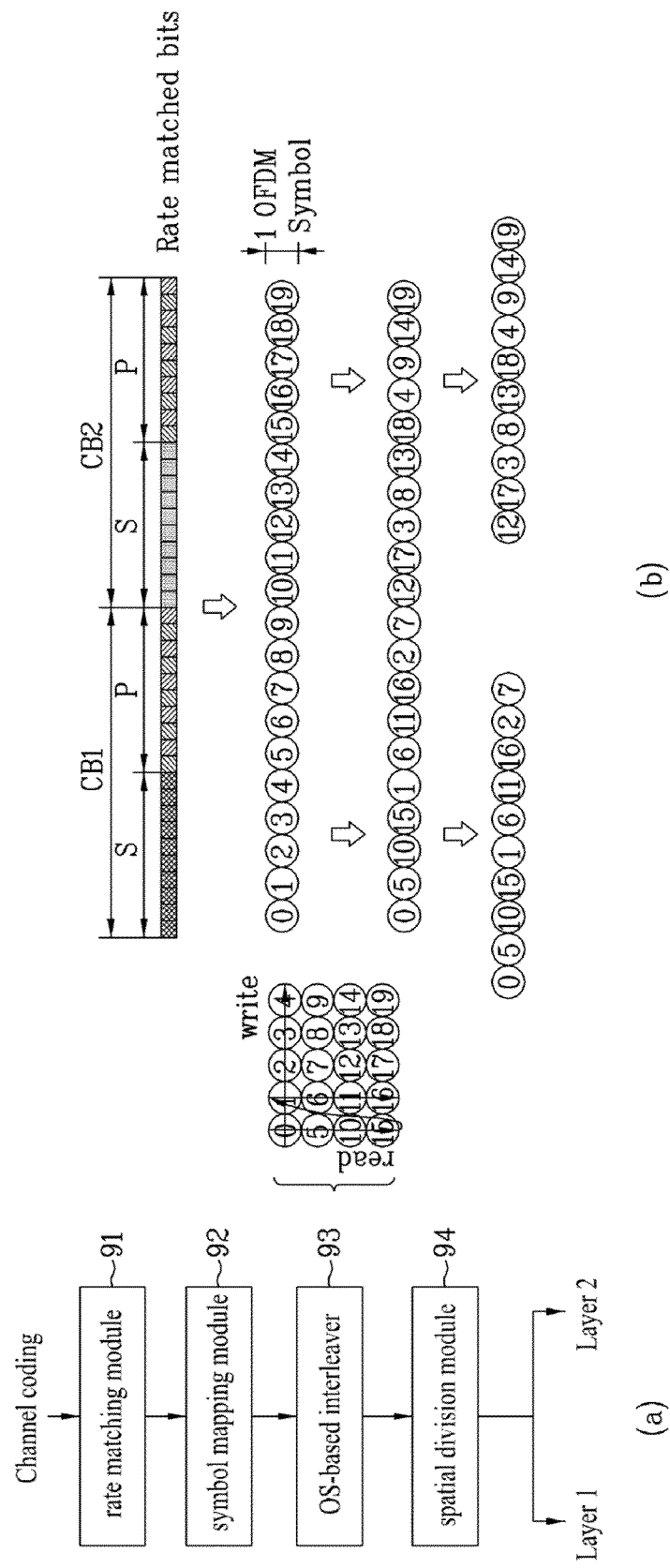
FIGS. 31A~31B show transmission-chain structures according to another embodiment of the present invention.

FIG. 31A shows a transmission-chain structure according to another embodiment of the present invention.

Referring to FIG. 31A, a rate matching module 91 performs the rate matching on the channel-encoded codeblocks CB1 and CB2. A symbol mapping module 92 performs the symbol mapping on a bitstream generated from the rate matching module 91 and outputs a symbol stream. Detailed descriptions of the above-mentioned rate matching and the above-mentioned symbol mapping have been described in FIG. 30, so that they will herein be omitted.

An interleaver 93 receives the symbol stream from the symbol mapping module 92, performs the interleaving on the received symbol stream, and rearranges the order of symbols. Preferably, the interleaver 93 may perform the interleaving on symbols corresponding to the codeblocks CB1 and CB2, so that the symbols are evenly mixed. In other words, a symbol stream to which a first channel-encoded codeblock (CB1) is mapped, and the other symbol stream to which a second codeblock (CB2) is mapped are evenly mixed by the interleaving shown in FIG. 31A (b). Preferably, the rearrangement order of symbols by the interleaving may be predetermined by a given algorithm, and the OFDM-symbol-based interleaving may be performed on the symbols as shown in FIG. 30.

A spatial division module 94 divides an output symbol stream of the interleaver 93 into several streams according to the number of layers, and outputs the divided streams. The divided streams are allocated to individual layers. In FIG. 31A, the interleaver 93 and the spatial division module 94 are physically spaced apart from each other, but they may be integrated in one unit as necessary. In other words, the interleaver 93 performs the interleaving, and divides Rx data into several symbols streams, so that the individual symbol streams may also be allocated to individual layers.

Figure 31B:
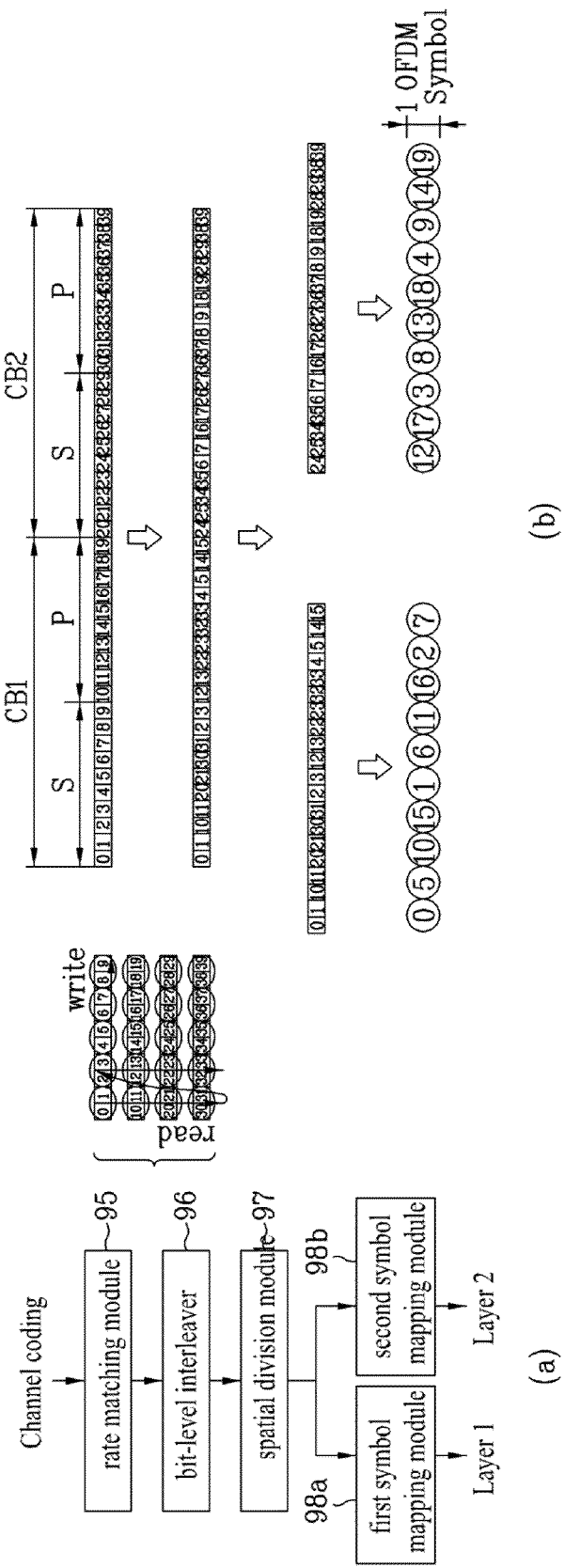

FIG. 31B shows a transmission-chain structure according to still another embodiment of the present invention.

Referring to FIG. 31B, a data bitstream is rate-matched by a rate matching module 95, and the rate-matched bitstream is applied to a bit-level interleaver 96. The bit-level interleaver 96 performs the interleaving on the Rx data bitstream. Preferably, the interleaving may be performed in units of a bit group equipped with at least one bit. The number of bits contained in each bit group is equal to the number of bits mapped to a single symbol in each symbol mapping module 98a or 98b. For example, if the BPSK scheme is used as the symbol mapping method in the first or second symbol mapping module 98a or 98b, each bit group includes a single bit. If the QPSK scheme is used as the symbol mapping method, each bit group includes two bits. If the 16QAM scheme is used as the symbol mapping method, each bit group includes 4 bits. FIG. 31B shows the case in which the QPSK scheme is used as the symbol mapping method. The data bitstream written in a row direction by the bit-level interleaver 96 is read in a column direction on the basis of a bit group composed of two bits, and is then outputted.

The data bitstream generated from the bit-level interleaver 96 is divided into several units according to the number of layers by the spatial division module 97. The first and second symbol mapping modules 98a and 98b perform the symbol mapping on the data bitstreams divided by the spatial division module 97. FIG. 31B shows the case in which the QPSK is used as the symbol mapping method, so that two bits are mapped to a single symbol. In FIG. 31B, the order of the spatial division caused by the spatial division module 97 and the symbol mapping caused by the first and second symbol mapping modules 98a and 98b may be changed to another order. In other words, the symbol mapping is firstly performed on the datastream generated from the bit-level interleaver 96, and then the symbol streams are segmented according to the number of layers.

The individual symbol streams generated from the first and second symbol mapping modules 98a and 98b of FIG. 31B are equal to those of the spatial division module 94 of FIG. 31A.

An OFDM Symbol (OS)-based interleaver 93 of FIG. 31A performs the interleaving at a symbol level, and a bit-level interleaver 96 of FIG. 31B performs the interleaving at a bit level. However, the bit-level interleaver 96 performs the interleaving in units of a bit group composed of bits corresponding to the symbol mapping method, so that the bit-level interleaving has the result equivalent to that of the symbol-level interleaving. And, although the spatial division module 97 of FIG. 31B is located after a single symbol mapping module as shown in FIG. 31A, the same equivalent effect is made.

Figure 32A:
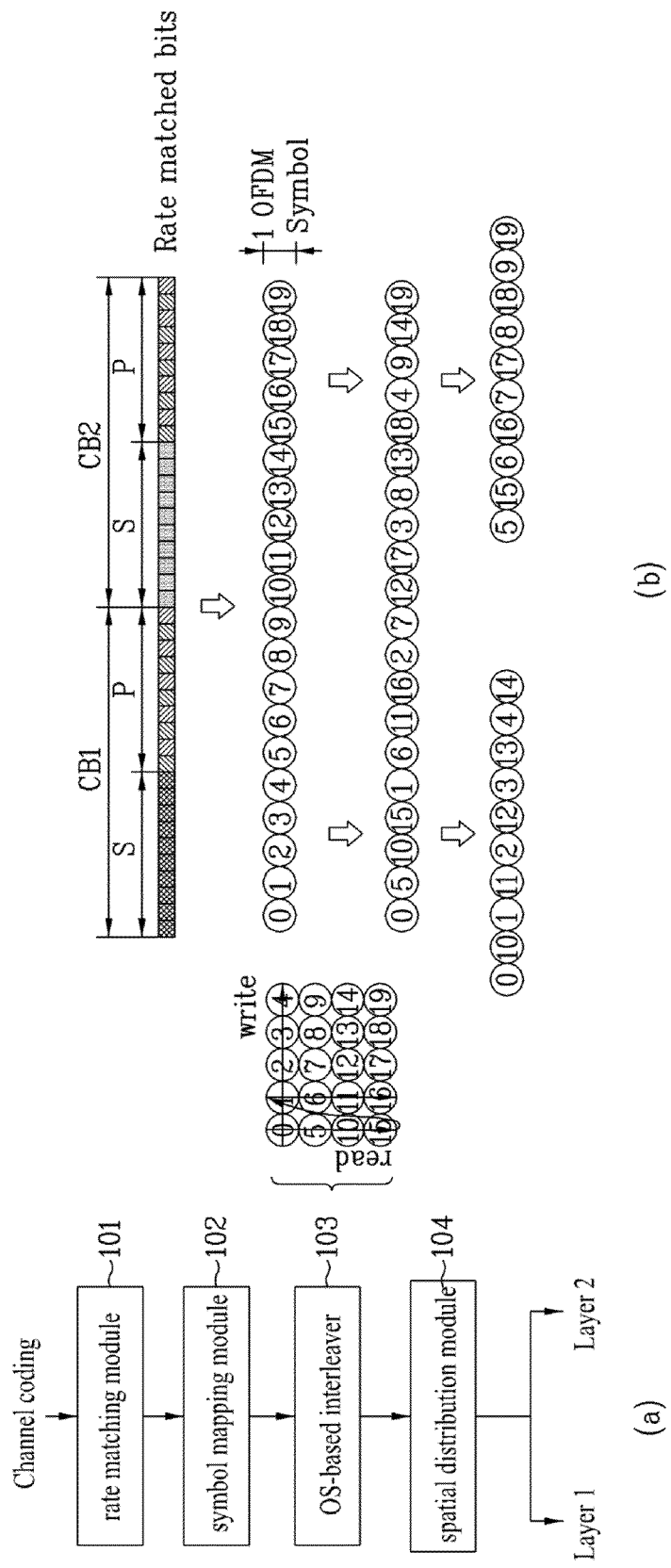
FIGS. 32A~32B show transmission-chain structures according to yet another embodiment of the present invention.

FIG. 32A shows a transmission-chain structure according to still another embodiment of the present invention.

Although the structure of FIG. 32A is similar to that of FIG. 31A, it should be noted that the spatial division module 94 of FIG. 31A is replaced with the spatial distribution module 104. The spatial distribution module 104 divides the symbol streams generated from the interleaver 103 according to the number of layers, and at the same time rearranges the order of symbols. Namely, in FIG. 32A (b), the order of symbols corresponding to individual codeblocks is rearranged according to a given interleaving algorithm by the interleaver 103, and is divided into several symbol streams by the spatial distribution module 104, so that the order of symbols is readjusted by a predetermined scheme. In this case, it is considered that the spatial distribution module 104 performs the spatial interleaving. For example, a single symbol stream is configured by even-th symbols from among all symbol streams corresponding to the individual codeblocks, and the other symbol stream may be configured by odd-th symbols. The method for re-adjusting the order of symbols by the spatial distribution module 104 may be freely determined within the scope of maximizing the spatial diversity effect. In FIG. 32A, in the case of an actual system implementation, the interleaver 103 and the spatial distribution module 104 may be integrated in one unit as necessary. Detailed descriptions of the rate matching module 101, the symbol mapping module 102, and the interleaver 103 are equal to those of FIG. 31.

Figure 32B:
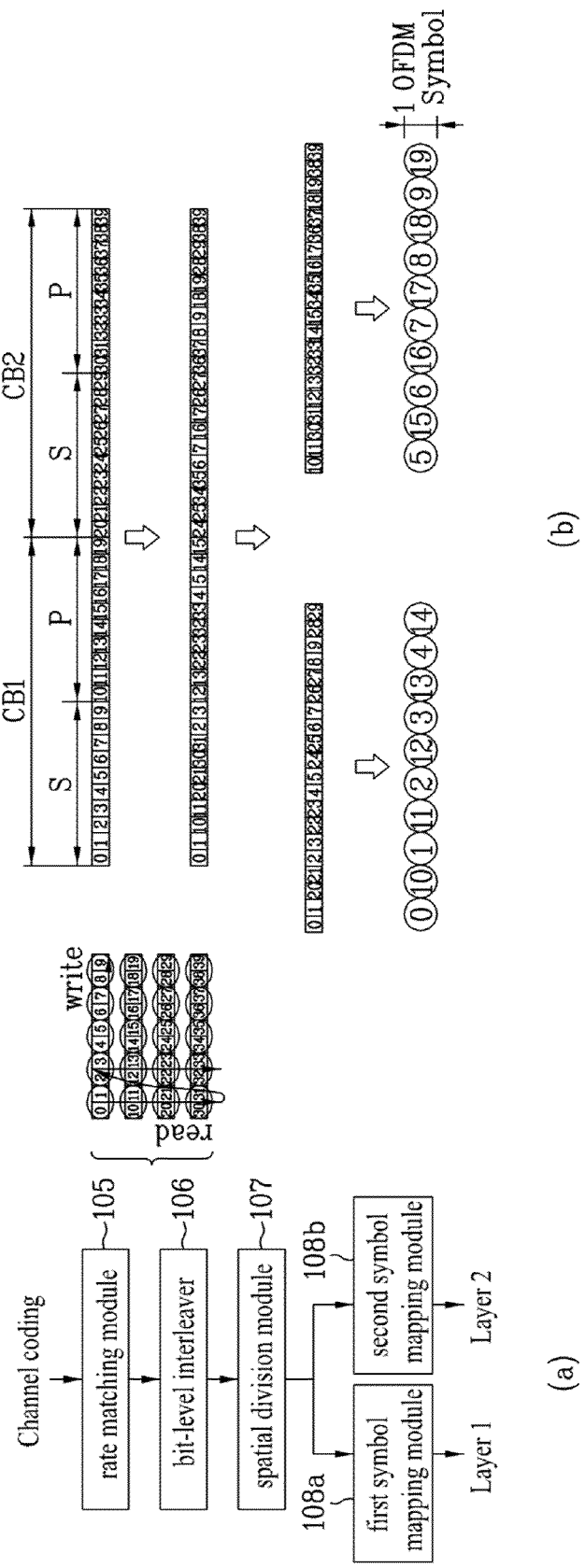

FIG. 32B shows a transmission-chain structure according to still another embodiment of the present invention.

Compared with FIG. 32A, the embodiment of FIG. 32B controls a bit-level interleaver 106 to perform the interleaving on the basis of a bit group composed of at least one bit according to the symbol mapping method used for the first and second symbol mapping modules 108a and 108b in the same manner as in the embodiment of FIG. 31b. If the data bitstreams depending on the number of layers is spatially distributed by the spatial distribution module 107, the data bitstreams must be distributed on the basis of a bit group used for the bit-level interleaver 106. In the case of an actual implementation, the bit-level interleaver 106 and the spatial distribution module 107 may be integrated with each other as necessary.

In FIG. 32B, the order of the spatial distribution caused by the spatial distribution module 107 and the symbol-mapping caused by the first and second symbol mapping modules 108a and 108b may be changed to another order. In other words, although the spatial distribution module 107 of FIG. 32B is located after a single symbol mapping module as shown in FIG. 32A, the same equivalent effect is made.

Figure 33:
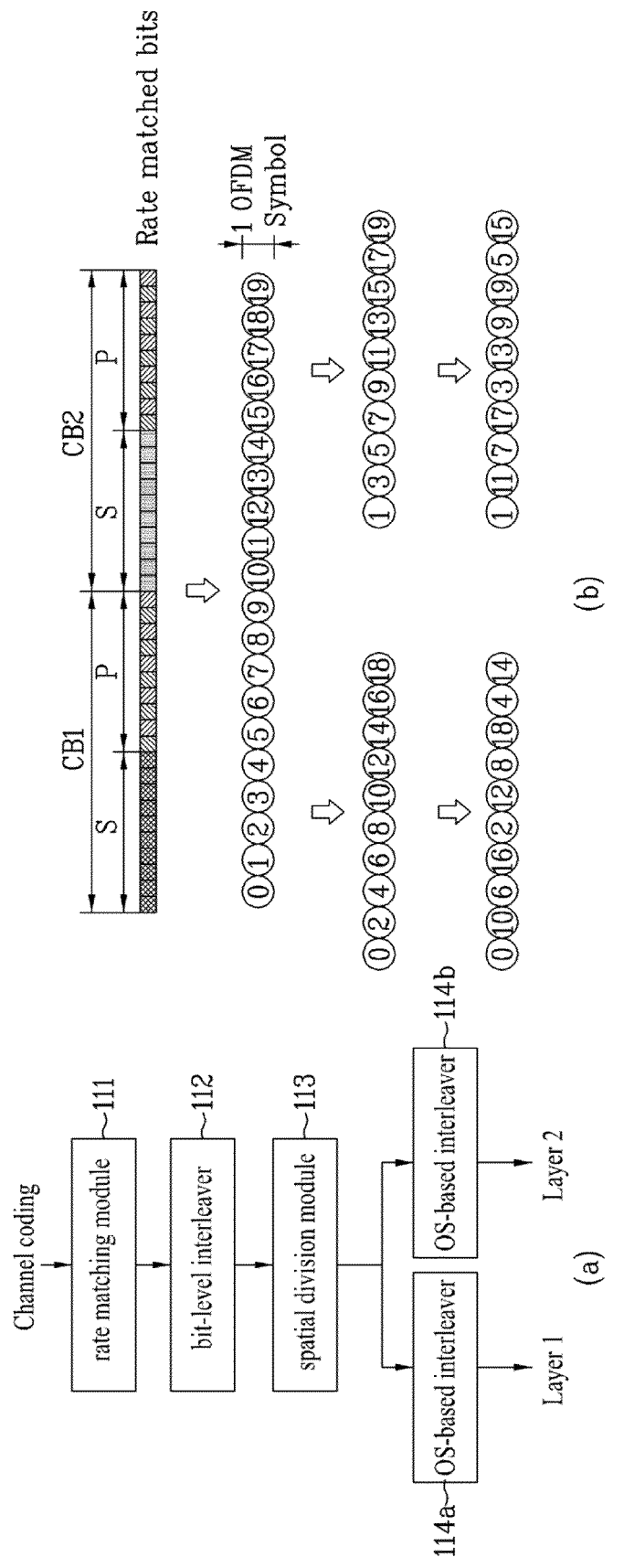
FIG. 33 shows a transmission-chain structure according to yet another embodiment of the present invention.

FIG. 33 shows a transmission-chain structure according to still another embodiment of the present invention.

Compared with FIG. 32A, the order of a spatial distribution module 113 and interleavers 114a and 114b in the embodiment of FIG. 33 is opposite to that of FIG. 32A. In other words, the symbol stream generated from the symbol mapping module 112 is divided into two symbol streams by the spatial distribution module 113. In this case, the spatial distribution module 113 re-adjusts the order of symbols so that the divided symbol streams evenly include symbols corresponding to the codeblocks CB1 and CB2, and at the same time divides the symbol streams generated from the symbol mapping module 112. Each interleaver 114a or 114b performs the interleaving on the symbol stream generated from the spatial distribution module 113, so that the symbols are rearranged. The symbol streams generated from the individual interleavers 114a and 114b are allocated to individual layers. In the structure of FIG. 33, the spatial distribution module 113 and the interleaver 114a and 114b may be integrated with each other in an actual implementation process.

The embodiments of FIGS. 30 and 33 may also perform the bit-based interleaving on the channel-encoded codeblocks, before performing the symbol mapping process. In other words, the embodiments of FIGS. 30 and 33 perform the bit-group-based interleaving on the channel-encoded codeblocks before performing the symbol mapping process, so that the order of bits contained in the codeblocks may be rearranged.

The OS-based interleaving may not be used in the above-mentioned embodiments of FIGS. 30 and 33. In this case, if the case in which two codeblocks are contained in a single symbol is not allowed, the symbol-based processing is easier than the bit-based processing. For example, if it is assumed that the rate-matched CB1 has the length of 10 bits, and the CB2 has the length of 10 bits, and the CB1 and CB2 use the 16QAM, a single symbol is configured at intervals of 4 bits, so that the last 2 bits of the CB1 and the first 2 btis of the CB2 are contained in a single 16QAM symbol. If the above-mentioned assumption is not allowed, the length of the CB1 or CB2 must be restricted to an integer multiple of a modulation order. This case is equal to the other case in which the OS-based interleaving is used as an identity interleaving. Therefore, although the OS-based interleaving is not used, the symbol mapping module and the spatial division (or distribution) module proposed by the present invention can also be used without any change.

The above-mentioned descriptions have disclosed the method for reducing the number of codeword-stream (or codeword-layer) mapping combinations, the layer mapping process, and the method for effectively transmitting data. The above-mentioned embodiments can be readily understood and modified by those skilled in the art in various ways according to the above-mentioned principles. For example, the layer mapping method of FIG. 29A or 29B may be performed by codeword-stream combinations shown in Table 28, so that input data can be channel-encoded, be modulated according to a symbol mapping scheme, and be mapped to each layer (or each stream). FIGS. 29A and 29B correspond to third and fourth combinations shown in Table 28, as previously stated above.

If a single codeword is mapped to two layers according to third and fourth combinations of Table 28, individual modulation symbols may be alternately mapped to two layers by the spatial distribution module 113 of FIG. 33. In other words, as shown in FIG. 33, an even-th symbol is mapped to a first layer 1, and an odd-th symbol is mapped to a second layer 2, so that a diversity gain is acquired. Needless to say, the order of the even-th symbol and the odd-th symbol may be changed to another order as necessary.

The above-mentioned functions may be performed by a microprocessor, a controller, a micro-controller, or an Application Specific Integrated Circuit (ASIC) based on given software or program codes. The design, development, and implementation of the above-mentioned codes may be easily implemented by those skilled in the art.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As apparent from the above description, although the above-mentioned embodiments have been disclosed on the basis of the 3GPP LTE, the scope of the present invention is not limited to this 3GPP LTE, and can also be applied to other wireless communication systems based on the MIMO scheme.

The method for indicating a combination between a codeword and a stream according to one embodiment of the present invention can rationally limit the number of all combinations between a codeword and a stream in consideration of a variety of aspects, so that it can reduce the number of bits of information indicating the number of all combinations between a codeword and a stream. As for the above-mentioned aspects, the above-mentioned method considers a maximum transmission rate of a specific codeword, compares the possibility of use with the number of cases indicating a corresponding combination, maintains a combination available for retransmission, improves a decoding performance of a receiver using the Successive Interference Cancellation (SIC) method and considers a stream grouping based on an antenna grouping and considers a user's convenience in a multi-user MIMO communication system.

Therefore, the present invention indicates all codeword-stream combinations, which are required for both an uplink and a downlink in a MIMO communication system, with less number of bits, thereby increasing the efficiency of control information.

The present invention provides a method for mapping codeblocks according to layers in a MIMO communication system, transmitting the mapped codeblocks, and additionally guaranteeing a spatial diversity gain caused by the spatial multiplexing.

In the case where a single data block is divided into several codeblocks and the codeblocks are channel-encoded, the present invention gives each codeblock a sufficient spatial diversity by adding simple functions to a transmission chain.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A layer mapping method for spatial multiplexing in a Multi-Input Multi-Output (MIMO) system, the layer mapping method comprising:
    mapping symbols associated with each codeword to a corresponding at least one layer according to one of a plurality of mapping combinations;
    precoding the symbols mapped to the corresponding at least one layer to produce a precoded signal; and
    transmitting the precoded signals,
    wherein the maximum number of layers to which the symbols associated with a single codeword are mapped is equivalent to the maximum number of layers employed by the MIMO system divided by the maximum number of codewords,
    wherein the plurality of mapping combinations comprise only one mapping combination for each combination of a number of codewords and a number of layers,
    wherein the plurality of mapping combinations comprise first mapping combinations for one codeword and second mapping combinations for multiple codewords, and
    wherein the first mapping combinations comprise all possible mapping combinations for retransmitting only one codeword among the multiple codewords of the second mapping combinations.

2. The method according to claim 1, wherein mapping the symbols associated with each codeword to the corresponding at least one layer comprises:

alternately mapping the symbols associated with one codeword to two layers.

3. The method according to claim 1, wherein mapping the symbols associated with each codeword to the corresponding at least one layer comprises:
   mapping the symbols associated with a first codeword to a corresponding first layer; and
   alternately mapping the symbols associated with a second codeword to a corresponding second and third layers.

4. The method according to claim 1, wherein mapping the symbols associated with each codeword to a corresponding at least one layer comprises:
   alternatively mapping the symbols associated with a first codeword to a corresponding first and second layers; and
   alternatively mapping the symbols associated with a second codeword to a corresponding third and fourth layers.

5. The method according to claim 1, wherein the MIMO system employs
   a maximum of 4 layers and a maximum of 2 codewords, and
   wherein the plurality of mapping combinations limits the number of layers to which the symbols associated with a single codeword are mapped to 2.

6. The method according to claim 5, wherein the symbols associated with at least one codeword are alternately mapped to two layers.

7. The method according to claim 1, wherein the MIMO system uses a maximum of 4 layers and maximum of 2 codewords, and wherein the plurality of mapping combinations includes:
   a first combination in which the symbols associated with a single codeword are mapped to a single layer;
   a second combination in which the symbols associated with each of two codewords are mapped to two layers, respectively;
   a third combination in which the symbols associated with each of two codewords are mapped to three layers, and
   a fourth combination in which the symbols associated with each of two codewords are mapped to four layers.

8. The method according to claim 7, wherein, according to the third or fourth combination, the symbols associated with at least one codeword are alternately mapped to two layers.

9. The method according to claim 7, wherein the plurality of mapping combinations further includes:
   a fifth combination in which the symbols associated with a single codeword are alternatively mapped to two layers.

10. A transmitter for a layer mapping in a Multi-Input Multi-Output (MIMO) system, the transmitter comprising:
    at least one antenna;
    a layer mapper configured to map one or more codewords to one or more layers according to one mapping combination from among a plurality of mapping combinations; and
    a precoder receiving the one or more layers from the layer mapper and precoding the one or more layers to generate signals to be transmitted via the at least one antenna,
    wherein a maximum number of the layers to which a single codeword is mapped is equivalent to a maximum number of the layers employed by the MIMO system divided by a maximum number of the codewords employed by the MIMO system,
    wherein the plurality of mapping combinations comprise only one mapping combination for each combination of a number of codewords and a number of layers,
    wherein the plurality of mapping combinations comprise only one mapping combination for a combination of a number of codewords and a number of layers,
    wherein the plurality of mapping combinations comprise first mapping combinations for one codeword and second mapping combinations for multiple codewords, and
    wherein the first mapping combinations comprise all possible mapping combinations for retransmitting only one codeword among the multiple codewords of the second mapping combinations.

11. The transmitter of claim 10, wherein the maximum number of the codewords employed by the MIMO system is 2,
    wherein the maximum number of the layers employed by the MIMO system is 4, and
    wherein the maximum number of the layers to which the single codeword is mapped is equivalent to 2.

12. The transmitter of claim 11, wherein the plurality of mapping combination comprise:
    a first combination in which a single codeword is mapped to a single layer,
    a second combination in which two codewords are respectively mapped to two layers,
    a third combination in which two codewords are mapped to three layers, and
    a fourth combination in which two codewords are mapped to four layers.

13. The transmitter of claim 11, wherein the plurality of mapping combination consists of:
    a first combination in which a single codeword is mapped to a single layer,
    a second combination in which two codewords are respectively mapped to two layers,
    a third combination in which two codewords are mapped to three layers,
    a fourth combination in which two codewords are mapped to four layers, and
    a fifth combination in which a single codeword is mapped to two layers.

* * * * *